United States Patent
Tateishi et al.

(10) Patent No.: US 8,142,519 B2
(45) Date of Patent: Mar. 27, 2012

(54) AZO PIGMENT, AND PIGMENT DISPERSION, COLORING COMPOSITION AND INK COMPOSITION FOR INKJET RECORDING CONTAINING THE SAME

(75) Inventors: Keiichi Tateishi, Minami-Ashigara (JP); Shinya Hayashi, Minami-Ashigara (JP); Yoshiaki Nagata, Minami-Ashigara (JP); Tomoaki Nakamura, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 96 days.

(21) Appl. No.: 12/676,377

(22) PCT Filed: Sep. 3, 2008

(86) PCT No.: PCT/JP2008/066263
§ 371 (c)(1),
(2), (4) Date: Mar. 4, 2010

(87) PCT Pub. No.: WO2009/031687
PCT Pub. Date: Mar. 12, 2009

(65) Prior Publication Data
US 2010/0258036 A1    Oct. 14, 2010

(30) Foreign Application Priority Data

Sep. 6, 2007   (JP) ................................. 2007-231951
Mar. 5, 2008   (JP) ................................. 2008-055403

(51) Int. Cl.
*C09B 67/22*   (2006.01)
*C09D 11/00*   (2006.01)

(52) U.S. Cl. .......... 8/637.1; 8/639; 8/688; 8/690; 8/691; 8/692; 106/31.27

(58) Field of Classification Search .................... 8/637.1, 8/639, 688, 690, 691, 692; 106/31.27
See application file for complete search history.

(56) References Cited

U.S. PATENT DOCUMENTS 2,936,306 A    5/1960   Schmid et al.
7,125,446 B2   10/2006  Potenza et al.
(Continued)

FOREIGN PATENT DOCUMENTS

EP    1 847 570 A1    10/2007
(Continued)

OTHER PUBLICATIONS

International Search Report for PCT/JP2008/066263 dated Jul. 17, 2009 [PCT/ISA/210].
(Continued)

*Primary Examiner* — Eisa Elhilo
(74) *Attorney, Agent, or Firm* — Sughrue Mion, PLLC

(57) ABSTRACT

A monoazo pigment is represented by the general formula (1), a tautomer of the monoazo pigment, and a salt or a hydrate thereof:

General formula (1)

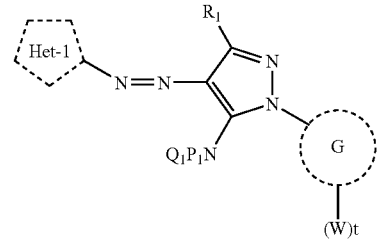

in which $R_1$, $P_1$, and $Q_1$ each independently represents a hydrogen or a substituent, G represents the non-metallic atoms necessary to complete a 5- to 6-membered heterocyclic group, W represents a substituent capable of binding to the heterocyclic group constituted by G, t represents an integer of from 0 to 5, Het-1 represents a group selected from the aromatic heterocyclic groups represented by the general formula (2) as recited in the claims and disclosure of the invention.

19 Claims, 5 Drawing Sheets

U.S. PATENT DOCUMENTS

| | | | |
|---|---|---|---|
| 2003/0213405 A1* | 11/2003 | Harada et al. | 106/31.47 |
| 2004/0187734 A1 | 9/2004 | Ozawa et al. | |
| 2007/0202282 A1 | 8/2007 | Fujie et al. | |

FOREIGN PATENT DOCUMENTS

| | | |
|---|---|---|
| JP | 56-38354 A | 4/1981 |
| JP | 61-36362 A | 2/1986 |
| JP | 11-100519 A | 4/1999 |
| JP | 2003-277662 A | 10/2003 |
| JP | 4073453 B2 | 4/2008 |

OTHER PUBLICATIONS

Written Opinion for PCT/JP2008/066263 [PCT/ISA/237].

* cited by examiner

IR-Spectrum (KBr) Pig. –31

IR-Spectrum (KBr) Pig. –32

AZO PIGMENT, AND PIGMENT DISPERSION, COLORING COMPOSITION AND INK COMPOSITION FOR INKJET RECORDING CONTAINING THE SAME

TECHNICAL FIELD

The present invention relates to an azo pigment, and a pigment dispersion, coloring composition and ink composition for inkjet recording containing the azo pigment.

BACKGROUND ART

In recent years, as image-recording materials, materials for forming color images have been predominant and, specifically, recording materials for an ink jet system, recording materials for a thermal transfer system, recording materials for an electrophotographic system, transfer type silver halide light-sensitive materials, printing inks, and recording pens have found widespread use. Also, in image pick-up devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

In particular, use of recording materials has extended from domestic use to industrial use and, as a result, they are required to have performance at a higher level (regarding hue, coloring strength, and image fastness to light, gas, heat, moisture, and chemicals).

With respect to coloring materials to be used (for example, an ink composition for inkjet recording), dye ink compositions are required to be changed from water-soluble ink compositions to oil-soluble ink compositions and, in the case where a much higher level of performance is required (from indoor use to outdoor use), the ink compositions are required to be changed from dye ink compositions to pigment ink compositions.

Difference between dyes and pigments in using manner is that, while dyes are used in a state of being dissolved (a state of molecular dispersion) in a medium such as fibers or solvents, pigments are used in a state of solid particles (molecular aggregate) finely dispersed in a medium without being dissolved.

The dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, the pigment is further required to be substantially insoluble in water or in an organic solvent, to have a good fastness to chemicals, and not to lose the preferred absorption characteristics it shows in a molecularly dispersed state even when used as particles. Although the required properties described above can be controlled by adjusting the intensity of intermolecular mutual action, both of them are in a trade-off relation with each other, thus being difficult to allow them to be compatible with each other.

Besides, in the case of using a pigment, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable. In particular, there is a strong demand for a pigment which has a good yellow hue and is fast to light, moist heat, and active gases in the environment, especially a pigment which has a high coloring strength and a fastness to light.

That is, in comparison with a dye which is required to have properties as colorant molecules, the pigment is required to have more properties, i.e., it is required to satisfy all of the above-mentioned requirements as a solid of an aggregate of a colorant (dispersion of fine particles) as well as the properties as molecules of a colorant. As a result, a group of compounds which can be used as pigments are extremely limited in comparison with dyes. Even when high-performance dyes are converted to pigments, few of them can satisfy requirement for the properties as a dispersion of fine particles. Thus, such pigments are difficult to develop. This can be confirmed from the fact that the number of pigments registered in Color Index is no more than $1/10$ of the number of dyes.

Azo pigments are excellent in hue and coloring strength which are characteristics of coloring, and hence they have widely been used in printing ink compositions, ink compositions for an ink jet system, and electrophotographic materials. Of the pigments, diarylide pigments are the most typically used yellow azo pigments. Examples of such diarylide pigments include C.I. pigment yellow 12, C.I. pigment yellow 13, and C.I. pigment yellow 17. However, the diarylide pigments are inferior in fastness, particularly light fastness, and hence they are decomposed when prints printed by them are exposed to light, thus being inappropriate for prints which are to be stored for a long time.

In order to remove such defects, there have been disclosed azo pigments having a fastness improved by increasing molecular weight or by introducing a group having a strong intermolecular mutual action (see, for example, JP-A-56-38354, U.S. Pat. No. 2,936,306 and JP-A-11-100519). However, even the improved pigments, for example, the pigments described in JP-A-56-38354 have the defect that they have still insufficient light fastness though improved to some extent, and pigments described in, for example, U.S. Pat. No. 2,936,306 and JP-A-11-100519 have a greenish hue and a low coloring strength, thus being inferior in coloring characteristics.

Also, JP-A-2003-277662 discloses colorants which have absorption characteristics of excellent color reproducibility and has a sufficient fastness. However, all of the specific compounds described in JP-A-2003-277662 are soluble in water or in an organic solvent, thus being insufficient in fastness to chemicals.

Incidentally, U.S. Pat. No. 7,125,446 describes an example of dissolving a dye as a colorant in a water medium to use as a water-soluble ink composition for inkjet recording. Also, JP-A-61-36362 describes an anion-type monoazo compound characterized by light fastness. However, the level of image fastness of these is not satisfying at a high level, and they fail to provide a using manner as a pigment.

In the case of expressing a full-color image based on the subtractive color mixing process using three colors of yellow, magenta, and cyan or using four colors further including black, use of a pigment having an inferior fastness as a yellow pigment, gray balance of the prints would be changed with the lapse of time, and use of a pigment having inferior coloring characteristics would reduce color reproducibility upon printing. Thus, in order to obtain prints which can maintain high color reproducibility for a long time, there have been desired a yellow pigment and a pigment dispersion which have both good coloring characteristics and good fastness.

Also, Japanese Patent No. 4,073,453 discloses colorants, as dyes, having absorption characteristics excellent in color reproducibility and an extremely high-level fastness.

DISCLOSURE OF THE INVENTION

However, compounds described in examples of Japanese Patent No. 4,073,453 all have such a high solubility in water or an organic solvent that, when trying to use them as pigments, there cannot be obtained intended dispersions of fine pigment particles, resulting in formation of solutions or emulsions wherein the colorants are dissolved. As a result, it has been difficult to use them in coloring materials containing a pigment dispersion for the purpose of providing various required performances at high levels. Also, Japanese Patent No. 4,073,453 does not disclose a method for producing a pigment or a pigment dispersion.

An object of the present invention is to provide an azo pigment having excellent coloring characteristics such as coloring strength and hue and having excellent durability such as light fastness, and to provide a pigment dispersion, a coloring composition, and an ink composition for inkjet recording containing the azo pigment.

As a result of intensive investigations in consideration of the above-mentioned circumstances, the inventors have obtained novel azo pigments and have found that they have both excellent coloring characteristics and excellent durability, thus having completed the present invention.

That is, the present invention is as follows.

<1> A monoazo pigment represented by the following general formula (1), a tautomer of the monoazo pigment, and a salt or a hydrate thereof:

General formula (1)

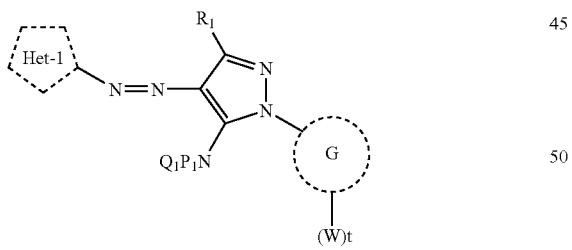

wherein $R_1$, $P_1$, and $Q_1$ each independently represents a hydrogen or a substituent, G represents the non-metallic atoms necessary to complete a 5- to 6-membered heterocyclic group, W represents a substituent capable of binding to the heterocyclic group constituted by G, t represents an integer of from 0 to 5, Het-1 represents a group selected from the aromatic heterocyclic groups represented by the following general formula (2):

General formula (2)

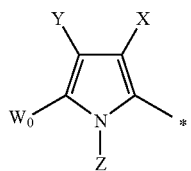  (1)

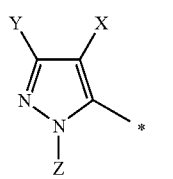  (2)

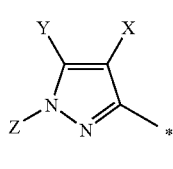  (3)

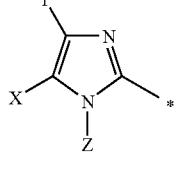  (4)

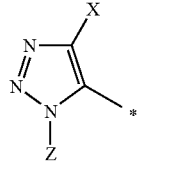  (5)

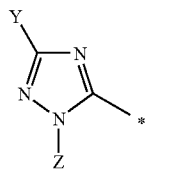  (6)

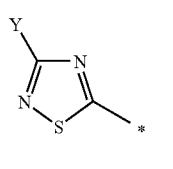  (7)

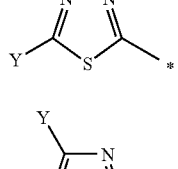  (8)

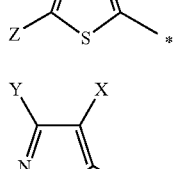  (9)

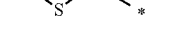  (10)

-continued

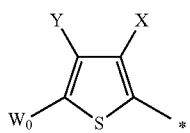
(11)

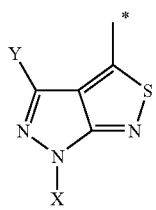
(12)

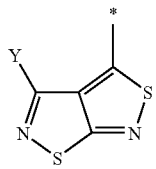
(13)

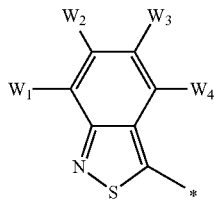
(14)

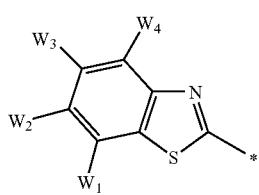
(15)

wherein

X, Y, Z, $W_0$, $W_1$, $W_2$, $W_3$, and $W_4$ each independently represents a hydrogen or a substituent, and

* shows the point of attachment to the azo linkage in the general formula (1).

<2> The monoazo pigment, the tautomer of the monoazo pigment, and the salt or hydrate thereof according to <1>, wherein the monoazo pigment is represented by the following general formula (3):

General formula (3)

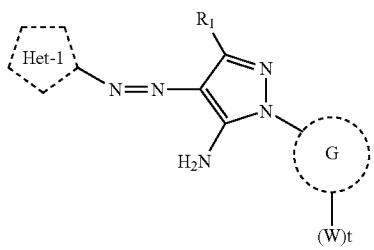

wherein $R_1$ represents a hydrogen or a substituent,

G represents the non-metallic atoms necessary to complete a 5- to 6-membered heterocyclic group, W represents a substituent capable of binding to the heterocyclic group constituted by G, t represents an integer of from 0 to 5, Het-1 represents a group selected from the aromatic heterocyclic groups represented by the general formula (2), provided that * in the general formula (2) shows the point of attachment to the azo linkage in the general formula (3).

<3> The monoazo pigment, the tautomer of the monoazo pigment, and the salt or hydrate thereof according to <1> or <2>, wherein the 5- to 6-membered heterocyclic group constituted by G is represented by the following general formula (4):

General formula (4)

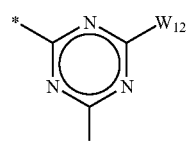
(a)

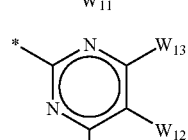
(b)

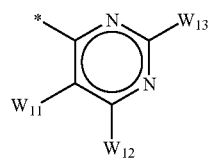
(c)

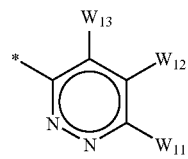
(d)

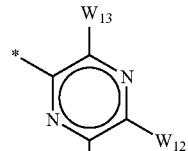
(e)

(f)

(g)

(h)

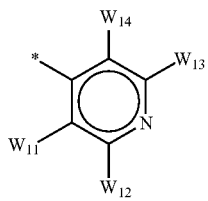

wherein $W_{11}$, $W_{12}$, $W_{13}$, and $W_{14}$ each independently represents a hydrogen or a substituent capable of binding to the heterocyclic group, and

* shows the point of attachment to the N atom on the pyrazole ring in the general formula (1) or (3).

<4> The monoazo pigment, the tautomer of the monoazo pigment, and the salt or hydrate thereof according to any one of <1> to <3>, wherein the monoazo pigment is represented by the following general formula (5):

General formula (5)

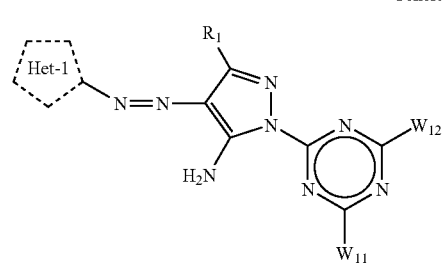

wherein $R_1$ represents a hydrogen or a substituent,

Het-1 represents a group selected from the aromatic heterocyclic groups represented by the general formula (2), provided that * in the general formula (2) shows the point of attachment to the azo linkage in the general formula (5), and $W_{11}$ and $W_{12}$ each independently represents a hydrogen or a substituent capable of binding to the s-triazine ring.

<5> The monoazo pigment, the tautomer of the monoazo pigment, and the salt or hydrate thereof according to any one of <1> to <4>, wherein the monoazo pigment is represented by the following general formula (6):

General formula (6)

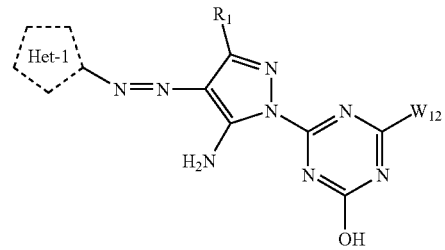

wherein $R_1$ represents a hydrogen or a substituent,

Het-1 represents a group selected from the aromatic heterocyclic groups represented by the general formula (2), provided that * in the general formula (2) shows the point of attachment to the azo linkage in the general formula (6), and $W_{12}$ represents a hydrogen or a substituent capable of binding to the s-triazine ring.

<6> The monoazo pigment, the tautomer of the monoazo pigment, and the salt or hydrate thereof according to any one of <1> to <5>, wherein the tautomer of the monoazo pigment is represented by any one of the following general formulae (6') to (6'''):

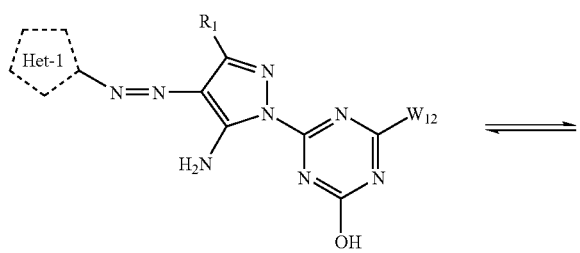

General formula (6)          General formula (6')

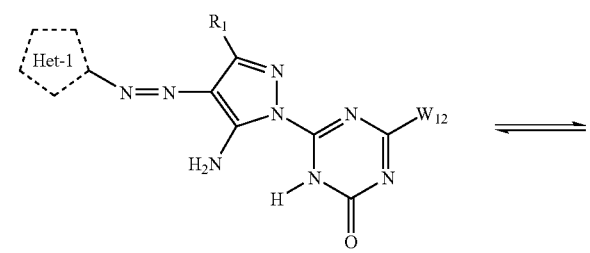

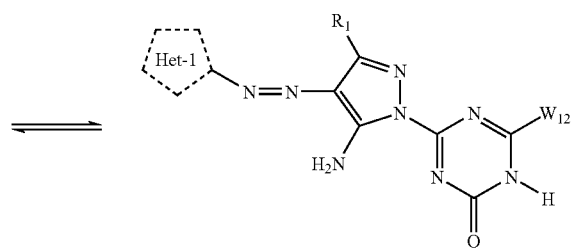

General formula (6'')          General formula (6''')

wherein

R₁ represents a hydrogen or a substituent,

Het-1 represents a group selected from the aromatic heterocyclic groups represented by the general formula (2), provided that * in the general formula (2) shows the point to the azo linkage in the general formulae (6') to (6'''), and W₁₂ represents a hydrogen or a substituent capable of binding to the s-triazine ring.

<7> The monoazo pigment, the tautomer of the monoazo pigment, and the salt or hydrate thereof according to any one of <1> to <6>, wherein the monoazo pigment has a peak absorption intensity in the range of from 1700 to 1730 cm⁻¹ in the IR absorption spectrum which is ⅓ or less of a peak absorption intensity in the range of from 1620 to 1670 cm⁻¹.

<8> The monoazo pigment, the tautomer of the monoazo pigment, and the salt or hydrate thereof according to any one of <1> to <3>, wherein the monoazo pigment is represented by the following general formula (7):

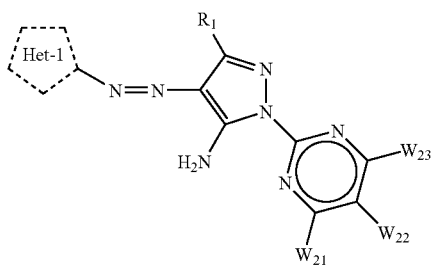

General formula (7)

wherein

R₁ represents a hydrogen or a substituent,

Het-1 represents a group selected from the aromatic heterocyclic groups represented by the general formula (2), provided that * in the general formula (2) shows the point of attachment to the azo linkage in the general formula (7), and W₂₁, W₂₂ and W₂₃ each independently represents a hydrogen or a substituent capable of binding to the 2,6-pyrimidine ring.

<9> The monoazo pigment, the tautomer of the monoazo pigment, and the salt or hydrate thereof according to any one of <1> to <3>, wherein the monoazo pigment is represented by the following general formula (8):

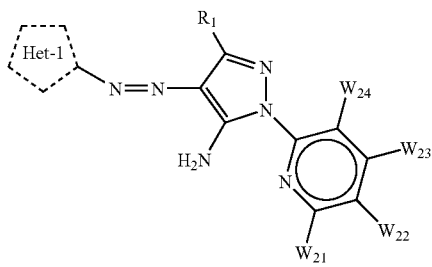

General formula (8)

wherein

R₁ represents a hydrogen or a substituent,

Het-1 represents a group selected from the aromatic heterocyclic groups represented by the general formula (2), provided that * in the general formula (2) shows the point of attachment to the azo linkage in the general formula (8), and W₂₁, W₂₂, W₂₃ and W₂₄ each independently represents a hydrogen or a substituent capable of binding to the 2-pyridine ring.

<10> The monoazo pigment, the tautomer of the monoazo pigment, and the salt or hydrate thereof according to any one of <1> to <9>, wherein the aromatic heterocyclic group represented by Het-1 is represented by the general formula (9):

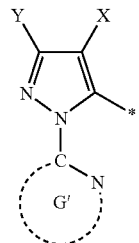

General formula (9)

wherein

Y represents a hydrogen or a substituent,

X represents an electron-withdrawing group having a Hammett's σp value of 0.2 or more, G' represents the non-metallic atoms necessary to complete a 5- to 6-membered heterocyclic group, provided that the nitrogen-containing heterocyclic group may be unsubstituted or may have a substituent, and may be a monocyclic ring or may have a condensed ring, and

* shows the point of attachment to the azo linkage.

<11> A pigment dispersion comprising:

at least one of the monoazo pigment, the tautomer of the monoazo pigment, and the salt or hydrate thereof described in any one of <1> to <10>.

<12> A coloring composition comprising:

at least one of the monoazo pigment, the tautomer of the monoazo pigment, and the salt or hydrate thereof described in any one of <1> to <10>.

<13> An ink composition for inkjet recording, comprising:

at least one of the monoazo pigment, the tautomer of the monoazo pigment, and the salt or hydrate thereof described in any one of <1> to <10>.

BEST MODE FOR CARRYING OUT THE INVENTION

Figure 1:
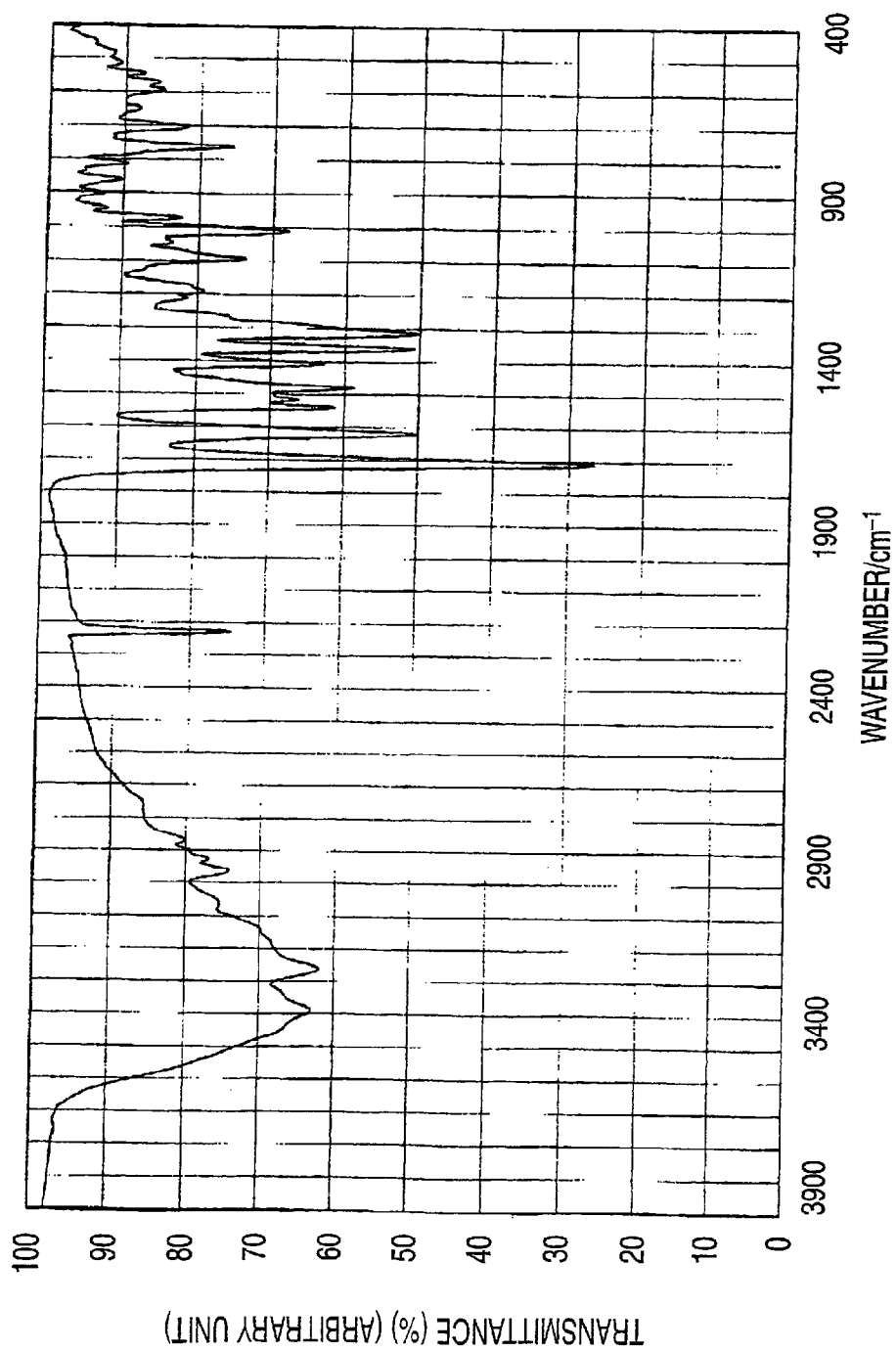
FIG. 1 shows the infrared absorption spectrum of the azo pigment (Pig.-5) synthesized according to Synthesis example 1.

The present invention will be described in detail below.

The Hammett substituent constant σp used in this specification will be described here. Hammett's rule is an empirical rule propounded by L. P. Hammett in 1935 in order to quantitatively deal with the influence of a substituent on the reaction and equilibrium of a benzene derivative, and the validity thereof has today been widely recognized. As the substituent constants determined in Hammett's rule, there are the σp value and the σm value. These constants are described in detail, for example, in Lange's Handbook of Chemistry, the 12th edition, edited by J. A. Dean, 1979 (McGraw-Hill) and Kagaku no Ryoiki (Journal of Japanese Chemistry), an extra issue, 122, 96-103 (1979), Nankodo, although they can be found in many general literatures. In the invention, each substituent is limited or described by the Hammett substituent constant σp. However, this does not mean that the substituent is limited to only a substituent having the constant known in the above-mentioned general literatures. Even when the constant is unknown in literatures, it goes without saying that a substituent having the constant that will be within the range when measured based on Hammett's rule is also included. Further, although the compounds of the invention represented by the general formulae (1) to (8) are not the benzene derivatives, the σp value is used as a measure indicating the electronic efficiency of the substituent, independently of the substituted position. In the invention, the σp value is used hereinafter in such a sense.

[Monoazo Pigments]

The monoazo pigments (hereinafter merely referred to as "azo pigments") in the invention are represented by the foregoing general formula (1).

The compounds represented by the general formula (1) are liable to cause intramolecular action of the colorant molecules due to their unique structure, have a low solubility in water or an organic solvent, and can be used as azo pigments.

As is different from dyes which are used in a state of being dissolved in a state of molecular dispersion by dissolving in water or an organic solvent, pigments are used in a state of solid particles such as molecular aggregate finely dispersed in a solvent The azo pigments represented by the general formula (1), the salts or hydrates of the azo pigments, and the tautomers thereof, will be described in detail below.

General formula (1)

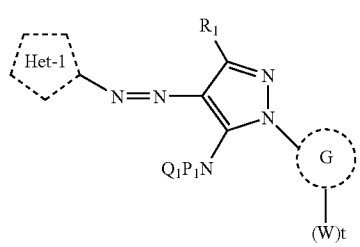

In the general formula (1), $R_1$, $P_1$, and $Q_1$ each independently represents a hydrogen or a substituent, G represents the non-metallic atoms necessary to complete a 5- to 6-membered heterocyclic group, W represents a substituent capable of binding to the heterocyclic group constituted by G, t represents an integer of from 0 to 5, Het-1 represents a group selected from the aromatic heterocyclic groups represented by the following general formula (2):

General formula (2)

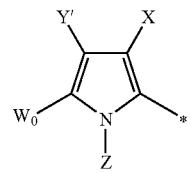 (1)

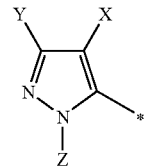 (2)

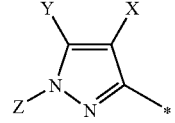 (3)

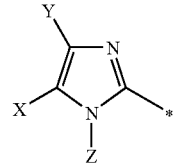 (4)

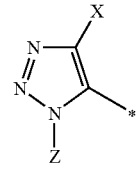 (5)

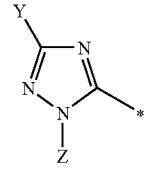 (6)

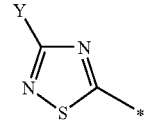 (7)

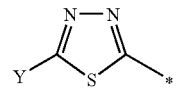 (8)

-continued

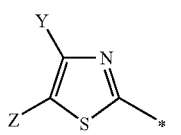

(9)

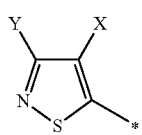

(10)

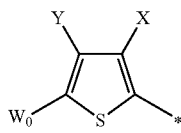

(11)

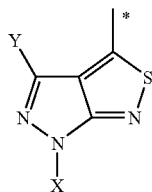

(12)

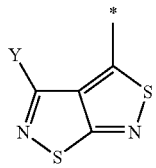

(13)

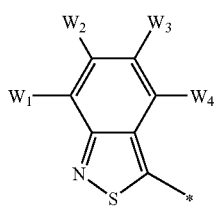

(14)

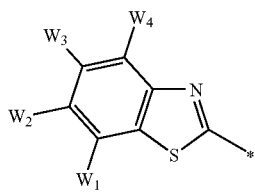

(15)

wherein

X, Y, Z, $W_0$, $W_1$, $W_2$, $W_3$, and $W_4$ each independently represents a hydrogen or a substituent, provided that * shows the point of attachment to the azo linkage in the general formula (1).

The general formula (1) will be described in more detail below.

In the general formula (1), the heterocyclic group represented by Het-1 represents a group selected from the aromatic heterocyclic groups represented by the general formula (2), and substituents on the hetero ring may further be bound to each other to form a condensed ring system. * shows the point of attachment to the azo linkage in the general formula (1).

As examples of the heterocyclic group, (1), (2), (3), (4), (5), (6), (7), (8), (9), (10), and (11) are preferred, (2), (5), (6), (7), (8), (9), and (10) are more preferred, (2), (5), (6), (7), and (10) are particularly preferred, and (2), (6), and (7) are most preferred.

X, Y, Z, $W_0$, $W_1$, $W_2$, $W_3$, and $W_4$ in the general formula (2) each independently represents a hydrogen or a substituent.

Examples of the substituent represented by X, Y, Z, $W_0$, $W_1$, $W_2$, $W_3$, or $W_4$ include a straight or branched alkyl group containing from 1 to 12 carbon atoms, a straight or branched aralkyl group containing from 7 to 18 carbon atoms, a straight or branched alkenyl group containing from 2 to 12 carbon atoms, a straight or branched alkynyl group containing from 2 to 12 carbon atoms, a straight or branched cycloalkyl group containing from 3 to 12 carbon atoms, a straight or branched cycloalkenyl group containing from 3 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, trifluoromethyl or cyclopentyl), a halogen atom (for example, a chlorine atom or a bromine atom), an aryl group (for example, phenyl, 4-t-butylphenyl or 2,4-di-t-amylphenyl), a hetero ring group (for example, imidazolynyl, pyrazolinyl, triazolinyl, 2-furyl, 2-thienyl, 2-pyrimidyl or 2-benzothiazolinyl), a cyano group, a hydroxyl group, a nitro group, a carboxy group, an amino group, an alkyloxy group (for example, methoxy, ethoxy, 2-methoxyethoxy or 2-methylsulfonylethoxy), an aryloxy group (for example, phenoxy, 2-methylphenoxy, 4-t-butylphenoxy, 3-nitrophenoxy, 3-t-butyloxycarbonylphenoxy or 3-methoxycarbonylphenyloxy), an acylamino group (for example, acetamido, benzoamido or 4-(3-t-butyl-4-hydroxyphenoxy)butanamido), an alkylamino group (for example, methylamino, butylamino, diethylamino or methylbutylamino), an arylamino group (for example, phenylamino or 2-chloroanilino), an ureido group (for example, phenylureido, methylureido or N,N-dibutylureido), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-t-octylphenylthio or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino or p-toluenesulfonylamino), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methylsulfonyl, octylsulfonyl, phenylsulfonyl or p-toluenesulfonyl), an alkyloxycarbonyl group (for example, methoxycarbonyl or butyloxycarbonyl), a hetero ring oxy group (for example, 1-phenyltetrazol-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imido group (for example, N-succinimido or N-phthalimido), a hetero ring thio group (for example, 2-benzothiazolylthio, 2,4-di-phenoxy-1,3,5-triazol-6-thio or 2-pyridylthio), a sulfinyl group (for example, 3-phenoxypropylsulfinyl), a phosphonyl group (for example, phenoxyphosphonyl, octyloxyphosphonyl or phosphonyl), an aryloxycarbonyl group (for example, phenoxycarbonyl), an acyl group (for example, acetyl, 3-phenylpropanoyl or benzoyl), and an ionic hydrophilic group (for example, a carboxyl group, a sulfo group, a phosphono group or a quaternary ammonium group).

In the case where the azo pigment of the invention contains the ionic hydrophilic group as a substituent, the pigment is preferably a salt with a polyvalent metal cation (for example, magnesium, calcium or barium), and is particularly preferably a lake pigment.

In the general formula (2), preferred examples of the substituents of X and $W_0$ are each independently electron-withdrawing groups, particularly electron-withdrawing groups having a Hammett substituent constant σp value of 0.20 or more, more preferably electron-withdrawing groups having a Hammett substituent constant σp value of 0.30 or more, with 1.0 being the upper limit.

Specific examples of X of the electron-withdrawing group having a σp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated alkoxy group, a halogenated aryloxy group, a halogenated alkylamino group, a halogenated alkylthio group, an aryl group substituted by other electron-withdrawing group having a σp value of 0.20 or more, a heterocyclic group, a halogen atom, an azo group or a selenocyanato group.

As preferred examples of the substituents of X and $W_0$, there are each independently illustrated an acyl group containing from 2 to 12 carbon atoms, an acyloxy group containing from 2 to 12 carbon atoms, a carbamoyl group containing from 1 to 12 carbon atoms, an alkyloxycarbonyl group containing from 2 to 12 carbon atoms, an aryloxycarbonyl group containing from 7 to 18 carbon atoms, a cyano group, a nitro group, an alkylsulfinyl group containing from 1 to 12 carbon atoms, an arylsulfinyl group containing from 6 to 18 carbon atoms, an alkylsulfonyl group containing from 1 to 12 carbon atoms, an arylsulfonyl group containing from 6 to 18 carbon atoms, a sulfamoyl group containing from 0 to 12 carbon atoms, a halogenated alkyl group containing from 1 to 12 carbon atoms, a halogenated alkyloxy group containing from 1 to 12 carbon atoms, a halogenated alkylthio group containing from 1 to 12 carbon atoms, a halogenated aryloxy group containing from 7 to 18 carbon atoms, an aryl group containing from 7 to 18 carbon atoms and being substituted by two or more other electron-withdrawing groups having a σp value of 0.20 or more, and a 5- to 8-membered heterocyclic group containing a nitrogen atom, an oxygen atom or a sulfur atom and containing from 1 to 18 carbon atoms.

More preferred are a cyano group, an alkylsulfonyl group containing from 1 to 12 carbon atoms, an arylsulfonyl group containing from 6 to 18 carbon atoms and a sulfamoyl group containing from 0 to 12 carbon atoms. Particularly preferred are a cyano group, an alkylsulfonyl group containing from 1 to 8 carbon atoms, an arylsulfonyl group containing from 6 to 12 carbon atoms, and a sulfamoyl group containing from 0 to 8 carbon atoms. Among them, a cyano group, a methanesulfonyl group, a phenylsulfonyl group and a sulfamoyl group are preferred, a cyano group and a methanesulfonyl group are still more preferred, and a cyano group is the most preferred.

Preferred examples of Z in the general formula (2) are a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, a substituted or unsubstituted heterocyclic group, a substituted or unsubstituted alkylsulfonyl group, a substituted or unsubstituted arylsulfonyl group, and an acyl group. Particularly preferred substituents are a substituted or unsubstituted aryl group, a substituted or unsubstituted heterocyclic group, a substituted or unsubstituted alkylsulfonyl group, a substituted or unsubstituted arylsulfonyl group, and an acyl group. Of these, a substituted or unsubstituted aryl group and a substituted or unsubstituted heterocyclic group are particularly preferred. As examples of the substituent, there can be illustrated the same ones that are illustrated with respect to X, Y, Z, $W_0$, $W_1$, $W_2$, $W_3$, and $W_4$ in the foregoing general formula (2).

As preferred examples of Y and $W_1$ to $W_4$ in the general formula (2), there are each independently illustrated a hydrogen, a substituted or unsubstituted alkyl group containing a total of from 1 to 12 carbon atoms, a substituted or unsubstituted aryl group containing a total of from 6 to 18 carbon atoms, and a substituted or unsubstituted heterocyclic group containing a total of from 4 to 12 carbon atoms. Of these, a hydrogen and a straight or branched alkyl group containing a total of from 1 to 8 carbon atoms are preferred, a hydrogen and an alkyl group containing from 1 to 8 carbon atoms are particularly preferred, and a hydrogen is the most preferred.

Preferred examples of $R_1$, $P_1$, $Q_1$, and W in the general formula (1) are described in detail below.

In the case where plural Ws exist, they each independently represents a substituent. $R_1$, $P_1$, and $Q_1$ each independently represents a hydrogen or a substituent.

In the case where $R_1$, $P_1$, $Q_1$, and W each represents a monovalent substituent, examples of the monovalent substituents each independently include a halogen, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (an alkylamino group or an arylamino group), an acylamino group (an amido group), an aminocarbonylamino group (a ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group, imido group, and a phosphoryl group, each of which may further have a substituent.

Particularly preferred examples of Ws are each independently a halogen, an alkyl group, an aryl group, a heterocyclic group, a cyano group, a hydroxyl group, an alkoxy group, an amido group, a ureido group, an alkylsulfonylamino group, an arylsulfonylamino group, a sulfamoyl group, an alkylsulfonyl group, an arylsulfonyl group, a carbamoyl group, and an alkoxycarbonyl group. Of these, a hydrogen, a halogen, an alkyl group, an aryl group, a cyano group, a hydroxyl group, an alkylsulfonyl group, an arylsulfonyl group, a heterocyclic group, and an alkoxycarbonyl group are particularly preferred, and an alkyl group, an aryl group, a hydroxyl group, and an alkoxycarbonyl group are the most preferred.

$R_1$, $P_1$, and $Q_1$ are each independently a hydrogen, a halogen, an alkyl group, an aryl group, a heterocyclic group, a cyano group, a hydroxyl group, an alkoxy group, an amido group, a ureido group, an alkylsulfonylamino group, an arylsulfonylamino group, a sulfamoyl group, an alkylsulfonyl group, an arylsulfonyl group, a carbamoyl group, and an alkoxycarbonyl group. Of these, a hydrogen, a halogen, an alkyl group, an aryl group, a cyano group, a hydroxyl group, an alkylsulfonyl group, an arylsulfonyl group, a heterocyclic group, and an alkoxycarbonyl group are particularly preferred, and a hydrogen, an alkyl group, an aryl group, a hydroxyl group, and an alkoxycarbonyl group are the most preferred.

$R_1$, $P_1$, $Q_1$, and W will be described in more detail below.

The halogen represented by $R_1$, $P_1$, $Q_1$, and W represents a chlorine, a bromine or an iodine. Of these, a chlorine or a bromine is preferred, with a chlorine being particularly preferred.

The alkyl group represented by $R_1$, $P_1$, $Q_1$, and W includes a substituted or unsubstituted alkyl group. The substituted or unsubstituted alkyl group is preferably an alkyl group containing from 1 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Among them, a hydroxyl group, an alkoxy group, a cyano group, a halogen, a sulfo group (optionally in the salt form thereof), and a carboxyl group (optionally in the salt form thereof) are preferred. Examples of the alkyl group include methyl, ethyl, n-propyl, i-propyl, n-butyl, i-butyl, s-butyl, t-butyl, n-octyl, eicosyl, 2-chloroethyl, hydroxyethyl, cyanoethyl, and 4-sulfobutyl.

The cycloalkyl group represented by $R_1$, $P_1$, $Q_1$, and W includes a substituted or unsubstituted cycloalkyl group. The substituted or unsubstituted cycloalkyl group is preferably a cycloalkyl group containing from 5 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the cycloalkyl group include cyclohexyl, cyclopentyl, and 4-n-dodecylcyclohexyl.

The aralkyl group represented by $R_1$, $P_1$, $Q_1$, and W includes a substituted or unsubstituted aralkyl group. The substituted or unsubstituted aralkyl group is preferably an aralkyl group containing from 7 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2): Examples of the aralkyl group include benzyl and 2-phenethyl.

The alkenyl group represented by $R_1$, $P_1$, $Q_1$, and W includes a straight, branched or cyclic, substituted or unsubstituted alkenyl group. Preferably, there can be illustrated a substituted or unsubstituted alkenyl group containing from 2 to 30 carbon atoms, for example, vinyl, allyl, prenyl, geranyl, oleyl, 2-cyclopenten-1-yl, and 2-cyclohexen-1-yl.

The alkynyl group represented by $R_1$, $P_1$, $Q_1$, and W includes a substituted or unsubstituted alkynyl group containing from 2 to 30 carbon atoms, for example, ethynyl and propargyl.

The aryl group represented by $R_1$, $P_1$, $Q_1$, and W includes a substituted or unsubstituted aryl group containing from 6 to 30 carbon atoms, for example, phenyl, p-tolyl, naphthyl, m-chlorophenyl, and o-hexadecanoylaminophenyl. As examples of the substituent, there can be illustrated the same substituents as have been illustrated with respect to X, Y, Z, $W_0$, $W_1$, $W_2$, $W_3$, and $W_4$ in the general formula (2).

The heterocyclic group represented by $R_1$, $P_1$, $Q_1$, and W is a monovalent group formed by removing one hydrogen from a 5- or 6-membered, substituted or unsubstituted, aromatic or non-aromatic heterocyclic compound, which may further be condensed with other ring. More preferably, the heterocyclic group is a 5- or 6-membered aromatic heterocyclic group containing from 3 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). To illustrate the heterocyclic group without restricting the substitution position, there can be illustrated a pyridine ring, a pyrazine ring, a pyridazine ring, a pyrimidine ring, a triazine ring, a quinoline ring, an isoquinoline ring, a quinazoline ring, a cinnoline ring, a phthalazine ring, a quinoxaline ring, a pyrrole ring, an indole ring, a furan ring, a benzofuran ring, a thiophene ring, a benzothiophene ring, a pyrazole ring, an imidazole ring, a benzimidazole ring, a triazole ring, an oxazole ring, a benzoxazole ring, a thiazole ring, a benzothiazole ring, an isothiazole ring, a benzoisothiazole ring, a thiadiazole ring, an isoxazole ring, a benzisoxazole ring, a pyrrolidine ring, a piperidine ring, a piperazine ring, an imidazole ring, and a thiazole ring.

The alkoxy group represented by $R_1$, $P_1$, $Q_1$, and W includes a substituted or unsubstituted alkoxy group. The substituted or unsubstituted alkoxy group is preferably an alkoxy group containing from 1 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the alkoxy group include methoxy, ethoxy, isopropoxy, n-octyloxy, methoxyethoxy, hydroxyethoxy, and 3-carboxypropoxy.

The aryloxy group represented by $R_1$, $P_1$, $Q_1$, and W is preferably a substituted or unsubstituted aryloxy group containing from 6 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the aryloxy group include phenoxy, 2-methylphenoxy, 4-t-butylphenoxy, 3-nitrophenoxy, and 2-tetradecanoylaminophenoxy.

The silyloxy group represented by $R_1$, $P_1$, $Q_1$, and W is preferably a silyloxy group containing from 3 to 20 carbon atoms, and examples thereof include trimethylsilyloxy and t-butyldimethylsilyloxy.

The heterocyclic oxy group represented by $R_1$, $P_1$, $Q_1$, and W is preferably a substituted or unsubstituted heterocyclic oxy group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the heterocyclic oxy group include 1-phenyltetrazol-5-oxy and 2-tetrahydropyranyloxy.

The acyloxy group represented by $R_1$, $P_1$, $Q_1$, and W is preferably a formyloxy group, a substituted or unsubstituted alkylcarbonyloxy group containing from 2 to 30 carbon atoms, or a substituted or unsubstituted arylcarbonyloxy group containing from 6 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the acyloxy group include formyloxy, acetyloxy, pivaloyloxy, stearoyloxy, benzoyloxy, and p-methoxyphenylcarbonyloxy.

The carbamoyloxy group represented by $R_1$, $P_1$, $Q_1$, and W is preferably a substituted or unsubstituted carbamoyloxy group containing from 1 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the carbamoyloxy group include N,N-dimethylcarbamoyloxy, N,N-diethylcarbamoyloxy, morpholinocarbonyloxy, N,N-di-n-octylaminocarbonyloxy, and N-n-octylcarbamoyloxy.

The alkoxycarbonyloxy group represented by $R_1$, $P_1$, $Q_1$, and W is preferably a substituted or unsubstituted alkoxycarbonyloxy group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the alkoxycarbonyloxy group include methoxycarbonyloxy, ethoxycarbonyloxy, t-butoxycarbonyloxy, and n-octylcarbonyloxy.

The aryloxycarbonyloxy group represented by $R_1$, $P_1$, $Q_1$, and W is preferably a substituted or unsubstituted aryloxycarbonyloxy group containing from 7 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the aryloxycarbonyloxy group include phenoxycarbonyloxy, p-methoxyphenoxycarbonyloxy, and p-n-hexadecyloxyphenoxycarbonyloxy.

The amino group represented by $R_1$, $P_1$, $Q_1$, and W is preferably a substituted or unsubstituted alkylamino group containing from 1 to 30 carbon atoms or a substituted or unsubstituted arylamino group containing from 6 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the amino group include amino, methylamino, dimethylamino, anilino, N-methyl-anilino, diphenylamino, hydroxyethylamino, carboxyethylamino, sulfoethylamino, and 3,5-dicarboxyanilino.

The acylamino group represented by $R_1$, $P_1$, $Q_1$, and W is preferably a formylamino group, a substituted or unsubstituted alkylcarbonylamino group containing from 1 to 30 carbon atoms, or a substituted or unsubstituted arylcarbonylamino group containing from 6 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the acylamino group include formylamino, acetylamino, pivaloylamino, lauroylamino, benzoylamino, and 3,4,5-tri-n-octyloxyphenylcarbonylamino.

The aminocarbonylamino group represented by $R_1$, $P_1$, $Q_1$, and W is preferably a substituted or unsubstituted aminocarbonylamino group containing from 1 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the aminocarbonylamino group include carbamoylamino, N,N-dimethylaminocarbonylamino, N,N-diethylaminocarbonylamino, and morpholinocarbonylamino.

The alkoxycarbonylamino group represented by $R_1$, $P_1$, $Q_1$, and W is preferably a substituted or unsubstituted alkoxycarbonylamino group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the alkoxycarbonylamino group include methoxycarbonylamino, ethoxycarbonylamino, t-butoxycabonylamino, n-octadecyloxycarbonylamino, and N-methyl-methoxycarbonylamino.

The aryloxycarbonylamino group represented by $R_1$, $P_1$, $Q_1$, and W is preferably a substituted or unsubstituted ayloxycarbonylamino group containing from 7 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the aryloxycarbonylamino group include phenoxycarbonylamino, p-chlorophenoxycarbonylamino, and m-n-octyloxyphenoxycarbonylamino.

The sulfamoylamino group represented by $R_1$, $P_1$, $Q_1$, and W is preferably a substituted or unsubstituted sulfamoylamino group containing from 0 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the sulfamoylamino group include sulfamoylamino, N,N-dimethylaminosulfonylamino, and N-n-octylaminosulfonylamino.

The alkyl or arylsulfonylamino group represented by $R_1$, $P_1$, $Q_1$, and W is preferably a substituted or unsubstituted alkylsulfonylamino group containing from 1 to 30 carbon atoms or a substituted or unsubstituted arylsulfonylamino group containing from 6 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the alkylsulfonylamino group and the arylsulfonylamino group include methylsulfonylamino, butylsulfonylamino, phenylsulfonylamino, 2,3,5-trichlorophenylsulfonylamino, and p-methylphenylsulfonylamino.

The alkylthio group represented by $R_1$, $P_1$, $Q_1$, and W is preferably a substituted or unsubstituted alkylthio group containing from 1 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the alkylthio group include methylthio, ethylthio, and n-hexadecylthio.

The arylthio group represented by $R_1$, $R_2$, $P_1$, $P_2$, $Q_1$, $Q_2$, and W is preferably a substituted or unsubstituted arylthio group containing from 6 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the arylthio group include phenylthio, p-chlorophenylthio, and m-methoxyphenylthio.

The heterocyclic thio group represented by $R_1$, $R_2$, $P_1$, $P_2$, $Q_1$, $Q_2$, and W is preferably a substituted or unsubstituted heterocyclic thio group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the heterocyclic thio group include 2-benzothiazolylthio and 1-phenyltetrazol-5-ylthio.

The sulfamoyl group represented by $R_1$, $P_1$, $Q_1$, and W is preferably a substituted or unsubstituted sulfamoyl group containing from 0 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the sulfamoyl group include N-ethylsulfamoyl, N-(3-dodecyloxypropyl)sulfamoyl, N,N-dimethylsulfamoyl, N-acetylsulfamoyl, N-benzoylsulfamoyl, and N—(N'-phenylcarbamoyl)sulfamoyl).

The alkyl or arylsulfinyl group represented by $R_1$, $P_1$, $Q_1$, and W is preferably a substituted or unsubstituted alkylsulfinyl group containing from 1 to 30 carbon atoms or a substituted or unsubstituted arylsulfinyl group containing from 6 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the alkyl and arylsulfinyl group include methylsulfinyl, ethylsulfinyl, phenylsulfinyl, and p-methylphenylsulfinyl.

The alkyl or arylsulfonyl group represented by $R_1$, $P_1$, $Q_1$, and W is preferably a substituted or unsubstituted alkylsulfonyl group containing from 1 to 30 carbon atoms or a substituted or unsubstituted arylsulfonyl group containing from 6 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the alkyl and arylsulfonyl group include methylsulfonyl, ethylsulfonyl, phenylsulfonyl, and p-toluenesulfonyl.

The acyl group represented by $R_1$, $P_1$, $Q_1$, and W is preferably a formyl group, a substituted or unsubstituted alkylcarbonyl group containing from 2 to 30 carbon atoms, a substituted or unsubstituted arylcarbonyl group containing from 7 to 30 carbon atoms, or a heterocyclic carbonyl group containing from 4 to 30 carbon atoms wherein the hetero ring is bound to the carbonyl group through a carbon atom. As examples of the substituent, there can be illustrated the same substituents as have been illustrated with respect to X, Y, Z, $W_0$, $W_1$, $W_2$, $W_3$, and $W_4$ in the general formula (2). Examples of the acyl group include acetyl, pivaloyl, 2-chloroacetyl, stearoyl, benzoyl, p-n-octyloxyphenylcarbonyl, 2-pyridylcarbonyl, and 2-furylcarbonyl.

The aryloxycarbonyl group represented by $R_1$, $P_1$, $Q_1$, and W is preferably a substituted or unsubstituted aryloxycarbonyl group containing from 7 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the aryloxycarbonyl group include phenoxycarbonyl, o-chlorophenoxycarbonyl, m-nitrophenoxycarbonyl, and p-t-butylphenoxycarbonyl.

The alkoxycarbonyl group represented by $R_1$, $P_1$, $Q_1$, and W is preferably a substituted or unsubstituted alkoxycarbonyl group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the alkoxycarbonyl group include methoxycarbonyl, ethoxycarbonyl, t-butoxycarbonyl, and n-octadecyloxycarbonyl.

The carbamoyl group represented by $R_1$, $P_1$, $Q_1$, and W is preferably a substituted or unsubstituted carbamoyl group containing from 1 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the carbamoyl group include carbamoyl, N-methylcarbamoyl, N,N-dimethylcarbamoyl, N,N-di-n-octylcarbamoyl, and N-(methylsulfonyl)carbamoyl.

The phosphino group represented by $R_1$, $P_1$, $Q_1$, and W is preferably a substituted or unsubstituted phosphino group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the phosphino group include dimethylphosphino, diphenylphosphino, and methylphenylphosphino.

The phosphinyl group represented by $R_1$, $P_1$, $Q_1$, and W is preferably a substituted or unsubstituted phosphinyl group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the phosphinyl group include phosphinyl, dioctyloxyphosphinyl, and diethoxyphosphinyl.

The phosphinyloxy group represented by $R_1$, $P_1$, $Q_1$, and W is preferably a substituted or unsubstituted phosphinyloxy group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the phosphinyloxy group include diphenoxyphosphinyloxy and dioctyloxyphosphinyloxy.

The phosphinylamino group represented by $R_1$, $P_1$, $Q_1$, and W is preferably a substituted or unsubstituted phosphinylamino group containing from 2 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the phosphinylamino group include dimethoxyphosphinylamino and dimethylaminophosphinylamino.

The silyl group represented by $R_1$, $P_1$, $Q_1$, and W is preferably a substituted or unsubstituted silyl group containing from 3 to 30 carbon atoms. As examples of the substituent, there can be illustrated the same substituents as have been illustrated with respect to X, Y, Z, $W_0$, $W_1$, $W_2$, $W_3$, and $W_4$ in the general formula (2). Examples of the silyl group include trimethylsilyl, t-butyldimethylsilyl, and phenyldimethylsilyl.

Examples of the azo group represented by $R_1$, $P_1$, $Q_1$, and W include phenylazo, 4-methoxyphenylazo, 4-pivaloylaminophenylazo, and 2-hydroxy-4-propanoylphenylazo.

Examples of the imido group represented by $R_1$, $P_1$, $Q_1$, and W include N-succinimido and N-phthalimido.

The phosphoryl group represented by $R_1$, $P_1$, $Q_1$, and W include a phosphoryl group having a substituent and an unsubstituted phosphoryl group. Examples of the phosphoryl group include a phenoxyphosphoryl group and a phenylphosphoryl group.

The ionic hydrophilic group represented by $R_1$, $P_1$, $Q_1$, and W include a sulfo group, a carboxyl group, a phosphono group, and a quaternary ammonium group. As the ionic hydrophilic group, a carboxyl group and a sulfo group are preferred. The carboxyl group and the sulfo group may be in the salts form thereof. Examples of the counter ion forming the salt include an ammonium ion, an alkali metal ion (for example, calcium ion or barium ion), and an organic cation (for example, tetramethylguanidium ion).

In the case where $R_1$, $P_1$, $Q_1$, and W each represents a divalent group, the divalent group is preferably an alkylene group (for example, methylene, ethylene, propylene, butylene or pentylene), an alkenylene group (for example, ethenylene or propenylene), an alkynylene group (for example, ethynylene or propynylene), an arylene group (for example, phenylene or naphthylene), a divalent heterocyclic group (for example, a 6-chloro-1,3,5-triazine-2,4-diyl group, a pyrimidine-2,4-diyl group, a pyrimidine-4,6-diyl group, a quinoxaline-2,3-diyl group, a pyridazine-3,6-diyl group, —O—, —CO—, —NR'— (wherein R' represents a hydrogen, an alkyl group or an aryl group), —S—, —SO$_2$—, —SO—, or a combination thereof (for example, —NHCH$_2$CH$_2$NH— or —NHCONH—).

The alkylene group, alkenylene group, alkynylene group, arylene group, divalent heterocyclic group, and the alkyl or aryl group of R may have a substituent.

As examples of the substituent, there can be illustrated the same substituents as have been illustrated with respect to X, Y, Z, $W_0$, $W_1$, $W_2$, $W_3$, and $W_4$ in the general formula (2).

The alkyl group and the aryl group of R' described above are the same as the substituent examples having been illustrated with respect to the case where $R_1$, $P_1$, $Q_1$, and W each represents an alkyl group or an aryl group.

More preferably, the divalent group is an alkylene group containing 10 or less carbon atoms, an alkenylene group containing 10 or less carbon atoms, an alkynylene group containing 10 or less carbon atoms, an arylene group containing from 6 to 10 carbon atoms, a divalent heterocyclic group, —S—, —SO—, —SO$_2$— or a combination thereof (for example, —SCH$_2$CH$_2$S— or —SCH$_2$CH$_2$CH$_2$S—).

The divalent linking group contains a total of preferably from 0 to 50 carbon atoms, more preferably from 0 to 30 carbon atoms, most preferably from 0 to 10 carbon atoms.

In the case where R$_1$, P$_1$, Q$_1$, and W each represents a trivalent group, the trivalent group is preferably a trivalent hydrocarbon group, a trivalent heterocyclic group, >N— or a combination thereof with a divalent group (for example, >NCH$_2$CH$_2$NH— or >NCONH—).

The trivalent linking group contains a total of preferably from 0 to 50 carbon atoms, more preferably from 0 to 30 carbon atoms, most preferably from 0 to 10 carbon atoms.

In the general formula (1), t represents an integer of from 0 to 5, preferably from 0 to 2, more preferably 1 or 2, most preferably 2.

Preferred examples of the 5- to 6-membered heterocyclic group constituted by G in the general formula (1) are 5- or 6-membered, substituted or unsubstituted, aromatic or non-aromatic heterocyclic groups, which may be further condensed with other ring. More preferred are 5- or 6-membered aromatic heterocyclic groups containing from 3 to 30 carbon atoms.

To illustrate the heterocyclic group represented by G without restricting substitution positions, there can be illustrated a pyridine ring, a pyrazine ring, a pyridazine ring, a pyrimidine ring, a triazine ring, a quinoline ring, an isoquinoline ring, a quinazoline ring, a cinnoline ring, a phthalazine ring, a quinoxaline ring, a pyrrole ring, an indole ring, a furan ring, a benzofuran ring, a thiophene ring, a benzothiophene ring, a pyrazole ring, an imidazole ring, a benzimidazole ring, a triazole ring, an oxazole ring, a benzoxazole ring, a thiazole ring, a benzothiazole ring, an isothiazole ring, a benzisothiazole ring, a thiadiazole ring, an isoxazole ring, a benzisoxazole ring, a pyrrolidine ring, a piperidine ring, a piperazine ring, an imidazoline ring, a thiazoline ring, and a sulfolane ring.

More preferred are a pyridine ring, a pyrazine ring, a pyrimidine ring, a pyridazine ring, and a triazine ring. Of them, a pyridine ring, a pyrimidine ring, and a triazine ring are preferred, with a 2-pyridine ring, a 2,4-pyrimidine ring, and an s-triazine ring being most preferred.

Of them, particularly preferred heterocyclic groups are those which are represented by the following general formula (4):

General formula (4)

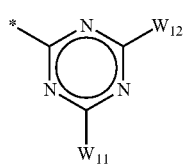

(a)

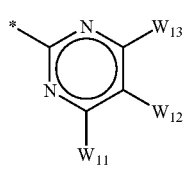

(b)

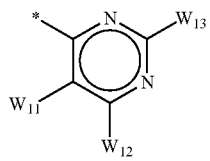

(c)

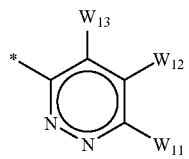

(d)

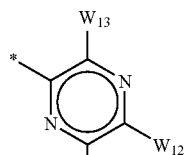

(e)

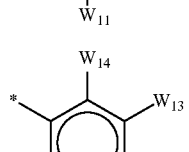

(f)

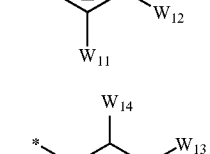

(g)

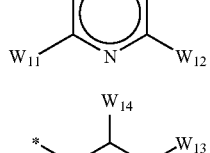

(h)

wherein W$_{11}$, W$_{12}$, W$_{13}$, and W$_{14}$ each independently represents a hydrogen or a substituent capable of binding to the heterocyclic group, and * shows the point of attachment to the N atom on the pyrazole ring in the general formula (1) or (3).

In the case where the heterocyclic group constituted by G is a group which can further have a substituent, there can be illustrated, as examples of the substituent, the same substituents as have been illustrated with respect to X, Y, Z, W$_0$, W$_1$, W$_2$, W$_3$, and W$_4$ in the general formula (2) or the same substituents as have been illustrated with respect to the case where the heterocyclic group represented by the general formula (2) can further have a substituent.

With respect to a preferred combination of the substituents in the pigment of the invention represented by the general formula (1), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (1) contain the following (a) to (k).

(a) G is preferably a 5- or 6-membered, nitrogen-containing heterocyclic group, particularly preferably an s-triazine ring, a pyrimidine ring, a pyridazine ring, a pyrazine ring, a pyridine ring, an imidazole ring, a pyrazole ring, or a pyrrole ring. Of these, an s-triazine ring, a pyridine ring, a pyrimidine ring, and a pyridazine ring are preferred, with a 2-pyridine ring, a 2,4-pyrimidine ring, and an s-triazine ring being most preferred.

(b) W is preferably a hydroxyl group, a cyano group, a substituted or unsubstituted carbamoyl group, a substituted or unsubstituted amino group, a substituted or unsubstituted alkoxy group, a substituted or unsubstituted aryloxy group, a substituted or unsubstituted alkylthio group, a substituted or unsubstituted arylthio group, or a carbonyl group (—CO—), particularly preferably a hydroxyl group, a substituted or unsubstituted amino group, a substituted or unsubstituted alkoxy group, a substituted or unsubstituted alkylthio group, or a carbonyl group, with a hydroxyl group and a substituted amino group being most preferred.

(c) t represents an integer of from 0 to 5, preferably from 0 to 2, more preferably 1 or 2, most preferably 2.

(d) Preferably, $R_1$ is a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a straight or branched alkyl group containing a total of from 1 to 8 carbon atoms is preferred, and a methyl group and a sec- or tert-alkyl group are preferred, with a methyl group and a t-butyl group being most preferred.

(e) Preferably, $P_1$ and $Q_1$ each independently represents a hydrogen, a substituted or unsubstituted alkyl group, a substituted or unsubstituted acyl group, a substituted or unsubstituted alkylsulfonyl group, or a substituted or unsubstituted arylsulfonyl group. Particularly preferred are a hydrogen, a substituted or unsubstituted alkyl group, and a substituted or unsubstituted acyl group. More preferably, at least one of $P_1$ and $Q_1$ is a hydrogen and, most preferably, both of them are hydrogen.

(f) Preferably, Het-1 is selected from the aromatic heterocyclic groups (1) to (15) represented by the general formula (2). Of them, (1), (2), (3), (4), (5), (6), (7), (8), (9), (10), and (11) are preferred, (2), (5), (6), (7), (8), (9), and (10) are particularly preferred, (2), (5), (6), (7), and (10) are more preferred, and (2), (6) and (7) are most preferred.

(g) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(h) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen and a methyl group being most preferred.

(i) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, particularly preferably a substituted or unsubstituted heterocyclic group. Of them, a nitrogen-containing, substituted or unsubstituted heterocyclic group is particularly preferred.

(j) $W_0$ is particularly preferably a cyano group, an alkylsulfonyl group containing from 1 to 12 carbon atoms, an arylsulfonyl group containing from 6 to 18 carbon atoms, or a sulfamoyl group containing from 0 to 12 carbon atoms. Of them, a cyano group, a methanesulfonyl group, and a phenylsulfonyl group are preferred, with a cyano group being most preferred.

(k) $W_1$ to $W_4$ each is preferably a hydrogen, a substituted or unsubstituted alkyl group containing a total of from 1 to 12 carbon atoms, a substituted or unsubstituted aryl group containing from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, a hydrogen and an alkyl group containing from 1 to 8 carbon atoms are more preferred, and a hydrogen is most preferred.

Of the azo pigments represented by the general formula (1), the tautomers of the azo pigments, and the salts or hydrates thereof, those azo pigments which are represented by the general formula (3), the tautomers of the azo pigments, and the salts or hydrates thereof are preferred.

The invention also includes in its scope tautomers of the azo pigments represented by the general formulae (1) and (3).

Although the general formulae (1) and (3) are shown in the form of limited structure among several tautomer forms which are possible in view of chemical structure, the azo pigments may be tautomers of other structure than the shown one, and may be used as a mixture containing plural tautomers. For example, with the pigment represented by the general formula (3), azo-hydrazone tautomers represented by the general formula (3') can be considered.

The invention includes in its scope tautomers represented by the general formula (3') of the azo pigments represented by the general formula (3).

The general formulae (3) and (3') will be described in detail below.

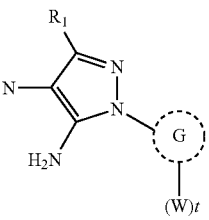

General formula (3)

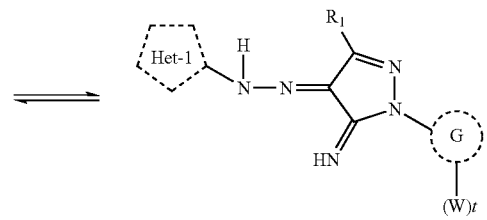

General formula (3')

In the general formulae (3) and (3'), $R_1$, G, W, t and Het-1 each is independently the same as $R_1$, G, W, t and Het-1 in the general formula (1), provided that * shows the point of attachment to the azo linkage in the general formula (3).

$R_1$, G, W, t, and Het-1 will be described in more detail below.

Examples of the substituent $R_1$ are the same as those of $R_1$ in the general formula (1), and preferred examples thereof are also the same as described there.

Examples of the substituent G are the same as those of G in the general formula (1), and preferred examples thereof are also the same as described there.

Examples of the substituent W are the same as those of W in the general formula (1), and preferred examples thereof are also the same as described there.

Examples of t are the same as those of t in the general formula (1), and preferred examples thereof are also the same as described there.

Examples of the heterocyclic group represented by Het-1 are the same as those of each of Het-1 in the general formula (1), and preferred examples thereof are also the same as described there.

With respect to a preferred combination of the substituents in the pigment of the invention represented by the general formulae (3) and (3'), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments and hydrazone pigments of the invention represented by the general formulae (3) and (3') contain the following (a) to (k).

(a) G is preferably a 5- or 6-membered, nitrogen-containing heterocyclic group, particularly preferably an s-triazine ring, a pyrimidine ring, a pyridazine ring, a pyrazine ring, a pyridine ring, an imidazole ring, a pyrazole ring, or a pyrrole ring. Of these, an s-triazine ring, a pyrimidine ring, and a pyridazine ring are preferred, with a 2-pyridine ring, a 2,4-pyrimidine ring, and an s-triazine ring being most preferred.

(b) W is preferably a hydroxyl group, a cyano group, a substituted or unsubstituted carbamoyl group, a substituted or unsubstituted amino group, a substituted or unsubstituted alkoxy group, a substituted or unsubstituted aryloxy group, a substituted or unsubstituted alkylthio group, a substituted or unsubstituted arylthio group, or a carbonyl group (—CO—), particularly preferably a hydroxyl group, a substituted or unsubstituted amino group, a substituted or unsubstituted alkoxy group, a substituted or unsubstituted alkylthio group, or a carbonyl group, with a hydroxyl group and a substituted amino group being most preferred.

(c) t represents an integer of from 0 to 5, preferably from 0 to 2, more preferably 1 or 2, most preferably 2.

(d) Preferably, $R_1$ is a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a straight or branched alkyl group containing a total of from 1 to 8 carbon atoms is preferred, and a methyl group and a sec- or tert-alkyl group are preferred, with a methyl group and a t-butyl group being most preferred.

(e) Preferably, Het-1 is selected from the aromatic heterocyclic groups (1) to (15) represented by the general formula (2). Of them, (1), (2), (3), (4), (5), (6), (7), (8), (9), (10), and (11) are preferred, (2), (5), (6), (7), (8), (9), and (10) are particularly preferred, (2), (5), (6), (7), and (10) are more preferred, and (2), (6) and (7) are most preferred.

(f) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(g) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen being most preferred.

(h) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, particularly preferably a substituted or unsubstituted heterocyclic group. Of them, a nitrogen-containing, substituted or unsubstituted heterocyclic group is particularly preferred.

(i) $W_0$ is particularly preferably a cyano group, an alkylsulfonyl group containing from 1 to 12 carbon atoms, an arylsulfonyl group containing from 6 to 18 carbon atoms, or a sulfamoyl group containing from 0 to 12 carbon atoms. Of them, a cyano group, a methanesulfonyl group, and a phenylsulfonyl group are preferred, with a cyano group being most preferred.

(j) $W_1$ to $W_4$ each is preferably a hydrogen, a substituted or unsubstituted alkyl group containing a total of from 1 to 12 carbon atoms, a substituted or unsubstituted aryl group containing from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, a hydrogen and an alkyl group containing from 1 to 8 carbon atoms are more preferred, and a hydrogen is most preferred.

(k) As to the mother nucleus of the pigment, it is preferred that, of the azo pigment and/or hydrazone pigment, the azo pigment constitutes the major component and, of the azo pigment mother nucleus, a single crystal form mother nucleus is most preferred.

Of the azo pigments represented by the general formulae (1) and (3), those azo pigments which are represented by the general formula (5) are preferred.

The azo pigments represented by the general formula (5), the tautomers of the azo pigments, and the salts or hydrates thereof will be described in detail below.

General formula (5)

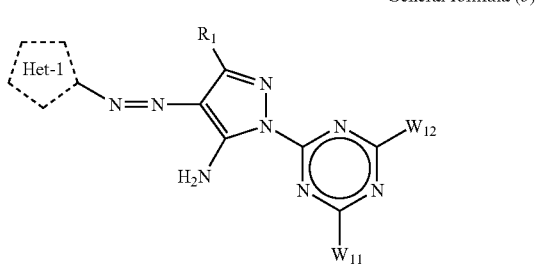

In the general formula (5), $R_1$ and Het-1 each is independently the same as $R_1$ and Het-1 in the general formula (3), provided that * shows the point of attachment to the azo linkage in the general formula (5). $W_{11}$ and $W_{12}$ each represents a hydrogen or a substituent capable of binding to the s-triazine ring.

$R_1$, $W_{11}$, $W_{12}$, and Het-1 will be described in more detail below.

Examples of the substituent $R_1$ is the same as those of $R_1$ in the general formula (3), and preferred examples thereof are also the same as described there.

Examples of $W_{11}$ and $W_{12}$ are the same as those of W in the general formula (3), and preferred examples thereof are also the same as described there.

Examples of the heterocyclic group represented by Het-1 are the same as those of Het-1 in the general formula (3), and preferred examples thereof are also the same as described there.

With respect to a preferred combination of the substituents in the pigment of the invention represented by the general formula (5), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (5) contain the following (a) to (h).

(a) $W_{11}$ and $W_{12}$ each independently is preferably a hydrogen, a hydroxyl group, a substituted or unsubstituted amino group, a substituted or unsubstituted alkoxy group, a substituted or unsubstituted aryloxy group, a substituted or unsubstituted alkylthio group, or a substituted or unsubstituted arylthio group and, particularly preferably, a hydrogen, a hydroxyl group, a substituted or unsubstituted amino group, a substituted or unsubstituted alkoxy group, or a substituted or unsubstituted alkylthio group. Of these, a hydrogen, a hydroxyl group, and a substituted amino group are most preferred.

(b) $R_1$ is preferably a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a straight or branched alkyl group containing a total of from 1 to 8 carbon atoms is preferred, and a methyl group and a sec- or tert-alkyl group are particularly preferred, with a methyl group and a t-butyl group being most preferred.

(c) Preferably, Het-1 is selected from the aromatic heterocyclic groups (1) to (15) represented by the general formula (2). Of them, (1), (2), (3), (4), (5), (6), (7), (8), (9), (10), and (11) are preferred, (2), (5), (6), (7), (8), (9), and (10) are particularly preferred, (2), (5), (6), (7), and (10) are more preferred, and (2), (6) and (7) are most preferred.

(d) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(e) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen being most preferred.

(f) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, particularly preferably a substituted or unsubstituted heterocyclic group. Of them, a nitrogen-containing, substituted or unsubstituted heterocyclic group is particularly preferred.

(g) $W_0$ is particularly preferably a cyano group, an alkylsulfonyl group containing from 1 to 12 carbon atoms, an arylsulfonyl group containing from 6 to 18 carbon atoms, or a sulfamoyl group containing from 0 to 12 carbon atoms. Of them, a cyano group, a methanesulfonyl group, and a phenylsulfonyl group are preferred, with a cyano group being most preferred.

(h) $W_1$ to $W_4$ each is preferably a hydrogen, a substituted or unsubstituted alkyl group containing a total of from 1 to 12 carbon atoms, a substituted or unsubstituted aryl group containing from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, a hydrogen and an alkyl group containing from 1 to 8 carbon atoms are more preferred, and a hydrogen is most preferred.

Also, as the tautomer of the compound represented by the general formula (5), there exists a atructure called hydrazone form, which is a tautomer at the azo group (—N=N—) portion of the azo colorant structure. Likewise, in the case where a hydroxyl group is contained in the compound represented by the general formula (1) as a substituent, tautomerism between an enol structure (—OH) and a keto structure (>C=O) exists, if possible.

The azo pigment represented by the general formula (5) is preferably an azo pigment represented by the following general formula (6).

The azo pigments represented by the general formula (6), the tautomers of the azo pigments, and the salts or hydrates thereof will be described in detail below.

General formula (6)

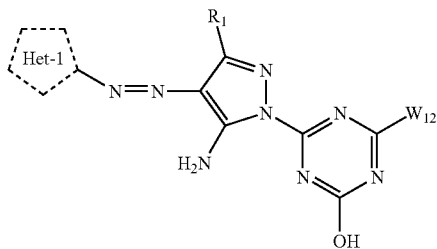

In the general formula (6), $R_1$ represents a hydrogen or a monovalent substituent. Het-1 is the same as Het-1 in the general formula (6), provided that * shows the point of attachment to the azo linkage in the general formula (6). $W_{12}$ represents a hydrogen or a substituent capable of binding to the s-triazine ring.

$R_1$ and Het-1 will be described in more detail below.

Examples of the substituent $R_1$ are the same as those of $R_1$ in the general formula (5), and preferred examples thereof are also the same as described there.

Examples of the heterocyclic group represented by Het-1 are the same as those of Het-1 in the general formula (5), and preferred examples thereof are also the same as described there.

Examples of the substituent $W_{12}$ are preferably a hydrogen, a hydroxyl group, a substituted or unsubstituted amino group, a substituted or unsubstituted alkoxy group, a substituted or unsubstituted aryloxy group, a substituted or unsubstituted alkylthio group and a substituted or unsubstituted arylthio group, particularly preferably a hydrogen, a hydroxyl group, a substituted or unsubstituted amino group, a substituted or unsubstituted alkoxy group and a substituted or unsubstituted alkylthio group, further preferably a hydrogen, a hydroxyl group, an amino group, a methylamino group, an anilino group and a methoxy group, and, of these most preferably a hydrogen and a hydroxyl group.

With respect to a preferred combination of the substituents in the pigment of the invention represented by the general formula (6), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (6) contain the following (a) to (h).

(a) $W_{12}$ is preferably a hydroxyl group, a substituted or unsubstituted amino group, a substituted or unsubstituted alkoxy group, a substituted or unsubstituted aryloxy group, a substituted or unsubstituted alkylthio group, or a substituted or unsubstituted arylthio group and, particularly preferably, a hydroxyl group, a substituted or unsubstituted amino group, a substituted or unsubstituted alkoxy group, or a substituted or unsubstituted alkylthio group. Of these, a hydroxyl group and a substituted amino group are most preferred.

(b) $R_1$ is preferably a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a straight or branched alkyl group containing a total of from 1 to 8 carbon atoms is preferred, and a methyl group and a sec- or tert-alkyl group are particularly preferred, with a methyl group and a t-butyl group being most preferred.

(c) Preferably, Het-1 is selected from the aromatic heterocyclic groups (1) to (15) represented by the general formula (2). Of them, (1), (2), (3), (4), (5), (6), (7), (8), (9), (10), and (11) are preferred, (2), (5), (6), (7), (8), (9), and (10) are particularly preferred, (2), (5), (6), (7), and (10) are more preferred, and (2) and (7) are most preferred.

(d) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(e) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen being most preferred.

(f) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, particularly preferably a substituted or unsubstituted heterocyclic group. Of them, a nitrogen-containing, substituted or unsubstituted heterocyclic group is particularly preferred.

(g) $W_0$ is particularly preferably a cyano group, an alkylsulfonyl group containing from 1 to 12 carbon atoms, an arylsulfonyl group containing from 6 to 18 carbon atoms, or a sulfamoyl group containing from 0 to 12 carbon atoms. Of them, a cyano group, a methanesulfonyl group, and a phenylsulfonyl group are preferred, with a cyano group being most preferred.

(h) $W_1$ to $W_4$ each is preferably a hydrogen, a substituted or unsubstituted alkyl group containing a total of from 1 to 12 carbon atoms, a substituted or unsubstituted aryl group containing from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, a hydrogen and an alkyl group containing from 1 to 8 carbon atoms are more preferred, and a hydrogen is most preferred.

In view of dispersibility of pigments, with the azo pigments represented by the foregoing general formulae (1), (3), (5), and (6), a peak absorption intensity in the range of from 1700 to 1730 cm$^{-1}$ in the IR absorption spectrum is preferably ⅓ or less of a peak absorption intensity in the range of from 1620 to 1670 cm$^{-1}$. More preferably, λmax exists between 400 and 480 nm, and, most preferably, the above-mentioned absorption intensity ratio is 1/5 or less.

The invention includes tautomers of the azo pigments represented by the general formulae (1), (3), (5), and (6). Each of the general formulae of (1), (3), (5), and (6) is shown in the limited structural formula selected from among several tautomers possible in view of chemical structure. However, the pigments may be in other tautomer structures than the descried ones, and may be used as a mixture of plural tautomers.

For example, with pigments represented by the general formula (6), azo-hydrazone tautomers represented by the following general formula (6') possibly exist.

The invention include in its scope compounds represented by the following general formula (6'), which are tautomers of the azo pigments represented by the general formula (6).

The general formulae (6') to (6''') will be described in detail below.

formulae (6') to (6'''), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formulae (6') to (6''') contain the following (a) to (h).

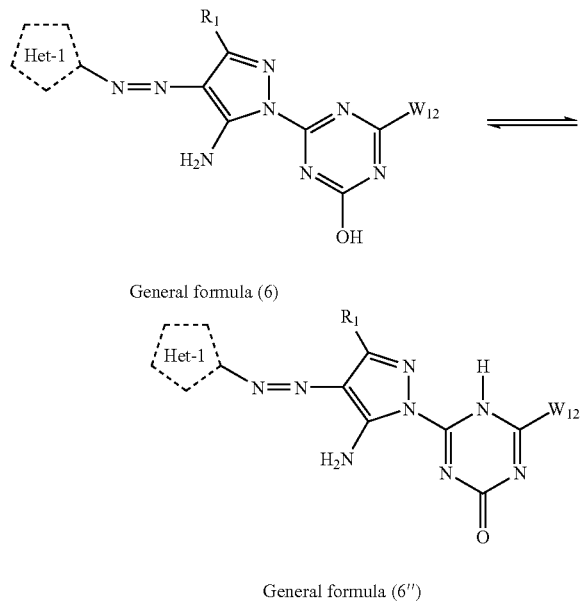

General formula (6)

General formula (6'')

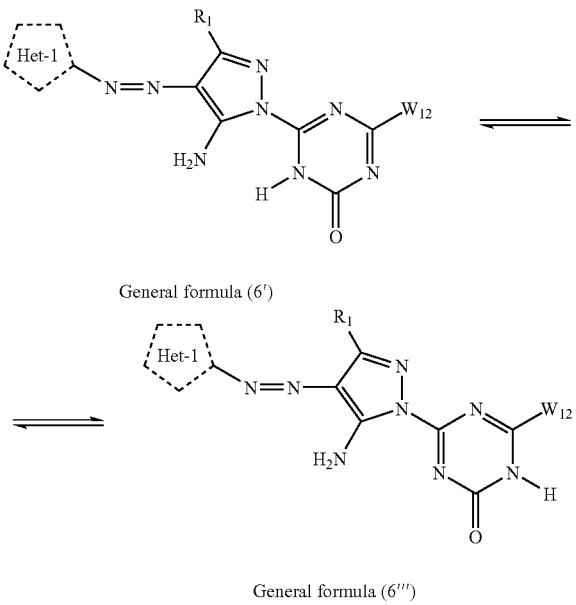

General formula (6')

General formula (6''')

In the general formulae (6') to (6'''), $R_1$ represents a hydrogen or a monovalent substituent, Het-1 is the same as defined with respect to Het-1 represented by the general formula (5), $W_{12}$ represents a hydrogen or a substituent capable of binding to the s-triazine ring, and * shows the point to the azo linkage in the general formulae (6') to (6''').

$R_1$ and Het-1 will be described in more detail below.

Examples of the substituent $R_1$ are the same as those of $R_1$ in the general formula (5), and preferred examples thereof are also the same as described there.

Examples of the heterocyclic group represented by Het-1 are the same as those of Het-1 in the general formula (5), and preferred examples thereof are also the same as described there.

Examples of the substituent $W_{12}$ are preferably a hydrogen, a hydroxyl group, a substituted or unsubstituted amino group, a substituted or unsubstituted alkoxy group, a substituted or unsubstituted aryloxy group, a substituted or unsubstituted alkylthio group and a substituted or unsubstituted arylthio group, particularly preferably a hydrogen, a hydroxyl group, a substituted or unsubstituted amino group, a substituted or unsubstituted alkoxy group and a substituted or unsubstituted alkylthio group, further preferably a hydrogen, a hydroxyl group, an amino group, a methylamino group, an anilino group and a methoxy group, and, of these most preferably a hydrogen and a hydroxyl group.

With respect to a preferred combination of the substituents in the pigment of the invention represented by the general (a) $W_{12}$ is preferably a hydroxyl group, a substituted or unsubstituted amino group, a substituted or unsubstituted alkoxy group, a substituted or unsubstituted aryloxy group, a substituted or unsubstituted alkylthio group, or a substituted or unsubstituted arylthio group and, particularly preferably, a hydroxyl group, a substituted or unsubstituted amino group, a substituted or unsubstituted alkoxy group, or a substituted or unsubstituted alkylthio group. Of these, a hydroxyl group and a substituted amino group are most preferred.

(b) $R_1$ is preferably a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a straight or branched alkyl group containing a total of from 1 to 8 carbon atoms is preferred, and a methyl group and a sec- or tert-alkyl group are particularly preferred, with a methyl group and a t-butyl group being most preferred.

(c) Preferably, Het-1 is selected from the aromatic heterocyclic groups (1) to (15) represented by the general formula (2). Of them, (1), (2), (3), (4), (5), (6), (7), (8), (9), (10), and (11) are preferred, (2), (5), (6), (7), (8), (9), and (10) are particularly preferred, (2), (5), (6), (7), and (10) are more preferred, and (2), (6) and (7) are most preferred.

(d) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(e) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen being most preferred.

(f) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, particularly preferably a substituted or unsubstituted heterocyclic group. Of them, a nitrogen-containing, substituted or unsubstituted heterocyclic group is particularly preferred.

(g) $W_0$ is particularly preferably a cyano group, an alkylsulfonyl group containing from 1 to 12 carbon atoms, an arylsulfonyl group containing from 6 to 18 carbon atoms, or a sulfamoyl group containing from 0 to 12 carbon atoms. Of them, a cyano group, a methanesulfonyl group, and a phenylsulfonyl group are preferred, with a cyano group being most preferred.

(h) $W_1$ to $W_4$ each is preferably a hydrogen, a substituted or unsubstituted alkyl group containing a total of from 1 to 12 carbon atoms, a substituted or unsubstituted aryl group containing from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, a hydrogen and an alkyl group containing from 1 to 8 carbon atoms are more preferred, and a hydrogen is most preferred.

The compound represented by the general formula (6) may be used as a mixture containing the tautomers represented by the general formulae (6') to (6''') but, preferably, mainly comprises the azo pigment represented by the general formula (6).

The azo pigments represented by the general formulae (1) and (3) are preferably the azo pigments represented by the general formula (7).

The azo pigments represented by the general formula (7), the tautomers of the azo pigments, and the salts or hydrates thereof will be described in detail below.

General formula (7)

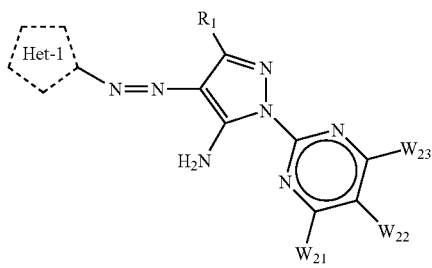

In the general formula (7), $R_1$ and Het-1 each is independently the same as $R_1$ and Het-1 defined with respect to the general formula (3), provided that * shows the point of attachment to the azo linkage in the general formula (5). $W_{21}$, $W_{22}$, and $W_{23}$ each represents a hydrogen or a substituent capable of binding to the pyrimidine group.

$R_1$, $W_{21}$, $W_{22}$, and $W_{23}$, and Het-1 will be described in more detail below.

Examples of the substituent $R_1$ is the same as those of $R_1$ in the general formula (3), and preferred examples thereof are also the same as described there.

Examples of the substituents $W_{21}$, $W_{22}$, and $W_{23}$ are the same as those of W in the general formula (3), and preferred examples thereof are also the same as described there.

Examples of the heterocyclic group represented by Het-1 are the same as those of Het-1 in the general formula (3), and preferred examples thereof are also the same as described there.

With respect to a preferred combination of the substituents in the pigment of the invention represented by the general formula (7), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (7) contain the following (a) to (h).

(a) Preferably, $W_{21}$, $W_{22}$, and $W_{23}$ each is independently hydrogen, a hydroxyl group, a substituted or unsubstituted amino group, a substituted or unsubstituted alkoxy group, a substituted or unsubstituted aryloxy group, a substituted or unsubstituted alkylthio group, or a substituted or unsubstituted arylthio group and, particularly preferably, a hydrogen, a hydroxyl group, a substituted or unsubstituted amino group, a substituted or unsubstituted alkoxy group, or a substituted or unsubstituted alkylthio group. Of these, a hydrogen, a hydroxyl group and a substituted amino group are most preferred.

(b) $R_1$ is preferably a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a straight or branched alkyl group containing a total of from 1 to 8 carbon atoms is preferred, and a methyl group and a sec- or tert-alkyl group are particularly preferred, with a methyl group and a t-butyl group being most preferred.

(c) Het-1 is preferably selected from the aromatic heterocyclic groups (1) to (15) represented by the general formula (2). Of them, (1), (2), (3), (4), (5), (6), (7), (8), (9), (10), and (11) are preferred, (2), (5), (6), (7), (8), (9), and (10) are particularly preferred, (2), (5), (6), (7), and (10) are more preferred, and (2), (6) and (7) are most preferred.

(d) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(e) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen being most preferred.

(f) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, particularly preferably a substituted or unsubstituted heterocyclic group. Of them, a nitrogen-containing, substituted or unsubstituted heterocyclic group is particularly preferred.

(g) $W_0$ is particularly preferably a cyano group, an alkylsulfonyl group containing from 1 to 12 carbon atoms, an arylsulfonyl group containing from 6 to 18 carbon atoms, or a sulfamoyl group containing from 0 to 12 carbon atoms. Of them, a cyano group, a methanesulfonyl group, and a phenylsulfonyl group are preferred, with a cyano group being most preferred.

(h) $W_1$ to $W_4$ each is preferably a hydrogen, a substituted or unsubstituted alkyl group containing a total of from 1 to 12 carbon atoms, a substituted or unsubstituted aryl group containing from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, a hydrogen and an alkyl group containing from 1 to 8 carbon atoms are more preferred, and a hydrogen is most preferred.

Of the azo pigments represented by the general formulae (1) and (3) and the hydrazone pigments which are the tautomers of the azo pigments are preferably the azo pigments represented by the general formula (8).

The general formula (8) will be described in detail below.

General formula (8)

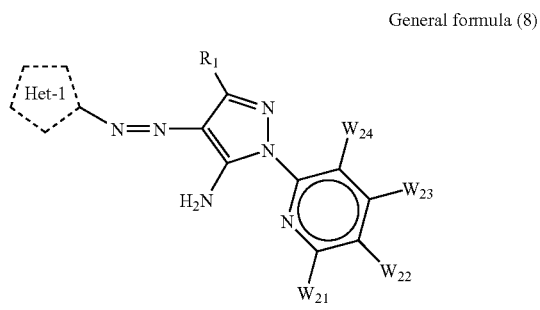

In the general formula (8), $R_1$ and Het-1 each is independently the same as $R_1$ and Het-1 defined with respect to the general formula (3), provided that * shows the point of attachment to the azo linkage in the general formula (5). $W_{21}$, $W_{22}$, $W_{23}$, and $W_{24}$ each represents a hydrogen or a substituent capable of binding to the pyridine ring.

$R_1$, $W_{21}$, $W_{22}$, $W_{23}$, $W_{24}$, and Het-1 will be described in more detail below.

Examples of the substituent $R_1$ is the same as those of $R_1$ in the general formula (3), and preferred examples thereof are also the same as described there.

Examples of the substituents $W_{21}$, $W_{22}$, $W_{23}$, and $W_{24}$ are the same as those of W in the general formula (3), and preferred examples thereof are also the same as described there.

Examples of the heterocyclic group represented by Het-1 are the same as those of Het-1 in the general formula (3), and preferred examples thereof are also the same as described there.

With respect to a preferred combination of the substituents in the pigment of the invention represented by the general formula (8), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (8) contain the following (a) to (h).

(a) Preferably, $W_{21}$, $W_{22}$, $W_{23}$, and $W_{24}$ each is independently hydrogen, a hydroxyl group, a substituted or unsubstituted amino group, a substituted or unsubstituted alkoxy group, a substituted or unsubstituted aryloxy group, a substituted or unsubstituted alkylthio group, or a substituted or unsubstituted arylthio group and, particularly preferably, a hydrogen, a hydroxyl group, a substituted or unsubstituted amino group, a substituted or unsubstituted alkoxy group, or a substituted or unsubstituted alkylthio group. Of these, a hydrogen, a hydroxyl group, and a substituted amino group are most preferred.

(b) $R_1$ is preferably a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a straight or branched alkyl group containing a total of from 1 to 8 carbon atoms is preferred, and a methyl group and a sec- or tert-alkyl group are particularly preferred, with a methyl group and a t-butyl group being most preferred.

(c) Het-1 is preferably selected from the aromatic heterocyclic groups (1) to (15) represented by the general formula (2). Of them, (1), (2), (3), (4), (5), (6), (7), (8), (9), (10), and (11) are preferred, (2), (5), (6), (7), (8), (9), and (10) are particularly preferred, (2), (5), (6), (7), and (10) are more preferred, and (2), (6) and (7) are most preferred.

(d) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(e) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen being most preferred.

(f) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, particularly preferably a substituted or unsubstituted heterocyclic group. Of them, a nitrogen-containing, substituted or unsubstituted heterocyclic group is particularly preferred.

(g) $W_0$ is particularly preferably a cyano group, an alkylsulfonyl group containing from 1 to 12 carbon atoms, an arylsulfonyl group containing from 6 to 18 carbon atoms, or a sulfamoyl group containing from 0 to 12 carbon atoms. Of them, a cyano group, a methanesulfonyl group, and a phenylsulfonyl group are preferred, with a cyano group being most preferred.

(h) $W_1$ to $W_4$ each is preferably a hydrogen, a substituted or unsubstituted alkyl group containing a total of from 1 to 12 carbon atoms, a substituted or unsubstituted aryl group containing from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, a hydrogen and an alkyl group containing from 1 to 8 carbon atoms are more preferred, and a hydrogen is most preferred.

Also, as the tautomer of the compound represented by the general formula (8), there exists a structure called hydrazone form, which is a tautomer at the azo group (—N═N—) portion of the azo colorant structure. Likewise, in the case where a hydroxyl group is contained in the compound represented by the general formula (1) as a substituent, tautomerism between an enol structure (—OH) and a keto structure (>C═O) exists, if possible.

Of the monoazo pigments represented by the general formulae (1), (3), (4), (5), (6), (7), and (8), the tautomers of the monoazo pigments, and salts or hydrates thereof, most preferred are those pigments wherein the aromatic heterocyclic group represented by Het-1 is that which is represented by the general formula (9).

The general formula (9) will be described in detail below.

General formula (9)

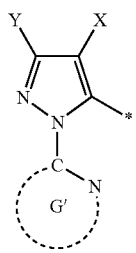

In the general formula (9), Y represents a hydrogen or a substituent, X represents an electron-withdrawing group having a Hammett's σp value of 0.2 or more, G' represents the non-metallic atoms necessary to complete a 5- to 6-membered nitrogen-containing heterocyclic group, provided that the heterocyclic group may be unsubstituted or may have a substituent, and may be a monocyclic ring or may have a condensed ring, and * shows the point of attachment to the azo linkage.

X, Y, and G' will be described in more detail below.

Examples of the substituent X are the same as those of X in the general formula (2), and preferred examples thereof are also the same as described there.

Examples of the substituent Y are the same as those of Y in the general formula (2), and preferred examples thereof are also the same as described there.

Examples of the non-metallic atoms represented by G' and necessary to complete a 5- to 6-membered nitrogen-containing heterocyclic group are (G-1) to (G-13) in the general formula (10). * in the general formulae (G-1) to (G-13) shows the point of attachment to the N atom in the pyrazole ring. $Z_{11}$ to $Z_{14}$ each represents a hydrogen or a substituent. G' in (G-13) represents the non-metallic atoms necessary to complete a 5- to 6-membered heterocyclic group, and the heterocyclic group represented by G' may be unsubstituted or may have a substituent, and may be a monocyclic ring or may have a condensed ring. Formulae (G-1) to (G-13) may be of a tautomer structure together with a substituent.

General formula (10)

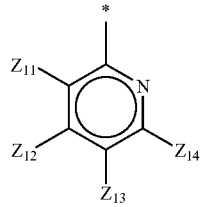
(G-1)

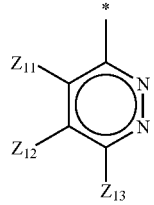
(G-2)

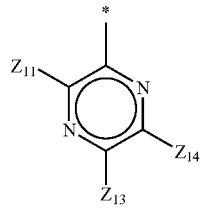
(G-3)

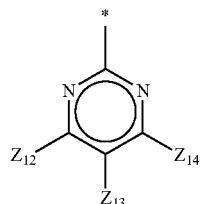
(G-4)

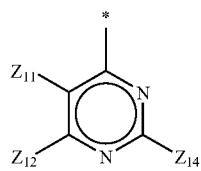
(G-5)

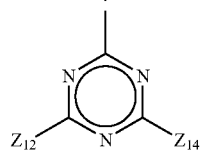
(G-6)

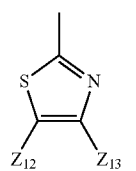
(G-7)

-continued

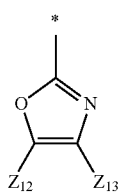
(G-8)

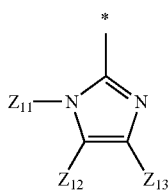
(G-9)

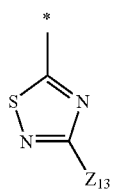
(G-10)

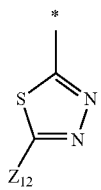
(G-11)

(G-12)

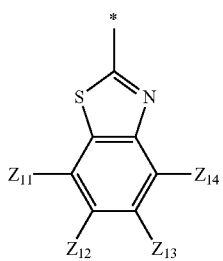

(G-13)

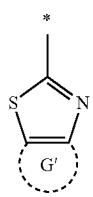

* in the (G-1) to (G-13) in the general formula (10) shows the point of attachment to the N atom in the pyrazole ring.

In the general formula (10), preferred examples of the non-metallic atoms represented by G' and necessary to complete a 5- to 6-membered nitrogen-containing heterocyclic group are (G-1), (G-2), (G-3), (G-4), (G-5), (G-6), (G-7), (G-10), (G-11), and (G-12), more preferred examples thereof are (G-1), (G-2), (G-3), (G-4), (G-5), and (G-6), particularly preferably (G-1), (G-3), (G-4), and (G-6). Of these, (G-1), (G-3), and (G-4) are most preferred.

With respect to a preferred combination of the substituents in the pigment of the invention represented by the general formula (10), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the groups in the azo pigments of the invention represented by the general formula (10) contain the following (a) to (c).

(a) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(b) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen being most preferred.

(c) Preferred examples of the non-metallic atoms represented by G' and necessary to complete a 5- to 6-membered nitrogen-containing heterocyclic group are (G-1), (G-2), (G-3), (G-4), (G-5), (G-6), (G-7), (G-10), (G-11), and (G-12), more preferred examples thereof are (G-1), (G-2), (G-3), (G-4), (G-5), and (G-6), particularly preferably (G-1), (G-3), (G-4), and (G-6). Of these, (G-1), (G-3), and (G-4) are most preferred.

With the azo pigments represented by the general formulae (1), (3), (4), (5), (6), (7), and (8), azo-hydrazone tautomers thereof can be considered.

Also, in the invention, the azo pigments represented by the general formula (1) preferably have a substituent capable of forming an intramolecular hydrogen bond, particularly intramolecular cross-linked hydrogen bond. It is preferred for the azo pigment to have a substituent capable of forming at least one intramolecular hydrogen bond. It is more preferred for the azo pigment to have a substituent capable of forming at least two intramolecular hydrogen bonds. It is most preferred that the two or more intramolecular hydrogen bonds are intramolecular cross-linked hydrogen bonds.

Of the azo pigments represented by the foregoing general formulae (1), (3), (4), (5), (6), (7), and (8), azo pigments represented by the following general formula (11-1) can be illustrated as examples of particularly preferred azo pigments.

As a reason why this structure is preferred, there can be illustrated the fact that, as is shown by the following general formula (11-1), the nitrogen atom constituting the azo group contained in the azo pigment structure, hydrogen atoms of the amino group, and nitrogen atom of the amino group (nitrogen atom of the azo group or the nitrogen atom of the hydrazon group which is the tautomer thereof; hydrogen atoms of the amino group; and the nitrogen atom of the amino group) tend to easily form the intramolecular hydrogen bond.

More preferably, there can be illustrated the fact that, as is shown by the general following formula (11-2), the nitrogen atom constituting the heterocyclic group contained in the azo pigment structure, hydrogen atoms of the amino group, and nitrogen atom of the amino group (nitrogen atom of the azo group or the nitrogen atom of the hydrazon group which is the tautomer thereof; hydrogen atoms of the amino group; and the nitrogen atom of the amino group) tend to easily form at least two intramolecular hydrogen bond.

In particular, there can be illustrated the fact that, as is shown by the following general formula (11-3), the nitrogen atom constituting the heterocyclic group contained in the azo pigment structure, hydrogen atoms of the amino group, and the hetero atom (nitrogen atom of the azo group or the nitrogen atom of the hydrazon group which is the tautomer thereof; hydrogen atoms of the amino group; and the nitrogen atom of the amino group) tend to easily form at least two intramolecular cross-linked hydrogen bonds and, in addition, at least one intramolecular cross-linked hydrogen bond.

As a result, flatness of the molecule is enhanced, the intramolecular and intermolecular mutual action is improved, crystallinity of the azo pigment represented by the general formula (11-1), particularly the general formula (11-2), particularly preferably the general formula (11-3) is enhanced (higher structure of the pigment becoming liable to be formed), and hence performances required as pigments, i.e., light fastness, heat stability, moist heat stability, water resistance, gas resistance, and/or solvent resistance, can markedly be improved, thus such pigments being most preferred.

Specific examples of the azo pigments represented by the general formulae (1), (3), (4), (5), (6), (7), (8), (11-1), (11-2), and (11-3) will be shown below which, however, do not limit azo pigments to be used in the invention.

Also, each of the following structures of the specific examples is shown in the limited structural formula selected from among several tautomers possible in view of chemical structure. However, needless to say, the pigments may be in other tautomer structures than the descried ones.

(Pig.-1)

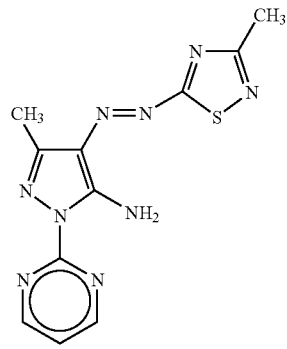

General formula (11-1)

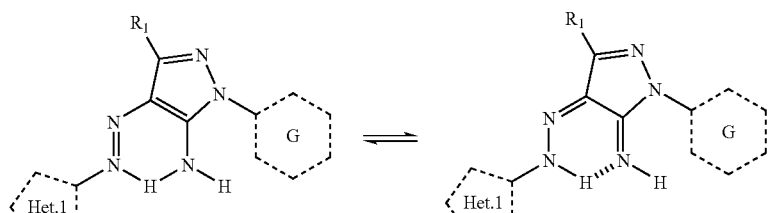

General formula (11-2)

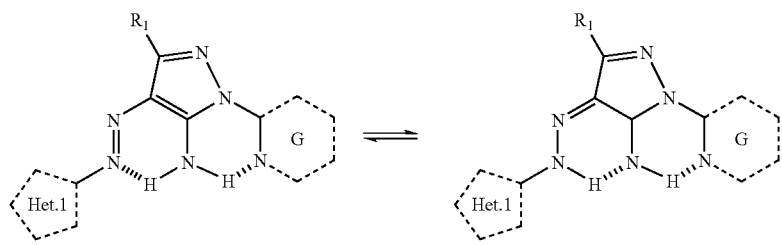

General formula (11-3)

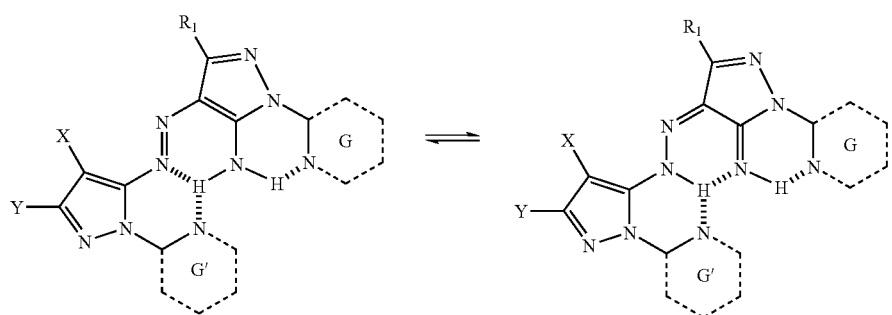

-continued
(Pig.-2) 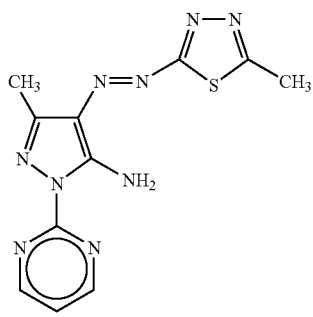
(Pig.-3) 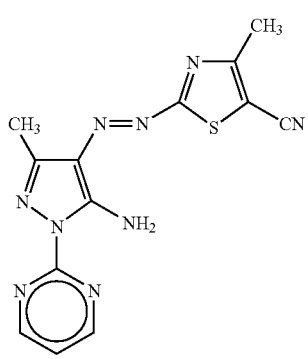
(Pig.-4) 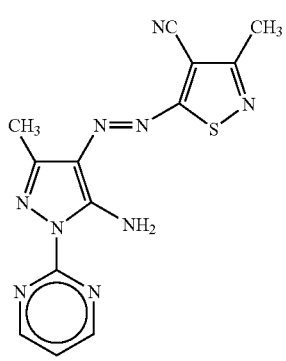
(Pig.-5) 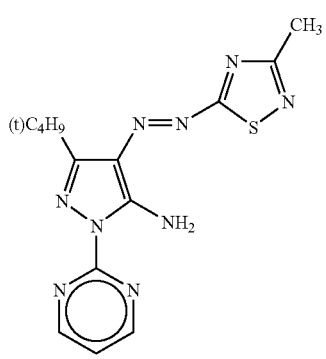
-continued
(Pig.-6) 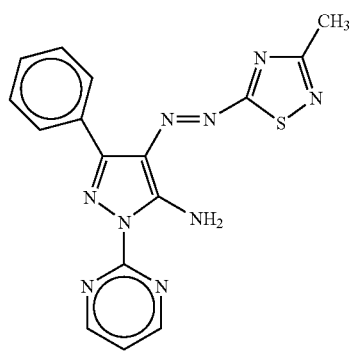
(Pig.-7) 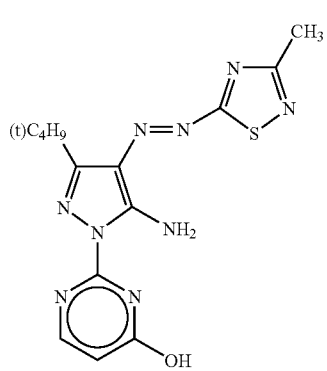
(Pig.-8) 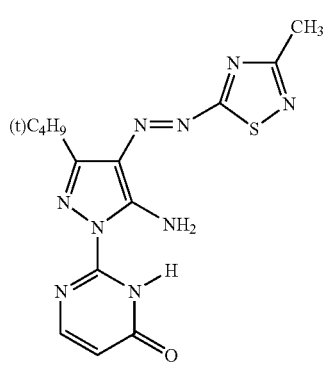
(Pig.-9) 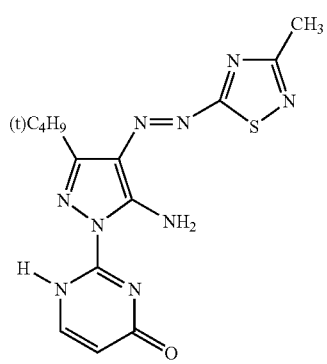

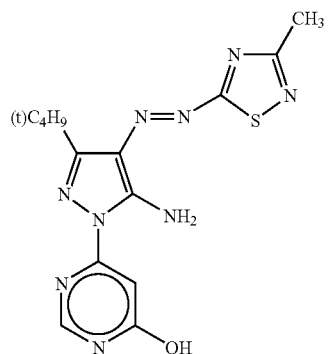
(Pig.-10)
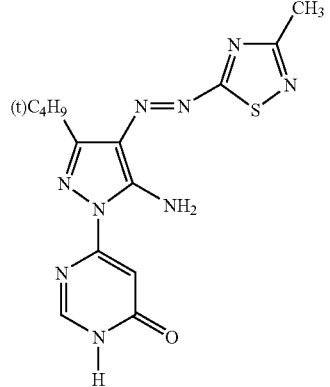
(Pig.-11)
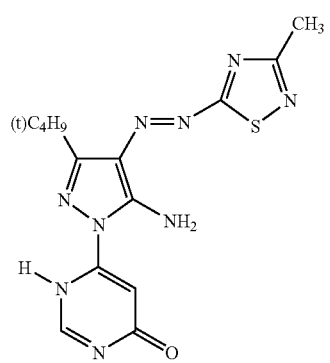
(Pig.-12)
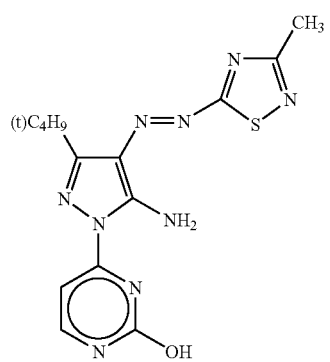
(Pig.-13)
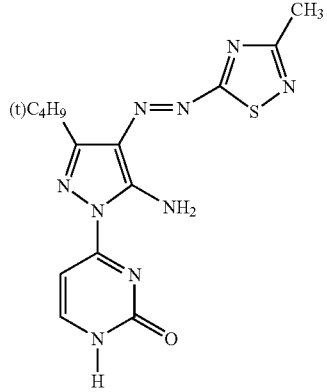
(Pig.-14)
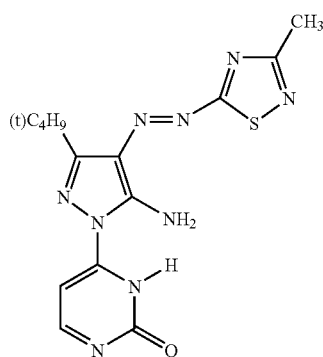
(Pig.-15)
(Pig.-16)
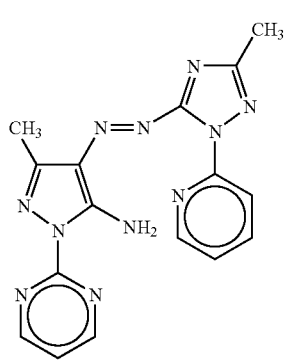
(Pig.-17)

(Pig.-18)
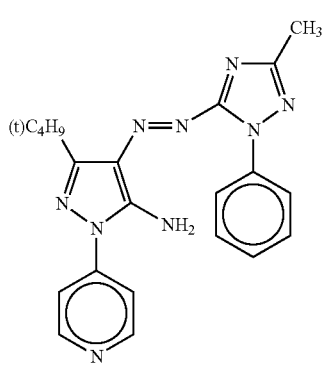
(Pig.-19)
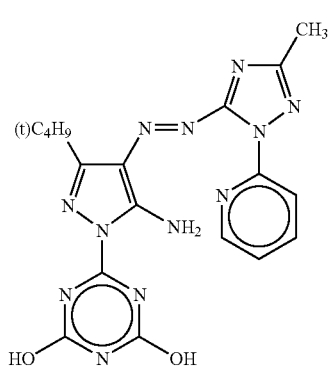
(Pig.-20)
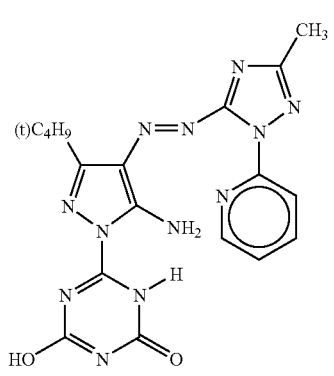
(Pig.-21)
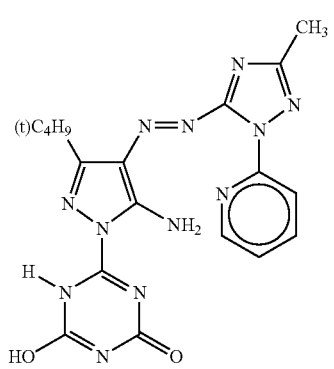
(Pig.-22)
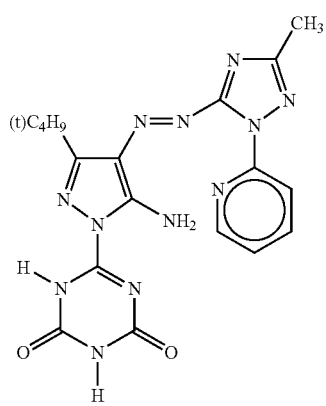
(Pig.-23)
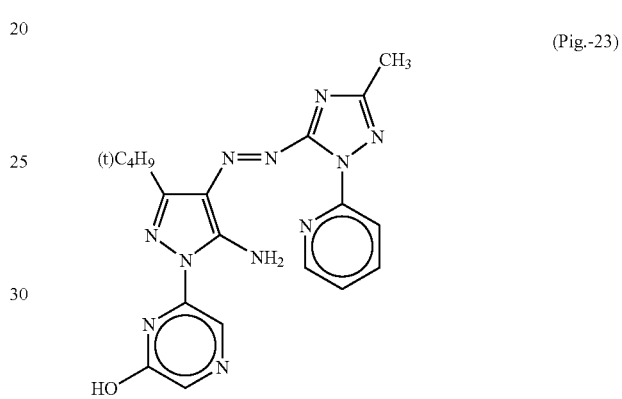
(Pig.-24)
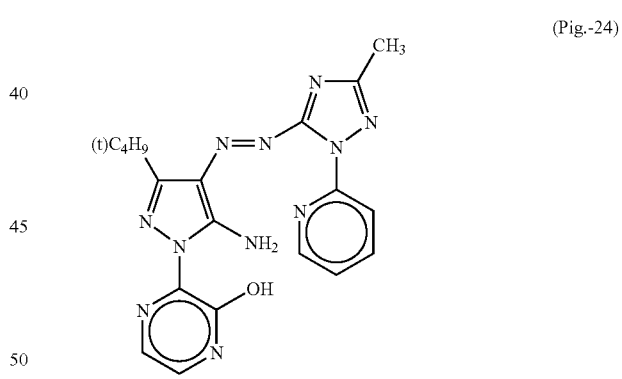
(Pig.-25)
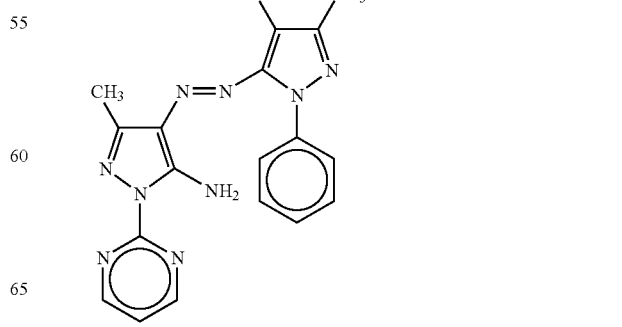

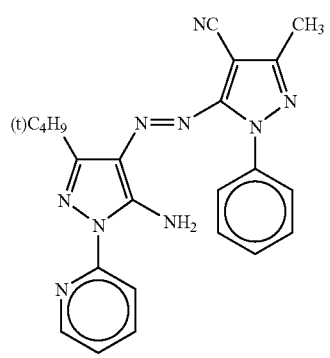
(Pig.-26)
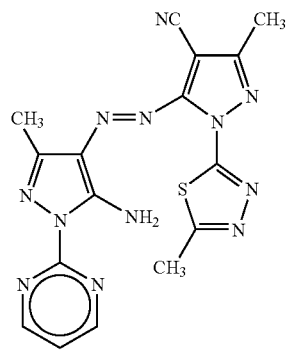
(Pig.-30)
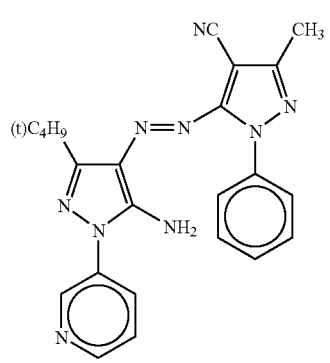
(Pig.-27)
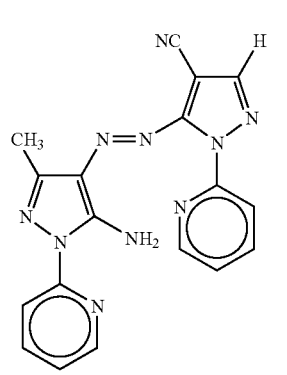
(Pig.-31)
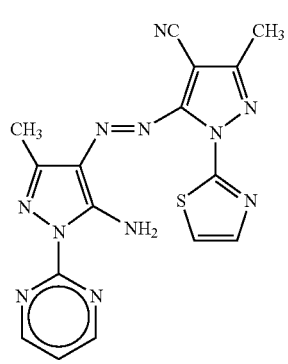
(Pig.-28)
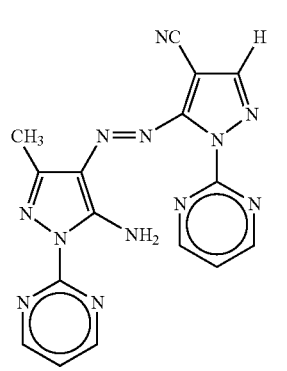
(Pig.-32)
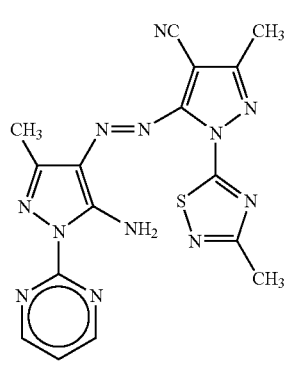
(Pig.-29)
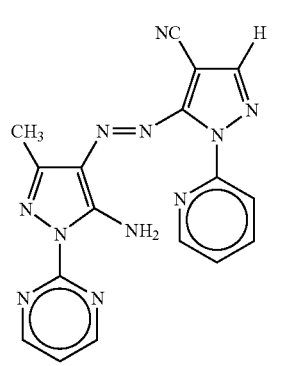
(Pig.-33)

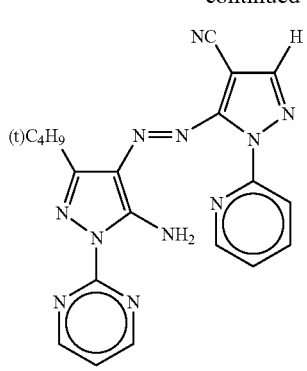
(Pig.-34)
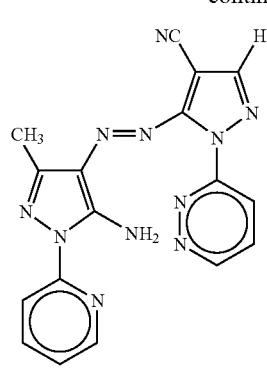
(Pig.-38)
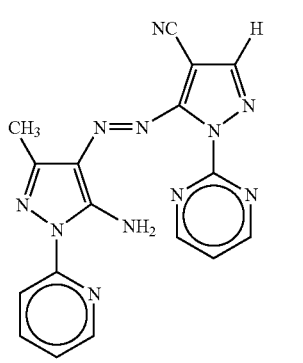
(Pig.-35)
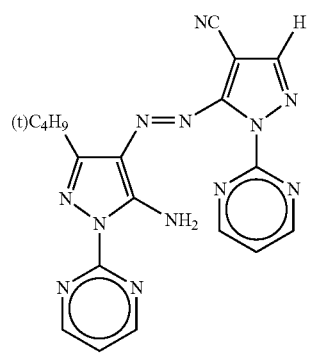
(Pig.-39)
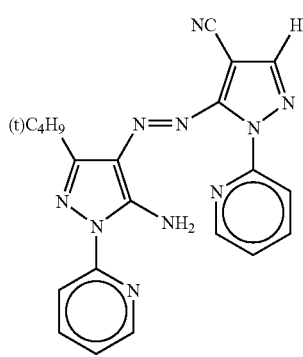
(Pig.-36)
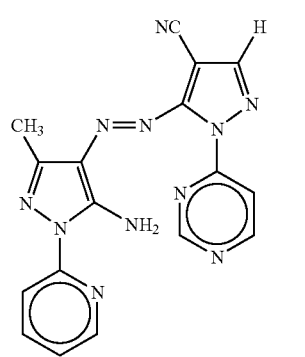
(Pig.-40)
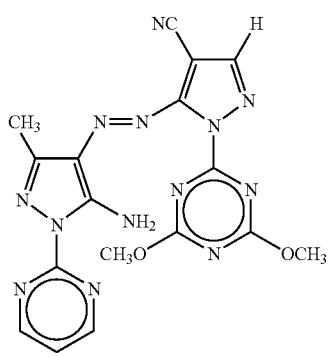
(Pig.-37)
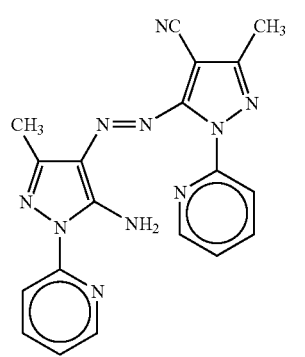
(Pig.-41)

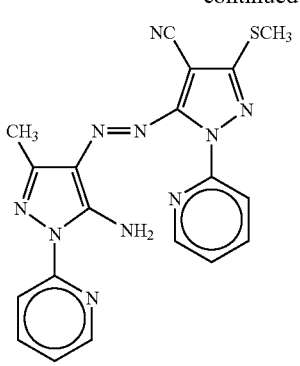
(Pig.-42)

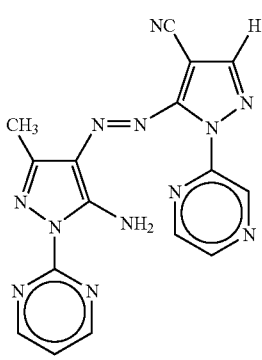
(Pig.-43)

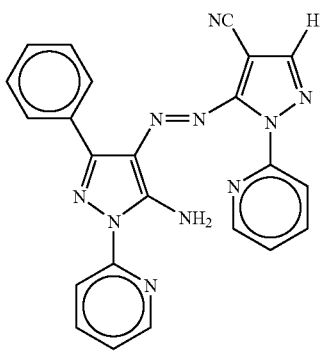
(Pig.-44)

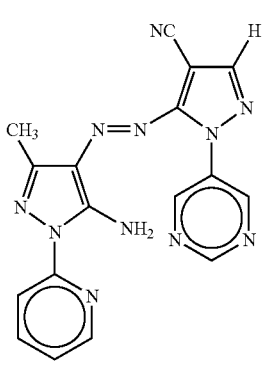
(Pig.-45)

The pigments of the invention represented by the general formulae (1), (3), (4), (5), (6), (7), and (8) may be in the form of the general formulae (1), (3), (4), (5), (6), (7), and (8) in terms of chemical structural formula, or may be the tautomers thereof, and may be of any crystal forms called polymorphic forms.

Polymorphism means that crystals having the same chemical composition can be different from each other in the conformation of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffration (results of powder X-ray diffractiometry) or by X-Ray Analysis (results of X-ray analysis of crystal structure).

In the case where the pigments of the invention represented by the general formulae (1), (3), (4), (5), (6), (7), and (8) exhibit polymorphism, they may be in any polymorphic forms and may be a mixture of two or more polymorphic forms. However, the pigment preferably contains as a major component crystals of the single form. That is, the pigment is preferably free of polymorphism, and the content of the azo pigment crystals having the single crystal form is from 70% to 100%, preferably from 80% to 100%, more preferably from 90% to 100%, still more preferably from 95% to 100%, particularly preferably 100%, based on the entire azo pigment crystals. When the azo pigment crystals having the single crystal form constitute the major component, regularity of colorant molecule arrangement is improved, intermolecular and intramolecular mutual action is strengthened and, therefore, a higher network is liable to be easily formed. As a result, there can be obtained pigments having preferable performances required as pigments, e.g., improvement of hue, light fastness, heat fastness, moisture fastness, oxidative gas resistance, and solvent resistance.

The mixing ratio of polymorphic forms in the azo pigment can be confirmed from physicochemically measured values of solids determined by single-crystal X-ray crystal structure analysis, powder X-ray diffractiometry (XRD), microscopic photograph of crystals (TEM), IR (KBr method), etc.

With those which have acid groups among the azo pigments of the invention represented by the general formulae (1), (3), (4), (5), (6), (7) and (8), part or all of the acid groups may be in a salt form, or the pigment may be a mixture of a salt type pigment and a free acid type pigment. Examples of the salt type include salts of an alkali metal such as Na, Li or K, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkyleneimine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

In the invention, the azo pigments represented by the general formulae (1) and (2) may be hydrates which contain water molecules within the crystals thereof.

With the azo pigments of the invention represented, for example, by the general formula (6), various tautomers and/or polymorphic forms exist, and the azo pigments of different forms show, for example, different absorption patterns of IR absorption spectrum.

Hereinafter, crystals showing no absorption in the range between 1700 and 1730 cm$^{-1}$ are referred to as type α, and crystals showing a strong absorption in the range between 1700 and 1730 cm$^{-1}$ are referred to as type β.

Both of a pigment dispersion prepared by using an α-type azo pigment and a pigment dispersion prepared by using a β-type azo pigment are included in the pigment dispersion of the invention. However, a pigment dispersion prepared by using the α-type azo pigment shows better dispersibility, thus being preferred.

The azo pigments represented by the general formula (1) can be produced according to the following process. That is, a heterocyclic amine represented by the general formula (12) is diazotized;

Het-NH$_2$          General formula (12)

wherein Het is the same as the heterocyclic group selected from the aromatic heterocyclic groups represented by the general formula (2), provided that * in the general formula (2) shows the point of attachment to the amino group in the general formula (12), and subsequently coupling the resulting diazonium with a compound represented by the general formula (13) to thereby produce an azo pigment represented by the general formula (1);

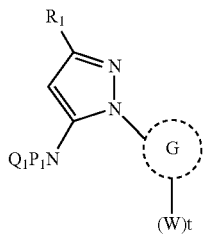

General formula (13)

In the above formula, $R_1$, $P_1$, and $Q_1$ independently represents a hydrogen or a monovalent substituent, G represents the non-metallic atoms necessary to complete a 5- or 6-membered heterocyclic group, W represents a substituent capable of binding to the heterocyclic group constituted by G, and t represents an integer of from 0 to 5.

In the general formula (13), $R_1$, $P_1$, and $Q_1$ are the same as $R_1$, $P_1$, and $Q_1$ in the general formula (1), and preferred examples thereof are also the same as described there.

Examples of the substituent of G are the same as those of G in the general formula (1), and preferred examples thereof are also the same as described there.

Examples of the substituent W are the same as those of W in the general formula (1), and preferred examples thereof are also the same as described there.

Examples of t is the same as those of t in the general formula (1), and preferred examples thereof are also the same as described there.

With respect to a preferred combination of the substituents in the intermediates of the azo pigment of the invention represented by the general formulae (12) and (13), those compounds are preferred wherein at least one of the various substituents is the preferred group having been described hereinbefore, those compounds are more preferred wherein more of the various substituents are the preferred groups having been described hereinbefore, and those compounds are most preferred wherein all of the substituents are the preferred groups having been described hereinbefore.

Particularly preferred combinations of the intermediates for the azo pigments of the invention, represented by the general formulae (12) and (13), contain the following (a) to (k).

(a) G is preferably a 5- or 6-membered, nitrogen-containing heterocyclic group, particularly preferably, an s-triazine ring, a pyrimidine ring, a pyridazine ring, a pyrazine ring, a pyridine ring, an imidazole ring, a pyrazole ring, or a pyrrole ring. Of these, an s-triazine ring, a pyrimidine ring, and a pyridazine ring are preferred, with a 2-pyridine ring, a 2,4-pyrimidine ring, and an s-triazine ring being most preferred.

(b) W is preferably a hydroxyl group, a cyano group, a substituted or unsubstituted carbamoyl group, a substituted or unsubstituted amino group, a substituted or unsubstituted alkoxy group, a substituted or unsubstituted aryloxy group, a substituted or unsubstituted alkylthio group, a substituted or unsubstituted arylthio group, or a carbonyl group (—CO—). Of these, a hydroxyl group, a substituted or unsubstituted amino group, a substituted or unsubstituted alkoxy group, a substituted or unsubstituted alkylthio group, and a carbonyl group are particularly preferred, with a hydroxyl group and a substituted amino group being most preferred.

(c) t represents an integer of from 0 to 5, preferably from 0 to 2, more preferably 1 or 2, most preferably 2.

(d) Preferably, $R_1$ is a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a straight or branched alkyl group containing a total of from 1 to 8 carbon atoms is preferred, and a methyl group and a sec- or tert-alkyl group are preferred, with a methyl group and a t-butyl group being most preferred.

(e) Preferably, $P_1$ and $Q_1$ each independently represents a hydrogen, a substituted or unsubstituted alkyl group, a substituted or unsubstituted acyl group, a substituted or unsubstituted alkylsulfonyl group, or a substituted or unsubstituted arylsulfonyl group. Particularly preferred are a hydrogen, a substituted or unsubstituted alkyl group, and a substituted or unsubstituted acyl group. Of these, a hydrogen is particularly preferred.

(f) Het-1 is preferably a group selected from the aromatic heterocyclic groups (1) to (15) represented by the general formula (2). Of them, (1), (2), (3), (4), (5), (6), (7), (8), (9), (10), and (11) are preferred, (2), (5), (6), (7), (8), (9), and (10) are particularly preferred, (2), (5), (6), (7), and (10) are more preferred, (2), (6) and (7) are still more preferred, and (2) is most preferred.

(g) Particularly preferred examples of X are a cyano group, an alkylsulfonyl group containing from 1 to 12 carbon atoms, an arylsulfonyl group containing from 6 to 18 carbon atoms, and a sulfamoyl group containing from 0 to 12 carbon atoms. Of them, a cyano group and an alkylsulfonyl group containing from 1 to 12 carbon atoms are preferred, and a cyano group is most preferred.

(h) Y is preferably a hydrogen, a substituted or unsubstituted alkyl group containing a total of from 1 to 12 carbon atoms, a substituted or unsubstituted aryl group containing a total of from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, and a hydrogen and an alkyl group containing from 1 to 8 carbon atoms are particularly preferred, with a hydrogen being most preferred.

(i) Z is preferably a hydrogen, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, particularly preferably a substituted or unsubstituted heterocyclic group. Of them, a nitrogen-containing, substituted or unsubstituted heterocyclic group is particularly preferred.

(j) $W_0$ is particularly preferably a cyano group, an alkylsulfonyl group containing from 1 to 12 carbon atoms, an arylsulfonyl group containing from 6 to 18 carbon atoms, or a sulfamoyl group containing from 0 to 12 carbon atoms. Of them, a cyano group, a methanesulfonyl group, and a phenylsulfonyl group are preferred, with a cyano group being most preferred.

(k) $W_1$ to $W_4$ each is preferably a hydrogen, a substituted or unsubstituted alkyl group containing a total of from 1 to 12 carbon atoms, a substituted or unsubstituted aryl group containing from 6 to 18 carbon atoms, or a substituted or unsubstituted heterocyclic group containing a total of from 4 to 12 carbon atoms. Of them, a hydrogen and a straight or branched alkyl group containing a total of from 1 to 8 carbon atoms are preferred, a hydrogen and an alkyl group containing from 1 to 8 carbon atoms are more preferred, and a hydrogen is most preferred.

Synthesis of the azo pigments of the invention will be described in detail below.

The azo pigments of the invention can be synthesized, for example, by coupling reaction between a diazonium salt, prepared by diazotization of a diazo component of the general formula (12) in a conventionally known manner, and a coupling component of the general formula (13).

Preparation of the diazonium salt and the coupling reaction can be conducted in a conventional manner.

In preparing the diazonium salt of the general formula (17), there can be applied a conventional process for synthesizing a diazonium salt of the general formula (12), for example, by using a nitrosonium ion source such as nitrous acid, nitrous acid salt or nitrosylsulfuric acid in a reaction medium containing an acid (for example, hydrochloric acid, sulfuric acid, phosphoric acid, acetic acid, propionic acid, methanesulfonic acid or trifluoromethanesulfonic acid).

As more preferred examples of the acid, there can be illustrated acetic acid, propionic acid, methanesulfonic acid, phosphoric acid, and sulfuric acid, which may be used alone or in combination thereof. Of these, a system containing phosphoric acid or a combination of acetic acid and sulfuric acid is particularly preferred.

As the reaction medium (solvent), organic acids and inorganic acids are preferred to use. In particular, phosphoric acid, sulfuric acid, acetic acid, propionic acid, and methanesulfonic acid are preferred. Of them, acetic acid and/or proionic acid is preferred.

As to a preferred example of the nitrosonium ion source, use of nitrosylsulfuric acid in a reaction medium containing the above-mentioned preferred acid enables one to prepare the diazonium salt with stability and efficiency.

The amount of the solvent to be used for the diazo component of the general formula (12) is preferably a 0.5- to 50-fold amount by weight, more preferably a 1- to 20-fold amount by weight, particularly preferably a 3- to 10-fold amount, based on the diazo component.

In the invention, the diazo component of the general formula (12) may be dispersed in the solvent, or may be in a state of solution depending upon kind of the diazo component.

The amount of nitrosonium ion source to be used is preferably from 0.95 to 5.0 equivalents, more preferably from 1.00 to 3.00 equivalents, particularly preferably from 1.00 to 1.10, based on the diazo component.

The reaction temperature is preferably from −15° C. to 30° C., more preferably from −10° C. to 10° C., still more preferably from −5° C. to 5° C. In case when the temperature is lower than −10° C., the reaction rate becomes so small that the synthesis takes a seriously prolonged period, thus such temperature not being economical. Also, in case when the synthesis is conducted at a high temperature exceeding 30° C., amounts of by-products are increased, thus such temperature not being preferred.

The reaction time is preferably from 30 minutes to 300 minutes, more preferably from 30 minutes to 200 minutes, still more preferably from 30 minutes to 150 minutes.

The coupling reaction can be performed in an acidic to basic reaction medium. With the azo pigments of the invention, the coupling reaction is preferably performed in an acidic to neutral reaction medium. In particular, when the coupling reaction is performed in an acidic reaction medium, the diazonium salt can be converted to the azo pigment effectively with suppressing decomposition of the diazonium salt.

As preferred examples of the reaction medium (solvent), organic acids, inorganic acids, and organic solvents may be used, with organic solvents being particularly preferred. Those solvents are preferred which do not cause liquid separation phenomenon upon reaction but provide a uniform solution. Examples thereof include alcoholic organic solvents such as methanol, ethanol, propanol, isopropanol, butanol, t-butyl alcohol, and amyl alcohol; ketone series organic solvents such as acetone and methyl ethyl ketone; diol series organic solvents such as ethylene glycol, diethylene glycol, triethylene glycol, propylene glycol, dipropylene glycol, and 1,3-propanediol; ether series organic solvents such as ethylene glycol monomethyl ether, ethylene glycol monoethyl ether, and ethylene glycol diethyl ether; tetrahydrofuran; dioxane; and acetonitrile. These solvents may be used as a mixed solution of two or more thereof.

Preferred are organic solvents having a polar parameter (ET) of 40 or more. Of them, glycol series solvents having two or more hydroxyl groups in the solvent molecule and alcoholic solvents containing 3 or less carbon atoms, preferably 2 or less carbon atoms (for example, methanol and ethylene glycol) are preferred. Mixed solvents of these solvents are also included.

The amount of the solvent to be used is preferably a 1- to 100-fold amount by weight, more preferably a 1- to 50-fold amount by weight, still more preferably a 2- to 10-fold amount by weight, based on the coupling component represented by the general formula (13).

In the invention, the coupling component of the general formula (13) may be dispersed in the solvent, or may be in a state of solution depending upon kind of the coupling component.

The coupling component is to be used in such amount that the amount of the diazo component per azo-coupling position becomes preferably from 0.95 to 5.0 equivalents, more preferably from 1.00 to 3.00 equivalents, particularly preferably from 1.00 to 1.50 equivalents.

The reaction temperature is preferably from −30° C. to 30° C., more preferably from −15° C. to 10° C., still more preferably from −10° C. to 5° C. In case when the temperature is lower than −30° C., the reaction rate becomes so small that the synthesis takes a seriously prolonged period, thus such temperature not being economical. Also, in case when the synthesis is conducted at a high temperature exceeding 30° C., amounts of by-products are increased, thus such temperature not being preferred.

The reaction time is preferably from 30 minutes to 300 minutes, more preferably from 30 minutes to 200 minutes, still more preferably from 30 minutes to 150 minutes.

In the process of synthesizing the azo pigment of the invention, the product (crude azo pigment) obtained by these reactions can be used after subjecting the product to ordinary after-treatments of organic synthesis reactions and subsequent purification or without purification.

That is, the product liberated from the reaction system can be used without further purification or after purification procedures of recrystallization, salt formation, and the like, which may be conducted alone or in combination thereof.

It is also possible to remove, after completion of the reaction, the reaction solvent by distillation or, without distillation, pour the reaction product into water or ice-water, collect the liberated product after or without neutralization, or extract the neutralized or non-neutralized reaction solution with an organic solvent/an aqueous solution, and conduct purification procedures of recrystallization, crystallization, salt formation, and the like, which procedures may be conducted alone or in combination of two or more thereof, thus obtaining a product for use.

The process for synthesizing the azo pigment of the invention will be described in more detail below.

The process for synthesizing the azo pigment of the invention is characterized by conducting the coupling reaction between the diazonium compound prepared by diazotization of the heterocyclic amine represented by the general formula (12) and the compound represented by the general formula (13) after dissolving the compound of the general formula (13) in an organic solvent.

The diazotization reaction of the heterocyclic amine represented by the general formula (12) can be conducted, for example, by reacting it with a reagent such as sodium nitrite or nitrosylsulfonic acid in an acidic solvent such as sulfuric acid, phosphoric acid or acetic acid at a temperature of 15° C. or less for about 10 minutes to about 6 hours. The coupling reaction is preferably conducted by reacting the diazonium salt obtained by the above-mentioned process with the compound represented by the general formula (13) at 40° C. or less, preferably 15° C. or less, for about 10 minutes to about 12 hours.

The tautomerism and the polymorphism can be controlled through production conditions upon the coupling reaction. As a process for producing more preferred α-form crystals, for example, the process of the invention is preferred wherein the compound represented by the general formula (13) is once dissolved in an organic solvent, and then the coupling reaction is conducted. As the organic solvent which can be used in this reaction, there are illustrated, for example, alcohol solvents. Preferred examples of the alcohol solvents include methanol, ethanol, isopropanol, ethylene glycol, and diethylene glycol. Of these, methanol is particularly preferred.

Another process for producing the azo pigment of the invention is characterized in that, in the coupling reaction between the diazonium compound prepared by diazotization of the heterocyclic amine represented by the general formula (12) and the compound represented by the general formula (13), the coupling reaction is conducted in the presence of a polar aprotic solvent.

The α-form crystals can also be effectively produced by the process of conducting the coupling reaction in the presence of the polar aprotic solvent. Examples of the polar aprotic solvent include N,N-dimethylformamide, N,N-dimethylacetamide, N-methyl-2-pyrrolidone, dimethylsulfoxide, tetramethylurea, and a mixed solvent thereof. In the case of using these solvents, the compound of the general formula (13) may or may not be completely dissolved.

The compounds represented by the general formulae (1), (3), (5), (6), (7), (8), (9) and (11) are obtained as crude azo pigments by the above-mentioned production processes. In the case of using them as the pigments of the invention, they are preferably subjected to after-treatment. As methods of the after-treatment, there are illustrated, for example, a pigment particle-controlling step such as milling treatment (e.g., solvent-salt milling, salt milling, dry milling, solvent milling or acid pasting) or solvent heating treatment; and a surface-treating step using, for example, a resin, a surfactant or a dispersing agent.

The compounds of the invention represented by the general formulae (1), (3), (5), (6), (7), (8), (9) and (11) are preferably subjected to the solvent heating treatment and/or the solvent-salt milling as the after-treatment.

As a solvent to be used in the solvent heating treatment, there are illustrated, for example, water, aromatic hydrocarbon series solvents such as toluene and xylene; halogenated hydrocarbon series solvents such as chlorobenzene and o-dichlorobenzene; alcoholic solvents such as isopropanol and isobutanol; polar aprotic organic solvents such as N,N-dimethylformamide, N,N-dimethylacetamide, and N-methyl-2-pyrrolidone; glacial acetic acid; pyridine; and a mixture thereof. An inorganic or organic acid or base may further be added to the above-described solvents. The temperature of the solvent heating treatment varies depending upon the desired primary particle size of the pigment, but is preferably from 40 to 150° C., more preferably from 60 to 100° C. The treating time is preferably from 30 minutes to 24 hours.

As the solvent-salt milling, there is illustrated the procedure wherein a crude azo pigment, an inorganic salt, and an organic solvent which does not dissolve them are placed in a kneader, and knead-milling of the mixture is conducted therein. As the inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 µm. The amount of the inorganic salt to be used is preferably a 3- to 20-fold amount by weight, more preferably a 5- to 15-fold amount by weight, based on the crude pigment. As the organic solvent, water-soluble organic solvents can preferably be used and, since the solvent becomes easily vaporize due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount based on the crude azo pigment. The kneading temperature is preferably from 20 to 130° C., particularly preferably from 40 to 110° C. As a kneader, there can be used, for example, a kneader and a mix muller.

[Pigment Dispersion]

The pigment dispersion of the invention is characterized in that it contains at least one of the azo pigments represented by the general formulae (1), (3), (5), (6), (7), (8), (9) and (11). Thus, there can be obtained a pigment dispersion having excellent coloring characteristics, durability, and dispersion stability.

The pigment dispersion of the invention may be aqueous or non-aqueous, but is preferably an aqueous pigment dispersion. As the aqueous liquid for dispersing the pigment in the aqueous pigment dispersion of the invention, a mixture containing water as a major component and, as needed, a hydrophilic organic solvent can be used. Examples of the hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylenes glycol, hexanediol, pentanediol, glycerin, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol, monoethyl ether, and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrolidone; 2-oxazolidone; 1,3-dimethyl-2-imidazolidinone; acetonitrile; and acetone.

Further, the aqueous pigment dispersion of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

Further, in order to improve dispersibility of the pigment and quality of image, a surfactant and a dispersing agent may be used. As the surfactant, there are illustrated anionic, nonionic, cationic, and amphoteric surfactants, and any of them may be used. However, anionic or nonionic surfactants are preferred to use. Examples of the anionic surfactants include aliphatic acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, and polyoxyethylene glycerol fatty acid esters.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion comprises the pigment represented by the general formula (1) dispersed in a non-aqueous vehicle. Examples of resin to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photocurable resin as the non-aqueous vehicle.

Examples of the solvents to be used in the non-aqueous vehicles include aromatic solvents such as toluene, xylene, and methoxybenzene; acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl isobutyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

In the invention, the volume-average particle size of the pigment is preferably from 10 nm to 250 nm. Additionally, the volume-average particle size of the pigment particles means the particle size of the pigment particle itself or, in the case where an additive such as a dispersing agent is adhered to the coloring material, the particle size of the pigment particle to which the additive is adhered. In the invention, a nanotrac UPA particle size distribution analyzer (UPA-EX150; manufactured by Nikkiso Co., Ltd.) can be used as a measuring apparatus for measuring the volume-average particle size of the pigment. The measurement can be performed according to the predetermined method by placing 3 ml of a pigment dispersion in a measuring cell. Additionally, as to parameters to be inputted upon measurement, ink viscosity can be used as the viscosity, and pigment density can be used as the density of dispersed particles.

The volume-average particle size is more preferably from 20 nm to 250 nm, still more preferably from 30 nm to 230 nm, most preferably from 30 nm to 150 nm. In case where the volume-average particle size of the particles in the pigment dispersion is less than 10 nm, storage stability of the dispersion might not be ensured in some cases whereas, in case where the size exceeds 250 nm, there might result a low optical density in some cases.

The concentration of the pigment contained in the pigment dispersion of the invention is in the range of preferably from 1 to 35% by weight, more preferably from 2 to 25% by weight. In case where the concentration is less than 1% by weight, an enough image density might not be obtained when the pigment dispersion is singly used as an ink composition. In case where the concentration exceeds 35% by weight, there might result a reduced dispersion stability in some cases.

The pigment dispersion of the invention is obtained by dispersing the azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker or agitator mill), a ultrasonic wave system, a high-pressure emulsion dispersion system (high-pressure homogenizer; specific commercially available apparatuses being Gaulin homogenizer, a microfluidizer, and DeBEE2000).

As uses of the azo pigments of the invention, there are illustrated image recording materials for forming images, particularly color images. Specifically, there are illustrated inkjet system recording materials to be described in detail below, heat-sensitive recording materials, pressure-sensitive recording materials, recording materials for the electro-photographic system, transfer system silver halide light-sensitive materials, printing ink compositions, and recording pens, preferably inkjet system recording materials, heat-sensitive recording materials, and recording materials for the electro-photographic system, more preferably inkjet system recording materials.

In addition, the pigments can find application to color filters for recording and reproducing color images to be used in solid state imaging devices such as CCDs and in displays such as LCD and PDP and to a pigmenting solution for pigmenting various fibers.

The monoazo pigments of the invention are used by adjusting physical properties such as solvent resistance, dispersibility, and heat conductivity through selection of the substituents so as to be adapted for the particular use. Also, the monoazo pigments of the invention may be used in an emulsion dispersion state or in a solid dispersion state according to the system wherein they are used.

[Coloring Composition]

The coloring composition of the invention means a coloring composition containing at least one kind of the azo pigments of the invention. The coloring composition of the invention can contain a medium and, in the case where a solvent is used as the medium, the composition is particularly appropriate as an ink for inkjet recording. The coloring composition of the invention can be prepared by using an oleophilic medium or an aqueous medium as the medium and dispersing the azo pigment of the invention in the medium. Preferably, the aqueous medium is used. The coloring composition of the invention includes an ink composition excluding the medium. The coloring composition of the invention may contain, as needed, other additives within the range of not spoiling the advantages of the invention. Examples of the other additives include known additives (described in JP-A-2003-306623) such as a drying-preventing agent (a wetting agent), an antifading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersing agent, a dispersion stabilizer, a rust inhibitor, and a chelating agent. In the case of water-soluble ink compositions, these various additives are added directly to the ink solution. In the case of oil-soluble ink compositions, it is general to add to a dispersion after preparing the azo pigment dispersion, but they may be added to an oil phase or an aqueous phase upon preparation.

[Ink Composition]

Next, the ink composition of the invention will be described below.

The ink composition of the invention contains the pigment dispersion of the invention described above and is preferably prepared by mixing with a water-soluble solvent or water. However, in the case where no particular problems are involved, the pigment dispersion of the invention described above may be used as such.

The ink composition of the invention contains the pigment dispersion of the invention, and can also be used as an ink composition for inkjet recording.

Also, the coloring composition containing the pigment of the invention can preferably be used as an ink composition for inkjet recording.

The ink composition of the invention uses the pigment dispersion described above, and is preferably prepared by mixing with a water-soluble solvent or water. However, in the case where no particular problems are involved, the pigment dispersion of the invention described above may be used as such.

[Ink Composition for Inkjet Recording]

Next, the ink composition of the invention for inkjet recording will be described below.

The ink composition of the invention for inkjet recording (hereinafter in some cases referred to as "ink composition") uses the pigment dispersion described above, and is preferably prepared by mixing with a water-soluble solvent or water. However, in the case where no particular problems are involved, the pigment dispersion of the invention described above may be used as such.

In view of hue, color density, saturation, and transparency of an image formed on a recording medium, the content of the pigment dispersion in the ink of the invention is in the range of preferably from 1 to 100% by weight, particularly preferably from 3 to 20% by weight, most preferably from 3 to 10% by weight.

The azo pigment of the invention is contained in an amount of from 0.1 part by weight to 20 parts by weight, more preferably from 0.2 part by weight to 10 parts by weight, still more preferably from 1 to 10 parts by weight, in 100 parts by weight of the ink composition of the invention. The ink composition of the invention may further contain other pigment in combination with the pigment of the invention. In the case of using two or more kinds of pigments, the total amount of the pigments is preferably within the above-described range.

The ink composition of the invention can be used for forming a full-color image as well as a mono-color image. In order to form the full-color image, a magenta tone ink composition, a cyan tone ink composition, and a yellow tone ink composition can be used and, further, a black tone ink composition can be used for adjusting tone.

Further, in the ink composition of the invention may be used other pigments in addition to the azo pigment of the invention. As yellow pigments to be applied, there are illustrated, for example, C.I.P.Y.-74, C.I.P.Y.-128, C.I.P.Y.-155, C.I.P.Y.-213. As magenta pigments to be applied, there are illustrated C.I.P.V.-19 and C.I.P.R.-122. As cyan pigments to be applied, there are illustrated C.I.P.B.-15:3 and C.I.P.B.-15:4. Apart from these pigments, any pigment may be used as each pigment. As a black color material, there can be illustrated a carbon black dispersion as well as disazo, trisazo, and tetrazo pigments.

As the water-soluble solvents to be used in the ink composition of the invention for inkjet recording, polyhydric alcohols, polyhydric alcohol derivatives, nitrogen-containing solvents, alcohols, and sulfur-containing solvents are used.

Specific examples of the polyhydric alcohols include ethylene glycol, diethylene glycol, propylene glycol, butylenes glycol, triethylene glycol, 1,5-pentanediol, 1,2,6-hexanetriol, and glycerin.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the nitrogen-containing solvents include pyrrolidone, N-methyl-2-pyrrolidone, cyclohexylpyrrolidone, and triethanolamine, examples of the alcohols include ethanol, isopropyl alcohol, butyl alcohol, and benzyl alcohol, and examples of the sulfur-containing solvents include thiodiethanol, thiodiglycerol, sulfolane, and dimethylsulfoxide. Besides, propylene carbonate and ethylene carbonate may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink composition. In case where the content of the water-soluble solvent in the entire ink composition is less than 1% by weight, there might result an insufficient optical density in some cases whereas, in case where the content exceeds 60% by weight, there might result unstable jet properties of the ink liquid in some cases due to the large viscosity of the liquid.

The preferred physical properties of the ink composition of the invention for inkjet recording are as follows. The surface tension of the ink is preferably from 20 mN/m to 60 mN/m, more preferably from 20 mN/m to 45 mN/m, still more preferably from 25 mN/m to 35 mN/m. In case where the surface tension is less than 20 mN/m, the liquid might, in some cases, overflow onto the nozzle surface of the recording head, thus normal printing not being performed. On the other hand, in case where the surface tension exceeds 60 mN/m, the ink might, in some cases, slowly penetrate into the recording medium, thus the drying time becoming longer.

Additionally, the surface tension was measured under the environment of 23° C. and 55% RH by using a Wilhelmy surface tension balance in the similar manner to above.

The viscosity of the ink composition is preferably from 1.2 mPa·s to 8.0 mPa·s, more preferably from 1.5 mPa·s to 6.0 mPa·s, still more preferably from 1.8 mPa·s to 4.5 mPa·s. In case where the viscosity is more than 8.0 mPa·s, ink ejection properties might, in some cases, be deteriorated. On the other hand, in case where the viscosity is less than 1.2 mPa·s, the long-term ejection properties might be deteriorated in some cases.

Additionally, the viscosity (including that to be described hereinafter) was measured by using a rotational viscometer Rheomat 115 (manufactured by Contraves Co.) at 23° C. and a shear rate of 1,400 $s^{-1}$.

In addition to the above-mentioned individual components, water is added to the ink composition within an amount of providing the preferred surface tension and viscosity described above. The addition amount of water is not particularly limited, but is in the range of preferably from 10% by weight to 99% by weight, more preferably from 30% by weight to 80% by weight, based on the total weight of the ink composition.

Further, for the purpose of controlling characteristic properties such as improvement of ejection properties, there can be used, as needed, polyethyleneimine, polyamines, polyvinylpyrrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, and fluorine-containing surfactants.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate.

Besides, pH buffers, antioxidants, antifungal agents, viscosity-adjusting agents, electrically conductive agents, and ultraviolet ray absorbents may also be added as needed.

[Inkjet Recording Method, Inkjet Recording Apparatus, and Ink Composition Tank for Inkjet Recording]

The inkjet recording method of the invention is a method of forming an image on a recording medium by using the ink composition of the invention for inkjet recording, and ejecting the ink composition onto the surface of the recording medium through the recording head according to recording signals.

Also, the inkjet recording apparatus of the invention is an apparatus for forming an image, which is equipped with a recording head capable of ejecting the ink composition of the invention for inkjet recording (a processing solution as needed) onto the surface of a recording medium, with the ink composition being ejected onto the surface of the recording medium through the recording head to form an image. Additionally, in the inkjet recording apparatus of the invention, the recording head may be equipped with an composition ink tank for inkjet recording which can feed the ink composition to the recording head and is removable from the body of the inkjet recording apparatus (hereinafter in some cases referred to as "ink composition tank"). In this case, the ink composition of the invention is retained in the ink composition tank for inkjet recording.

As the inkjet recording apparatus of the invention, a common inkjet recording apparatus, which is equipped with a printing system capable of using the ink of the invention for inkjet recording, can be utilized. Besides, there may be used, as needed, an apparatus on which a heater for controlling drying of the ink composition is further mounted, or an apparatus on which an intermediate transferring mechanism is further mounted and in which the ink composition and a processing solution are ejected (printed) onto an intermediate transfer member and are then transferred to a recording medium such as paper.

Also, as the ink composition tank of the invention for inkjet recording, a conventionally known ink composition tank may be utilized as long as it can be removably mounted on an inkjet recording apparatus equipped with a recording head and has such constitution that the ink composition can be fed to the recording head.

As to the inkjet recording method (apparatus) of the invention, it is preferred to employ a thermal inkjet recording system or a piezoelectric inkjet recording system in view of reducing feathering and inter-color bleed.

In the case of the thermal inkjet recording system, the ink composition is heated upon ejection to decrease the viscosity of the ink composition. Since the temperature of the ink composition decreases on the recording medium, the viscosity rapidly increases to afford the effect of reducing feathering and inter-color bleed. On the other hand, in the case of the piezoelectric inkjet recording system, ejection of a highly viscous liquid, which is able to suppress spreading of the liquid in the paper surface direction on the recording medium, is possible, thus the effect of reducing feathering and inter-color bleed being obtained.

In the inkjet recording method (apparatus) of the invention, the ink composition is preferably replenished (fed) to a recording head from an ink composition tank (including a processing solution tank) that is filled with the ink composition. This tank is preferably a cartridge that can be removably attached to the body of the apparatus, and the ink composition is easily replenished by changing the ink composition tank cartridge.

[Color Toner]

The content of the monoazo pigment of the invention in 100 parts by weight of the color toner of the invention is not particularly limited, but is preferably 0.1 part by weight or more, more preferably from 1 to 20 parts by weight, most preferably from 2 to 10 parts by weight. As a binder resin for color toner to be used for introducing the monoazo pigment of the invention, all binders that are generally used can be used. Examples thereof include styrene series resins, acryl series resins, styrene/acryl series resins, and polyester resins.

Inorganic fine powders and organic fine particles may externally be added to a toner for the purpose of improving fluidity and controlling charging properties. Silica fine particles and titania fine particles, whose surface has been treated with a coupling agent containing an alkyl group, are preferably used. Additionally, these particles preferably have a number-average primary particle size of from 10 to 500 nm, and are added to the toner in an amount of preferably from 0.1 to 20% by weight.

As a releasing agent, all releasing agents that have conventionally been used can be used. Specifically, there are illustrated olefins such as low-molecular-weight polypropylene, low-molecular-weight polyethylene, and ethylene-propylene copolymer; microcrystalline wax; carnauba wax; sazol wax; and paraffin wax. The addition amount of the releasing agent is preferably from 1 to 5% by weight in the toner.

As a charge-controlling agent which may optionally be added, colorless ones are preferred in view of color-forming properties. For example, there are illustrated those with a quaternary ammonium salt structure and those with a calix arene structure.

As a carrier, either of non-coated carriers constituted only by particles of a magnetic material such as iron or ferrite and resin-coated carriers comprising magnetic material particles coated with a resin may be used. The average particle size of the carrier is preferably from 30 to 150 μm in terms of volume average particle size.

The image-forming method to which the toner of the invention is applied is not particularly limited, but is exemplified by a method wherein color images are repeatedly formed on a photoreceptor, and then the color images are transferred to form an image, and a method wherein an image formed on a photoreceptor is transferred every time to an intermediate transfer member to form a color image on the intermediate transfer member, and then the color image is transferred to an image-forming member such as paper to form a color image.

[Heat-Sensitive Recording (Transfer) Material]

The heat-sensitive recording material is constituted by an ink sheet comprising a support having provided thereon a layer containing the monoazo pigment of the invention and a binder; and an image-receiving sheet for immobilizing the pigment migrating corresponding to the heat energy added from a thermal head according to image-recording signals. The ink sheet can be formed by dispersing the monoazo pigment of the invention in a solvent together with the binder to prepare an ink liquid, coating this ink liquid on the support, and properly drying the coated ink liquid. The coated amount of the ink composition on the support is not particularly limited, but is preferably from 30 to 1,000 mg/m$^2$. As to preferred binder resins, ink solvents, supports, and image-receiving sheets, those described in JP-A-7-137466 can preferably be used.

In order to apply the heat-sensitive recording material to a heat-sensitive recording material which can record a full-color color image, it is preferred to form a cyan ink composition sheet containing a heat-diffusible cyan colorant capable of forming a cyan image, a magenta ink composition sheet containing a heat-diffusible magenta colorant capable of forming a magenta image, and a yellow ink composition sheet containing a heat-diffusible yellow colorant capable of forming a yellow image, by coating on a sheet. In addition, an ink composition sheet containing a black color image-forming substance may further be formed as needed.

[Color Filter]

As a method for forming a color filter, there are a method of first forming a pattern by using a photoresist, and then dyeing it, and a method of forming a pattern by a photoresist having added thereto a colorant as described in JP-A-4-163552, JP-A-4-128703, and JP-A-4-175753. As a method to be employed in the case of introducing the colorant of the invention into a color filter, either one of these methods may be employed. However, as a preferred method, there can be illustrated a method for forming a color filter described in JP-A-4-175753 and JP-A-6-35182, which comprises coating a substrate with a positive resist composition containing a thermosetting resin, a quinonediazide compound, a cross-linking agent, a colorant, and a solvent, exposing through a mask, developing the exposed areas to thereby form a positive resist pattern, exposing the entire surface of the positive resist pattern, and then curing the exposed positive resist pattern. Also, a color filter in the system of RGB primary colors or YMC complementary colors can be obtained by forming a black matrix in a conventional manner. The amount of the monoazo pigment of the invention used in the color filter is not limited, but is preferably from 0.1 to 50% by weight.

As the thermosetting resin, quinonediazide compound, cross-linking agent, solvent, and the amounts thereof to be used, those which are described in the aforesaid patent literature can preferably be used.

EXAMPLES

The invention will be described in more detail by reference to Examples which, however, are not to be construed as limiting the invention.

Synthesis Example 1

Synthesis of Illustrative Pigment (Pig.-5)

The azo pigment of the invention (illustrative azo pigment: Pig.-5) can be derived according to, for example, the following synthesis route.

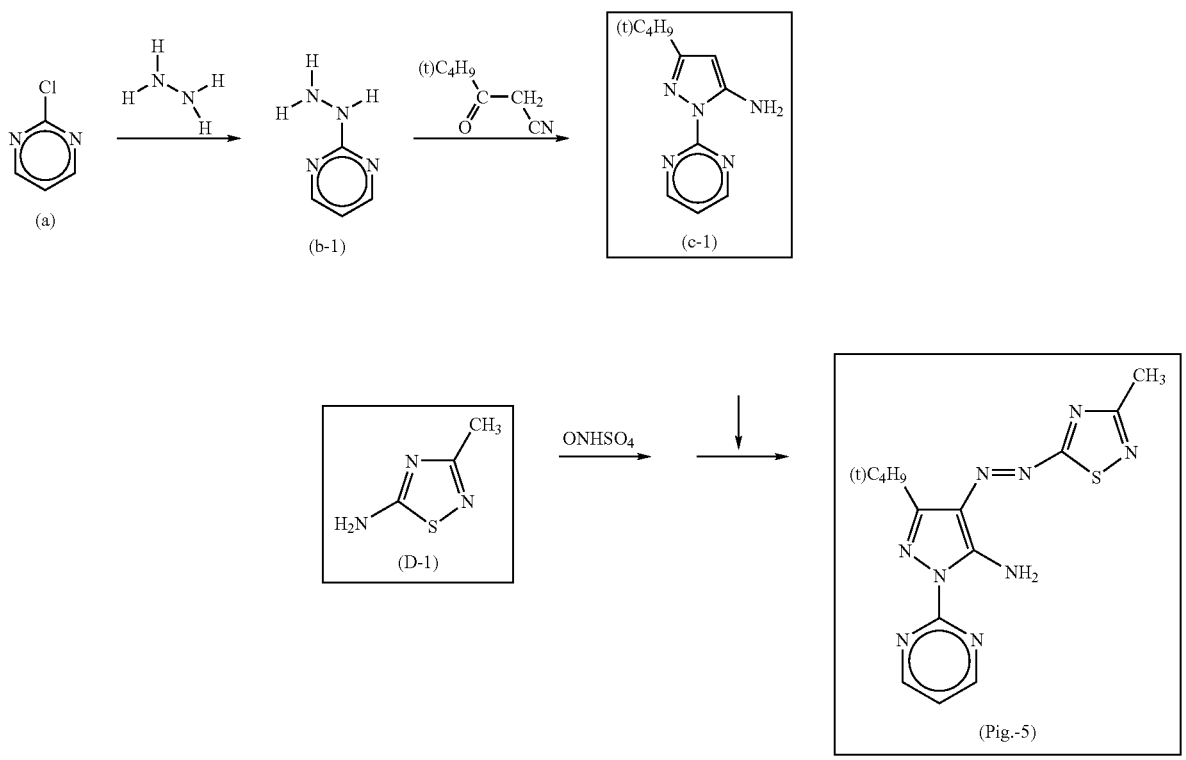

(1) Synthesis of Compound b-1:

A solution of 26.2 g of hydrazine monohydrate (manufactured by Wako Pure Chemical Industries, Ltd.) in 30 mL of methanol is adjusted to 10° C. in terms of the inside temperature, and 15 g of compound (a) (manufactured by Wako Pure Chemical Industries, Ltd.) is added thereto by portions, followed by stirring the mixture at the same temperature for 0.5 hour. Thereafter, the inside temperature is increased to 40° C., followed by stirring for 1.0 hour. Subsequently, the mixture is allowed to cool to room temperature and, after adding thereto 30 mL of water, the product is collected by filtration and washed with 30 mL of water and 30 mL of isopropyl alcohol. The thus-obtained crystals are dried at room temperature for 8 hours to obtain 12.4 g of compound (b-1). $^1$H-NMR (DMSO-d6), δ value TMS standard: 4.08-4.20 (2H, brs), 6.55-6.72 (1H, dd), 8.10-8.15 (1H, s), 8.27-8.35 (2H, d)

(2) Synthesis of Compound (c-1):

11.9 g of pivaloyl acetonitrile (manufactured by Tokyo Chemical Industry Co., Ltd.) is added by portions at room temperature to a solution of 10.0 g of compound (b-1) in 40 mL of ethanol and, after increasing the inside temperature up to 70° C., the mixture is refluxed for 2.5 hours. Subsequently, the mixture is allowed to cool to room temperature, and then cooled to an inside temperature of 9° C. in an ice-bath, followed by filtration. The product is washed with 40 mL of ethanol, and the thus-obtained crystals are dried at 60° C. for 3 hours to obtain 14.0 g of compound (c-1). $^1$H-NMR (DMSO-d6), δ value TMS standard: 1.21-1.25 (9H, s), 5.28-5.34 (1H, s), 6.60-6.70 (2H, brs), 7.22-7.32 (1H, t), 8.78-8.86 (2H, d)

(3) Synthesis of Pig.-5:

4.0 g of 5-amino-3-methyl-1,2,4-thiadiazole (formula (D-1)) is added to a mixture of 13.3 mL of phosphoric acid and 26.6 parts of acetic acid, and the mixture is heated to 50° C. to dissolve. This solution is cooled and kept at −3° C. with ice, and 13.2 g of a 40% solution of nitrosylsulfuric acid is added thereto, followed by stirring for 1 hour to obtain a diazonium salt solution. Separately, a suspension of 5.5 g of the compound represented by formula (c-1) in 150 mL of methanol is prepared, and the above-mentioned diazonium salt solution is added to the suspension at 2 to 10° C. over 10 minutes. The solution is kept in this state for 1 hour at 10° C. to react, and the produced powder is collected by filtration. This powder is added to 300 mL of water, and the excess acid is neutralized with a potassium hydroxide aqueous solution. Filtration is conducted again to obtain yellow powder. This yellow powder is added to a mixed solvent of 50 mL of N,N-dimethylacetamide and 50 mL of water, and heated at 85° C. for 4 hours to ripen. This ripened solution is subjected to hot filtration, and the collected product is washed with 200 mL of methanol to obtain 5.6 g of the azo pigment (Pig.-5).

The infrared absorption spectrum (KBr method) of the thus-obtained azo pigment (Pig-5) is shown in FIG. 1.

Synthesis Example 2

Synthesis of Illustrative Pigment (Pig.-31)

The azo pigment of the invention (illustrative azo pigment: Pig.-31) can be derived according to, for example, the following synthesis route.

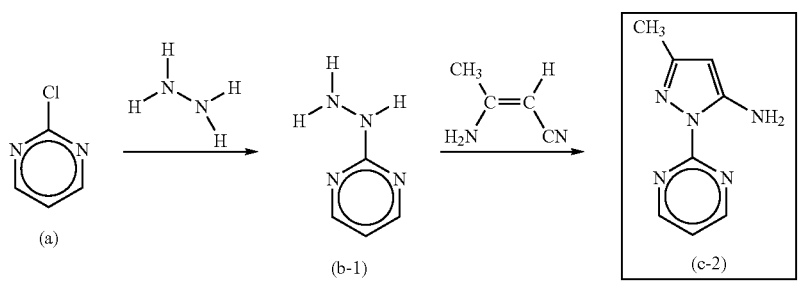

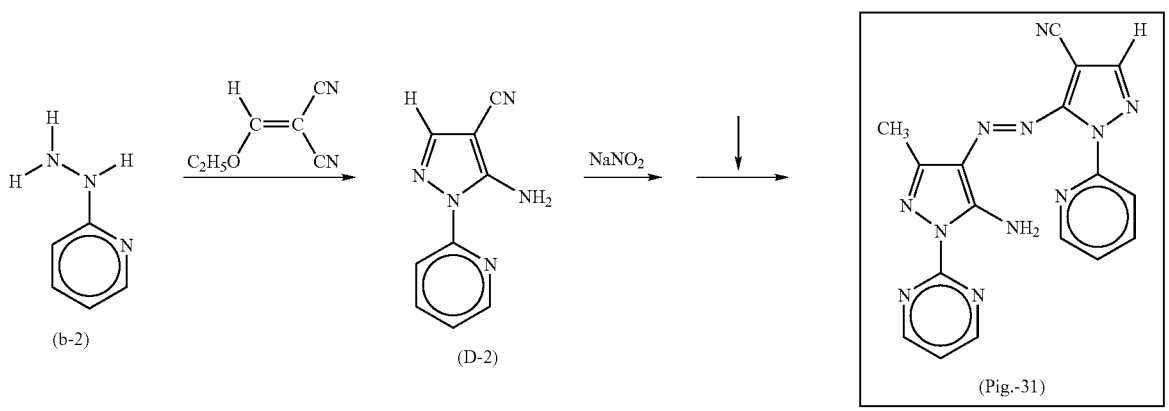

(1) Synthesis of Compound c-2:

7.8 g of aminocrotonitrile (manufactured by Wako Pure Chemical Industries, Ltd.) is added by portions at room temperature to a solution of 10.0 g of the compound (b-1) in 80 mL of ethanol separately obtained by the process of Synthesis example 1 and, after heating the inside temperature up to 70° C., the mixture is refluxed for 4.0 hours. Subsequently, the mixture is allowed to cool to room temperature, and then cooled to an inside temperature of 4° C. in an ice-bath, followed by filtration at the same temperature. The product is washed with 80 mL of ethanol, and the thus-obtained crystals are dried at 60° C. for 3 hours to obtain 11.5 g of compound (c-2). $^1$H-NMR (DMSO-d6), δ value TMS standard: 2.01-2.08 (3H, s), 5.23-5.29 (1H, s), 6.72-6.83 (2H, brs), 7.21-7.35 (1H, t), 8.70-8.80 (2H, d)

(2) Synthesis of Compound D-2:

5.9 g of ethoxymethylenemalononitrile (manufactured by ALDRICH) is added by portions at room temperature to a suspension of 5 g of compound (b-2) in 25 mL of ethanol (manufactured by Wako Pure Chemical Industries, Ltd.) at room temperature, and subsequently heated to an inside temperature of 60° C. Then, the mixture is refluxed for 3.0 hours. Subsequently, the mixture is allowed to cool to room temperature, and the product is washed with isopropyl alcohol. Crystals thus obtained are dried at room temperature for 8 hours to obtain 7.1 g of compound (D-2). $^1$H-NMR (DMSO-d6), δ value TMS standard: 7.32-7.40 (1H, m), 7.80-7.90 (2H, m), 7.98-8.08 (1H, t), 8.07-8.18 (2H, brs), 8.45-8.53 (1H, t)

Figure 2:
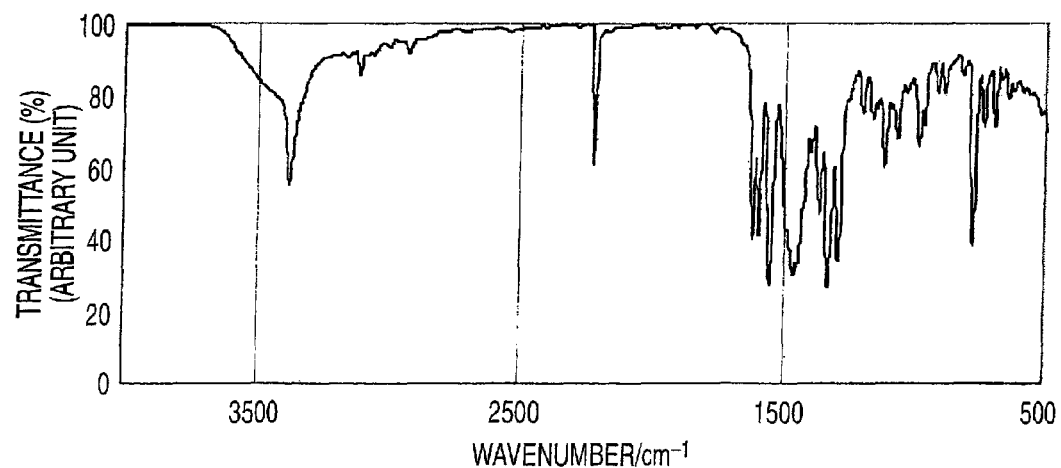
FIG. 2 shows the infrared absorption spectrum of the azo pigment (Pig.-31) synthesized according to Synthesis example 2.

(3) Synthesis of Pig.-31:

2.9 g of (D-2) is added to 35 mL of phosphoric acid at room temperature, and the mixture is heated to an inside temperature of 60° C. to dissolve. This solution is kept at an inside temperature of −5 to 0° C. under cooling with ice, and 1.2 g of sodium nitrite is added thereto by portions, followed by stirring at the same temperature for 1 hour to thereby obtain a diazonium salt solution. Then, 2.5 g of (c-2) is suspended in 100 mL of methanol, and the above-prepared diazonium salt solution is dropwise added to the suspension at an inside temperature of 5° C. or lower than that. After stirring for 1 hour at the same temperature, the ice bath is removed, and stirring is further continued for 1 hour at room temperature. Subsequently, precipitated crystals are collected by filtration, washed with pouring 100 mL of methanol, then with pouring 300 mL of water. The thus-obtained crystals are added, without drying, to a mixture of 150 mL of methanol and 75 mL of water and, after increasing the inside temperature to 65° C., the mixture is stirred for 3 hours at the same temperature under heating. Thereafter, the mixture is stirred for 1 hour under air cooling, and crystals precipitated at room temperature are collected by filtration, and washed with 30 mL of methanol. The thus-obtained crystals are dried at 50° C. for 8 hours to obtain 4.3 g of the azo pigment (Pig.-31). The IR absorption spectrum (KBr method) of the Pig.-31 is shown in FIG. 2.

Synthesis Example 3

Synthesis of Illustrative Azo Pigment (Pig.-32)

The azo pigment of the invention (illustrative azo pigment: Pig.-32) can be derived according to, for example, the following synthesis route.

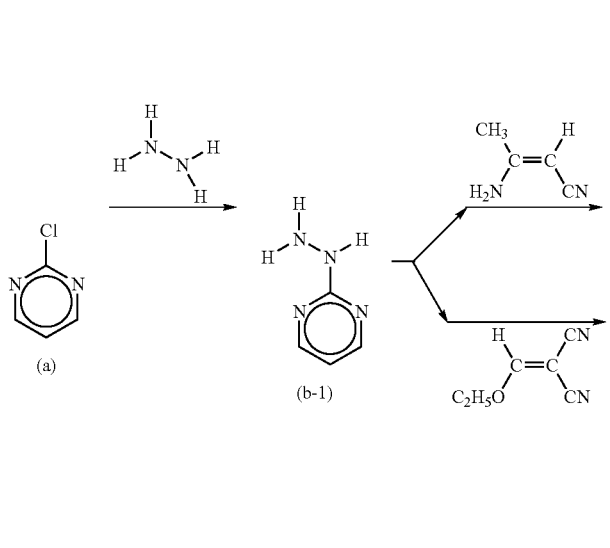
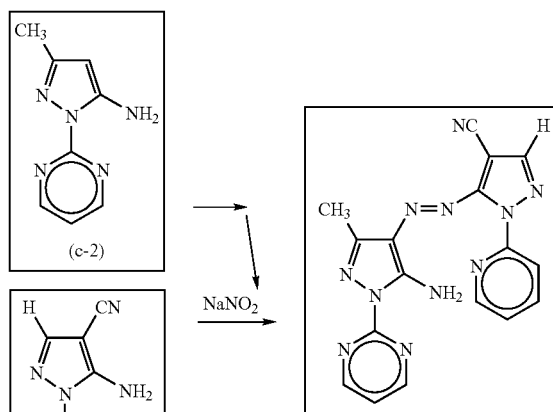

(1) Synthesis of Compound D-3:

17.5 g of ethoxymethylenemalononitrile (manufactured by ALDRICH) is added by portions at room temperature to a suspension of 15.0 g of compound (b-1) in 95 mL of ethanol separately obtained according to the process of Synthesis example 1, and subsequently heated to an inside temperature of 60° C. Then, the mixture is refluxed for 3.0 hours, and the mixture is cooled to room temperature. Subsequently, the product is washed with 40 mL of ethanol. Crystals thus obtained are dried at 60° C. for 3 hours to obtain 21.9 g of compound (D-3). $^1$H-NMR (DMSO-d6), δ value TMS standard: 7.47-7.55 (1H, t), 7.95-7.98 (1H, s), 8.03-8.13 (2H, brs), 8.85-8.92 (2H, d)

Figure 3:
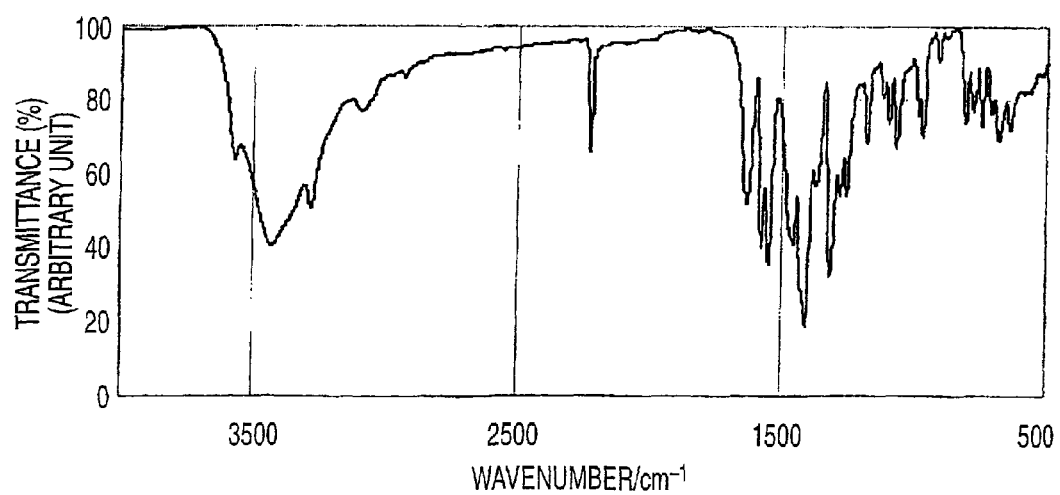
FIG. 3 shows the infrared absorption spectrum of the azo pigment (Pig.-32) synthesized according to Synthesis example 3.
Figure 4:
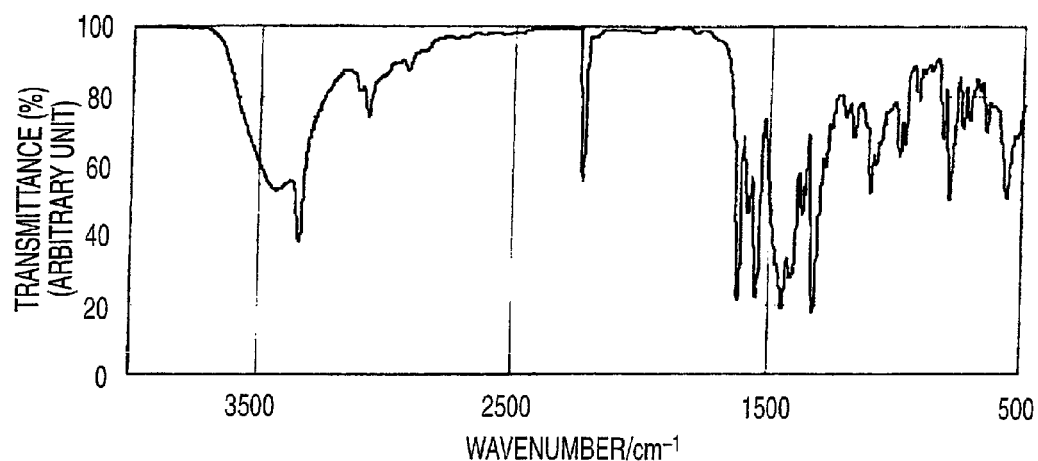
FIG. 4 shows the infrared absorption spectrum of the azo pigment (Pig.-33) synthesized according to Synthesis example 4.
Figure 5:
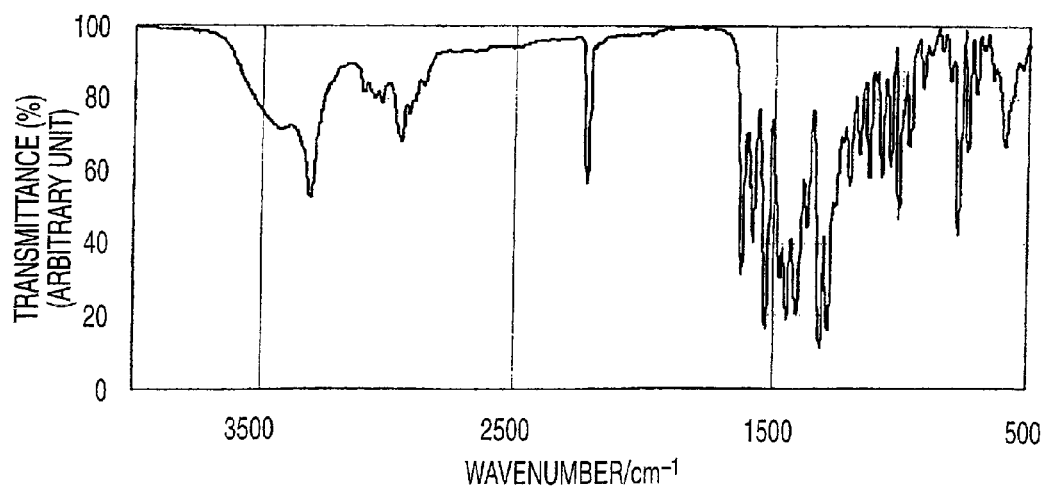
FIG. 5 shows the infrared absorption spectrum of the azo pigment (Pig.-34) synthesized according to Synthesis example 5.
Figure 6:
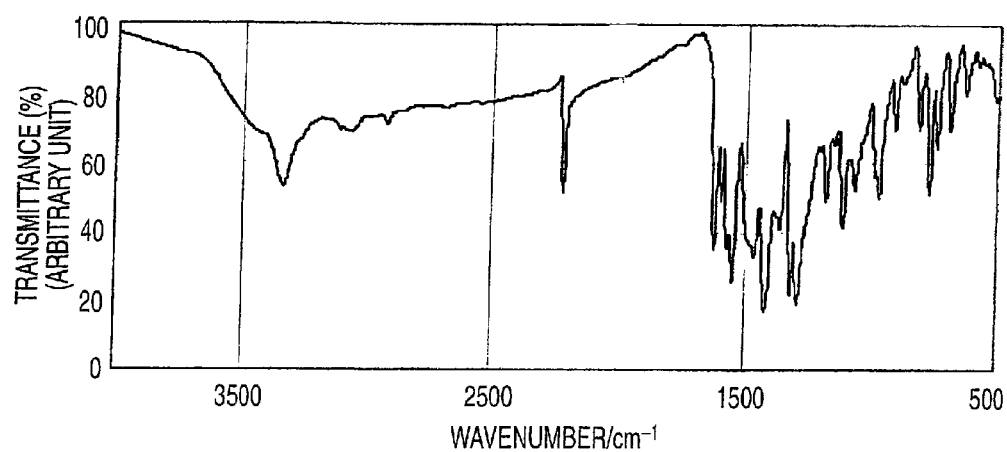
FIG. 6 shows the infrared absorption spectrum of the azo pigment (Pig.-35) synthesized according to Synthesis example 6.
Figure 7:
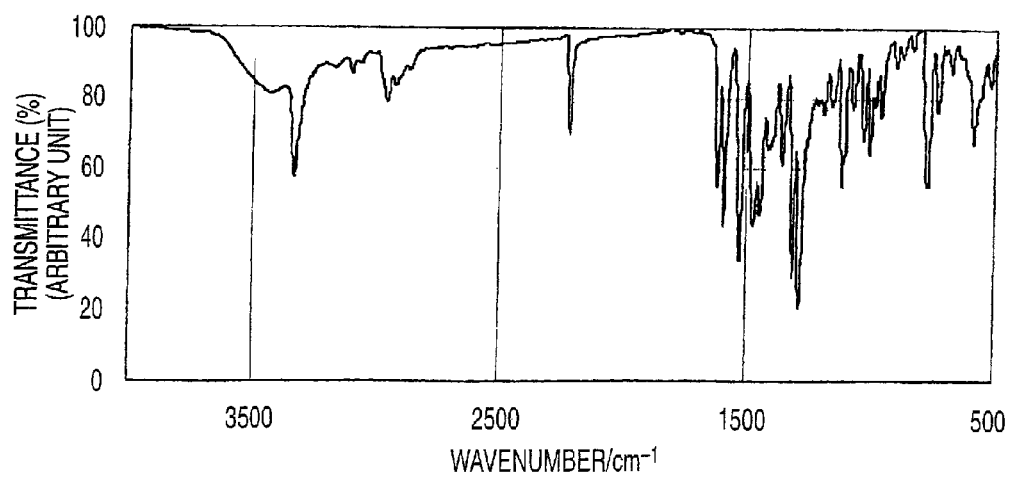
FIG. 7 shows the infrared absorption spectrum of the azo pigment (Pig.-36) synthesized according to Synthesis example 7.
Figure 8:
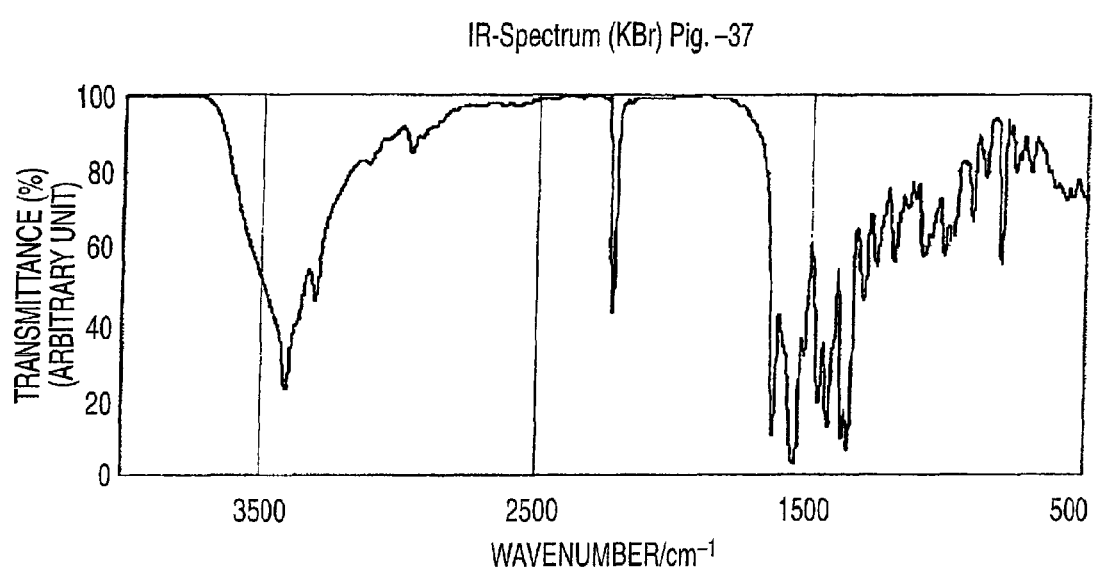
FIG. 8 shows the infrared absorption spectrum of the azo pigment (Pig.-37) synthesized according to Synthesis example 8.

(2) Synthesis of Pig.-32:

1.8 g of (D-3) is added to 21 mL of phosphoric acid at room temperature, and the mixture is heated to an inside temperature of 60° C. to dissolve. This solution is kept at an inside temperature of −5 to 0° C. under cooling with ice, and 0.8 g of sodium nitrite is added thereto by portions, followed by stirring at the same temperature for 1 hour to thereby obtain a diazonium salt solution. Then, 1.5 g of (c-2) separately obtained according to the process of Synthesis example 2 is suspended in 60 mL of methanol, and the above-prepared diazonium salt solution is dropwise added to the suspension at an inside temperature of 5° C. or lower than that. After stirring for 1 hour at the same temperature, the ice bath is removed, and stirring is further continued for 1 hour at room temperature. Subsequently, precipitated crystals are collected by filtration, washed with pouring 100 mL of methanol, then with pouring 300 mL of water. The thus-obtained crystals are added, without drying, to a mixture of 100 mL of methanol and 50 mL of water and, after increasing the inside temperature to 65° C., the mixture is stirred for 3 hours at the same temperature under heating. Thereafter, the mixture is stirred for 1 hour under air cooling, and crystals precipitated at room temperature are collected by filtration, and washed with 30 mL of methanol. The thus-obtained crystals are dried at 50° C. for 8 hours to obtain 1.9 g of the specific example of the azo pigment of the invention, Pig.-32. The IR absorption spectrum (KBr method) of the Pig.-32 is shown in FIG. 3.

Synthesis Examples 4 to 8

Synthesis of the illustrative azo pigments (Pig.-33), (Pig.-34), (Pig.-35), (Pig.-36), and (Pig.-37) is performed according to the detailed descriptions on the synthesis of the azo pigments of the invention and by employing the procedures described in Synthesis examples 1 to 3. The IR absorption spectra (KBr method) of the obtained azo pigments are shown in FIGS. 4 to 8, respectively.

The invention will be described in more detail by reference to Examples. However, the invention is not limited by these Examples at all. Additionally, in Examples, "parts" are by weight.

Example 1

2.5 Parts of the azo pigment (Pig.-5) synthesized in Synthesis example 1, 0.5 part of sodium oleate, 5 parts of glycerin, and 42 parts of water are mixed, and subjected to dispersing procedure together with 100 parts of zirconia beads of 0.1 mm in diameter at 300 rpm for 6 hours using a planetary ball mill. After completion of the dispersing procedure, the zirconia beads are separated to obtain a yellow pigment dispersion 1.

Example 2

5 Parts of the azo pigment (Pig.-5) synthesized in Synthesis example 1, 25.5 parts of an aqueous solution of a high-molecular dispersant of methacrylic acid-methacrylic acid ester copolymer represented by Dispersant Solution 10 which is described in WO2006/064193, p. 22, and 19.5 parts of water are mixed, and subjected to dispersing procedure together with 100 parts of zirconia beads of 0.1 mm in diameter at 300 rpm for 6 hours using a planetary ball mill. After completion of the dispersing procedure, the zirconia beads are separated to obtain a yellow pigment dispersion 2.

Example 3

In the same procedures as in Example 1 except for using (Pig.-31) in place of the pigment (Pig.-5) used in Example 1, there is obtained a yellow pigment dispersion 3.

Example 4

In the same procedures as in Example 1 except for using (Pig.-32) in place of the pigment (Pig.-5) used in Example 1, there is obtained a yellow pigment dispersion 4.

Example 5

In the same procedures as in Example 1 except for using (Pig.-33) in place of the pigment (Pig.-5) used in Example 1, there is obtained a yellow pigment dispersion 5.

Examples 6 and 7

In the same procedures as in Example 1 except for using (Pig.-34) or (Pig.-36) in place of the pigment (Pig.-5) used in Example 1, there are obtained yellow pigment dispersions 6 and 7.

Examples 8 to 15

In the same procedures as in Example 1 except for using (Pig.-1), (Pig.-2), (Pig.-3), (Pig.-4), (Pig.-6), (Pig.-17), (Pig.-25), or (Pig.-43) in place of the pigment (Pig.-5) used in Example 1, there are obtained yellow pigment dispersions 8, 9, 10, 11, 12, 13, 14, and 15.

Examples 16 to 18

In the same procedures as in Example 1 except for using (Pig.-19), (Pig.-20), or (Pig.-21) in place of the pigment (Pig.-5) used in Example 1, there are obtained yellow pigment dispersions 16, 17, and 18.

Comparative Example 1

In the same procedures as in Example 1 except for using C.I. Pigment Yellow 128 (manufactured by Ciba Specialty Co.; CROMOPHTAL YELLOW 8GN) in place of the pigment (Pig.-5) used in Example 1, there is obtained a yellow comparative pigment dispersion 1.

Comparative Example 2

In the same procedures as in Example 1 except for using C.I. Pigment Yellow 74 (manufactured by Ciba Specialty Co.; Iralite YELLOW GO) in place of the pigment (Pig.-5) used in Example 1, there is obtained a yellow comparative pigment dispersion 2.

Comparative Example 3

In the same procedures as in Example 1 except for using C.I. Pigment Yellow 155 (manufactured by Clariant Co.; INKJET YELLOW 4G VP2532) in place of the pigment (Pig.-5) used in Example 1, there is obtained a yellow comparative pigment dispersion 3.

Comparative Example 4

In the same procedures as in Example 1 except for using a comparative compound 1 of the following structure in place of the pigment (Pig.-5) used in Example 1, it is tried to prepare a yellow comparative pigment dispersion 4, but the pigment dissolves into the solvent to form a solution of the colorant, thus a fine particle dispersion not being obtained.

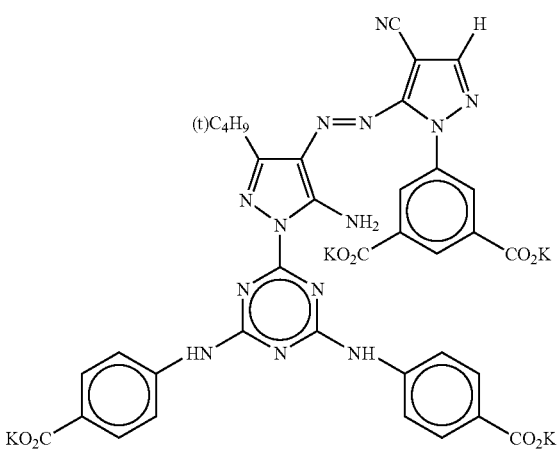

Comparative compound 1

Comparative Example 5

In the same procedures as in Example 1 except for using a comparative compound 2 of the following structure in place of the pigment (Pig.-5) used in Example 1, it is tried to prepare a yellow comparative pigment dispersion 5, but the pigment dissolves into the solvent to form a solution of the colorant, thus a fine particle dispersion not being obtained.

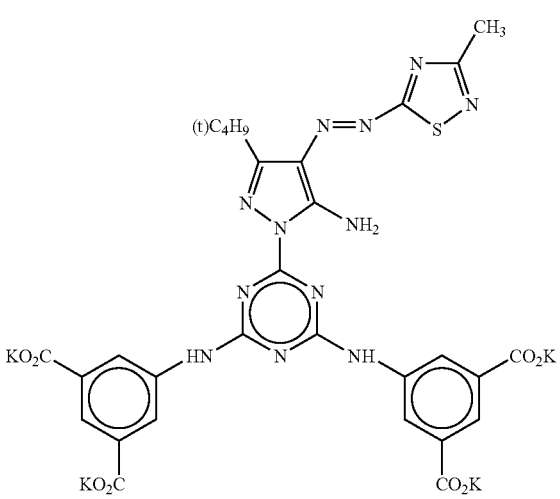

Comparative compound 2

<Measurement of Volume-Average Particle Size>

In the invention, a nanotrac UPA particle size distribution analyzer (UPA-EX150; manufactured by Nikkiso Co., Ltd.) was used as a measuring apparatus for measuring the volume-average particle size of the pigment. The measurement was performed according to the predetermined method by placing 3 ml of a pigment dispersion in a measuring cell. Additionally, as to parameters to be inputted upon measurement, ink viscosity was used as the viscosity, and pigment density was used as the density of dispersed particles.

<Evaluation of Coloring Strength>

Each of the pigment dispersions obtained in Examples and Comparative Examples is coated on a photo mat paper (to be used exclusively for pigments) manufactured by Seiko Epson Corporation by using a No. 3 bar coater. Image density of each of the thus-obtained coated products is measured by means of a reflection densitometer (X-Rite 938; manufactured by X-Rite Co.), and the results are shown in Table 1 as "coloring strength (OD: Optical Density)".

<Evaluation of Hue>

Hue is evaluated according to the following criteria: samples of the above-described products which are less greenish and have large vividness in terms of chromaticity when viewed with the eye are ranked A (good); samples which are reddish or have less vividness are ranked B; and samples which are reddish and have less vividness are ranked C (bad). The results are shown in Table 1.

<Evaluation of Light Fastness>

Each of the coated products of 1.0 in image density used in evaluation of hue is prepared and irradiated for 7 days with a xenon light (170,000 lux; in the presence of a cut filter which cuts light of 325 nm or less) using a Fade-o-meter and image density thereof is measured before and after irradiation with the xenon light using a reflection densitometer. The pigment dispersions 1 to 18 of the invention and the comparative pigment dispersions 1 to 5 are evaluated according to the following criteria: a sample showing a colorant residual ratio [(density after irradiation/density before irradiation)×100%] of 90% or more is ranked A; a sample showing the ratio of 80% or more is ranked B; a sample showing the ratio of 70% or more is ranked C; a sample showing the ratio of 60% or more is ranked D; and a sample showing the ratio of less than 50% is ranked E. The results are shown in Table 1.

<Solvent Resistance>

Evaluation is conducted on each of the solutions prepared by adding 0.05 part of each of the compounds used in Examples and Comparative examples in 200 parts of an organic solvent and allowed to stand at room temperature for 24 hours. The evaluation is conducted according to the criteria that: a solution wherein the compound of the Example or the Comparative example is completely dissolved in the organic solvent is ranked D; a solution wherein the compound is not completely dissolved and some insolubles remain but the filtrate is colored is ranked C; a solution wherein the compound is not completely dissolved and some insolubles remain but the filtrate is slightly colored is ranked B; and a solution wherein insolubles remain and the filtrate is not colored is ranked A. Additionally, as the organic solvent, a mixed solvent of four kinds of solvents, i.e., a mixed solvent of 25 parts of methanol, 25 parts of acetone, 25 parts of ethyl acetate, and 25 parts of water is used.

TABLE 1

|  | Pigment Dispersion | Volume-average Particle Size | Coloring Strength | Hue | Light Resistance | Solvent Resistance |
| --- | --- | --- | --- | --- | --- | --- |
| Example 1 | Pigment dispersion 1 of the invention | Mv = ca. 55 nm | 1.42 | B | B | B |
| Example 2 | Pigment dispersion 2 of the invention | Mv = ca. 35 nm | 1.40 | B | B | B |
| Example 3 | Pigment dispersion 3 of the invention | Mv = ca. 50 nm | 1.41 | A | C | B |
| Example 4 | Pigment dispersion 4 of the invention | Mv = ca. 53 nm | 1.38 | A | C | B |
| Example 5 | Pigment dispersion 5 of the invention | Mv = ca. 70 nm | 1.40 | B | C | B |
| Example 6 | Pigment dispersion 6 of the invention | Mv = ca. 88 nm | 1.39 | B | B | B |
| Example 7 | Pigment dispersion 7 of the invention | Mv = ca. 75 nm | 1.37 | B | B | B |
| Example 8 | Pigment dispersion 8 of the invention | Mv = ca. 62 nm | 1.44 | B | B | B |
| Example 9 | Pigment dispersion 9 of the invention | Mv = ca. 60 nm | 1.40 | A | C | B |
| Example 10 | Pigment dispersion 10 of the invention | Mv = ca. 58 nm | 1.41 | B | B | B |
| Example 11 | Pigment dispersion 11 of the invention | Mv = ca. 62 nm | 1.42 | B | B | B |
| Example 12 | Pigment dispersion 12 of the invention | Mv = ca. 67 nm | 1.43 | B | B | B |
| Example 13 | Pigment dispersion 13 of the invention | Mv = ca. 77 nm | 1.41 | A | C | B |
| Example 14 | Pigment dispersion 14 of the invention | Mv = ca. 81 nm | 1.39 | A | C | B |
| Example 15 | Pigment dispersion 15 of the invention | Mv = ca. 88 nm | 1.38 | B | B | B |
| Example 16 | Pigment dispersion 16 of the invention | Mv = ca. 84 nm | 1.39 | B | B | B |
| Example 17 | Pigment dispersion 17 of the invention | Mv = ca. 93 nm | 1.33 | B | B | A |
| Example 18 | Pigment dispersion 18 of the invention | Mv = ca. 91 nm | 1.31 | B | B | A |
| Comparative example 1 | Comparative pigment dispersion 1 | Mv = ca. 50 nm | 1.05 | C | C | A |
| Comparative example 2 | Comparative pigment dispersion 2 | Mv = ca. 50 nm | 1.45 | A | E | B |
| Comparative example 3 | Comparative pigment dispersion 3 | Mv = ca. 45 nm | 1.10 | C | D | A |
| Comparative example 4 | Comparative pigment dispersion 4 | No formation of a fine particle dispersion | — | — | — | D |
| Comparative example 5 | Comparative pigment dispersion 5 | No formation of a fine particle dispersion | — | — | — | D |

It is seen from these results that pigment ink liquid using the azo pigment of the invention shows excellent hue as a yellow pigment, high coloring strength, and excellent light resistance.

Accordingly, the pigment dispersions using the pigments of the invention can preferably be used in an ink composition for printing such as inkjet printing, a color toner for electrophotography, a color filter to be used for displays such as LCD and PDP and image pick-up devices such as CCD, a paint, and in colored plastics.

INDUSTRIAL APPLICABILITY

According to the present invention, there are provided azo pigments having excellent coloring characteristics such as coloring strength and hue and having excellent durability such as light fastness. A pigment dispersion having excellent coloring characteristics, durability, and dispersion stability can be obtained by dispersing the pigment of the invention in various media. The pigment dispersion can be used for an ink composition for printing such as inkjet printing, a color toner for electrophotography, a display such as LCD or PDP, a color filter to be used in image pick-up devices such as CCD, a paint, a colored plastic, etc.

The entire disclosure of each and every foreign patent application from which the benefit of foreign priority has been claimed in the present application is incorporated herein by reference, as if fully set forth.

The invention claimed is:

1. A monoazo pigment represented by the following general formula (1), a tautomer of the monoazo pigment, and a salt or hydrate thereof:

General formula (1)

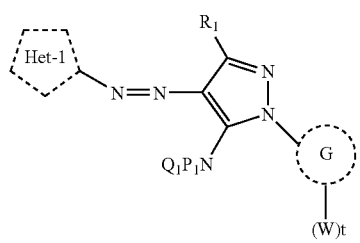

wherein $R_1$, $P_1$, and $Q_1$ each independently represents a hydrogen or a substituent, G represents the non-metallic atoms necessary to complete a 5- to 6-membered heterocyclic group, W represents a substituent capable of binding to the heterocyclic group constituted by G, t represents an integer of from 0 to 5, Het-1 represents a group selected from the aromatic heterocyclic groups represented by the following general formula (2):

General formula (2)

General formula 2

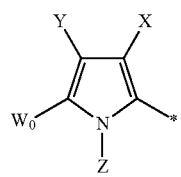 (a)

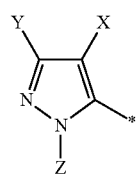 (b)

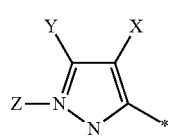 (c)

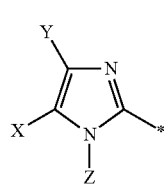 (d)

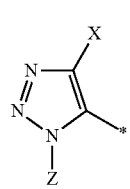 (e)

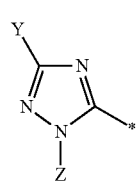 (f)

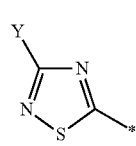 (g)

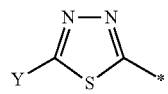 (h)

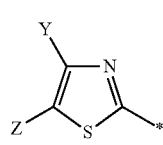 (i)

-continued (j) 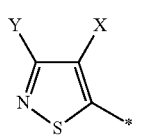

(k) 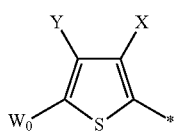

(l) 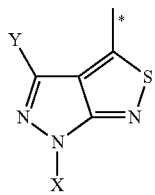

(m) 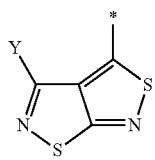

(n) 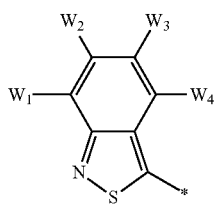

(o) 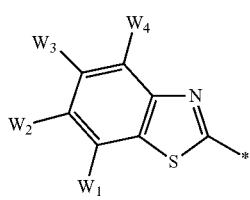

wherein

X, Y, Z, $W_0$, $W_1$, $W_2$, $W_3$, and $W_4$ each independently represents a hydrogen or a substituent, and

* shows the point of attachment to the azo linkage in the general formula (1), wherein the monoazo pigment is represented by the following general formula (6):

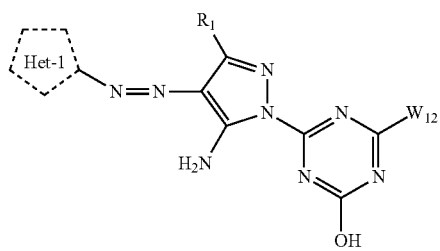

General formula (6)

wherein $R_1$ represents a hydrogen or a substituent,

Het-1 represents a group selected from the aromatic heterocyclic groups represented by the general formula (2), provided that * in the general formula (2) shows the point of attachment to the azo linkage in the general formula (6), and $W_{12}$ represents a hydrogen or a substituent capable of binding to the s-triazine ring.

2. The monoazo pigment, the tautomer of the monoazo pigment, and the salt or hydrate thereof according to claim 1, wherein the tautomer of the monoazo pigment is represented by any one of the following general formulae (6') to (6'''):

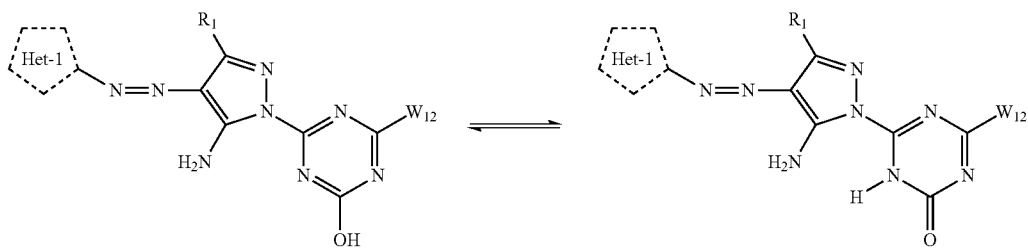

General formula (6)        General formula (6')

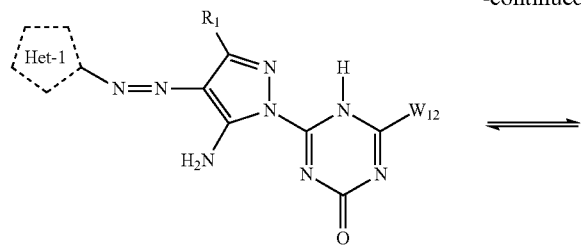

General formula (6'')

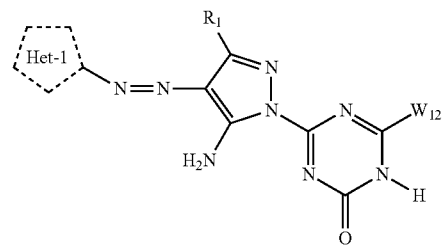

General formula (6''')

wherein
R$_1$ represents a hydrogen or a substituent,
Het-1 represents a group selected from the aromatic heterocyclic groups represented by the general formula (2), provided that * in the general formula (2) shows the point to the azo linkage in the general formulae (6') to (6'''), and
W$_{12}$ represents a hydrogen or a substituent capable of binding to the s-triazine ring.

3. A monoazo pigment, a tautomer of the monoazo pigment, and a salt or hydrate thereof:

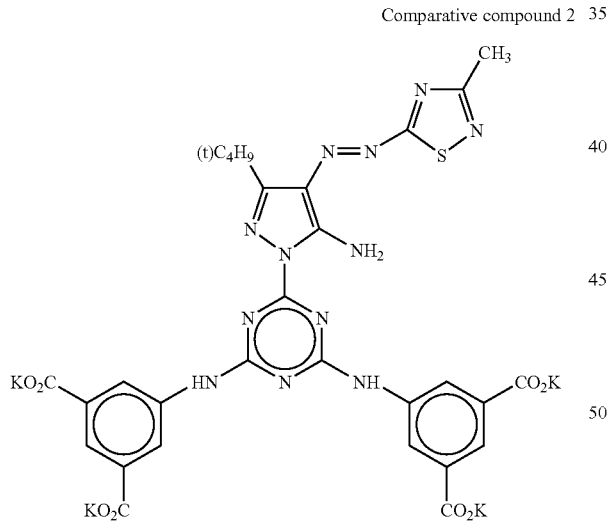

Comparative compound 2 wherein
R$_1$, P$_1$, and Q$_1$ each independently represents a hydrogen or a substituent,
G represents the non-metallic atoms necessary to complete a 5- to 6-membered heterocyclic group,
W represents a substituent capable of binding to the heterocyclic group constituted by G,
t represents an integer of from 0 to 5,
Het-1 represents a group selected from the aromatic heterocyclic groups represented by the following general formula (2):

General formula (2)

General formula 2

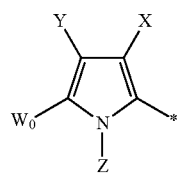
(a)

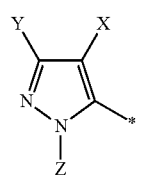
(b)

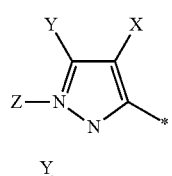
(c)

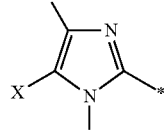
(d)

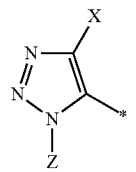
(e)

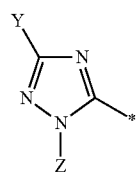
(f)

-continued

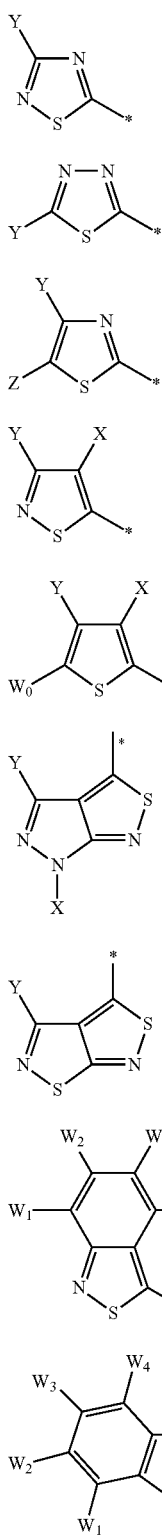

(g)

(h)

(i)

(j)

(k)

(l)

(m)

(n)

(o)

wherein
X, Y, Z, $W_0$, $W_1$, $W_2$, $W_3$, and $W_4$ each independently represents a hydrogen or a substituent, and
* shows the point of attachment to the azo linkage in the general formula (1), wherein the monoazo pigment is represented by the following general formula (7):

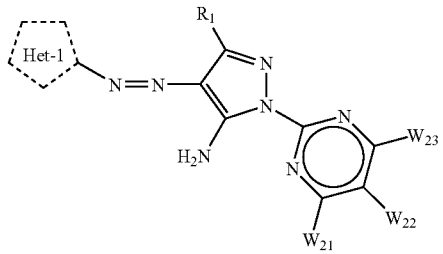

General formula (7)

wherein
$R_1$ represents a hydrogen or a substituent,
Het-1 represents a group selected from the aromatic heterocyclic groups represented by the general formula (2), provided that * in the general formula (2) shows the point of attachment to the azo linkage in the general formula (7), and
$W_{21}$, $W_{22}$ and $W_{23}$ each independently represents a hydrogen, a hydroxyl group, a substituted or unsubstituted amino group, a substituted or unsubstituted alkoxy group, a substituted or unsubstituted aryloxy group, a substituted or unsubstituted alkylthio group, or a substituted or unsubstituted arylthio group.

4. A monoazo pigment, a tautomer of the monoazo pigment, and a salt or hydrate thereof:

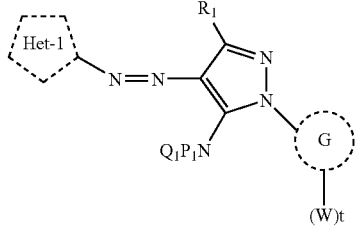

General formula (1)

wherein
$R_1$, $P_1$, and $Q_1$ each independently represents a hydrogen or a substituent,
G represents the non-metallic atoms necessary to complete a 5- to 6-membered heterocyclic group,
W represents a substituent capable of binding to the heterocyclic group constituted by G,
t represents an integer of from 0 to 5,
Het-1 represents a group selected from the aromatic heterocyclic groups represented by the following general formula (2):

General formula 2

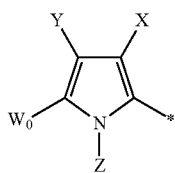

(a)

(b)
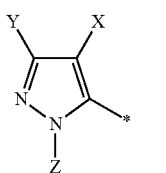

(c)
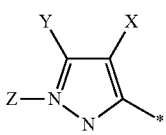

(d)
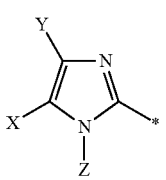

(e)
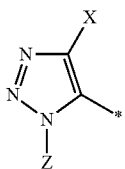

(f)
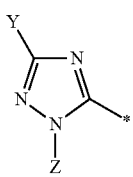

(g)
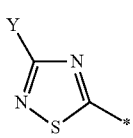

(h)
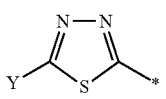

(i)
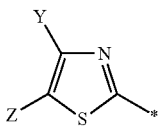

(j)
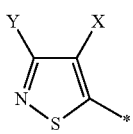

(k)
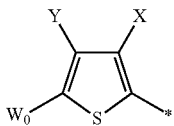

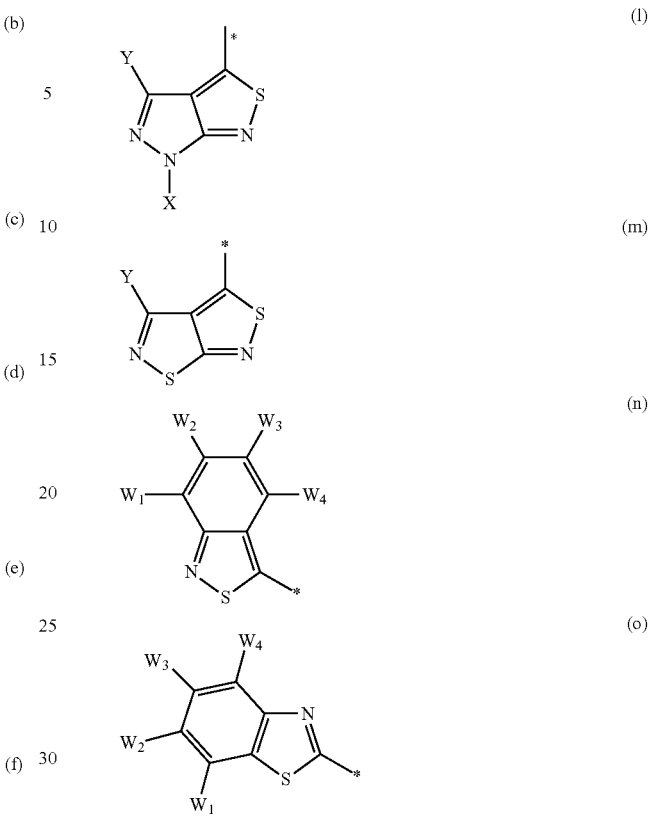

(l)

(m)

(n)

(o)

wherein
X, Y, Z, $W_0$, $W_1$ $W_2$, $W_3$, and $W_4$ each independently represents a hydrogen or a substituent, and
* shows the point of attachment to the azo linkage in the general formula (1), wherein
the monoazo pigment is represented by the following general formula (8):

General formula (8)

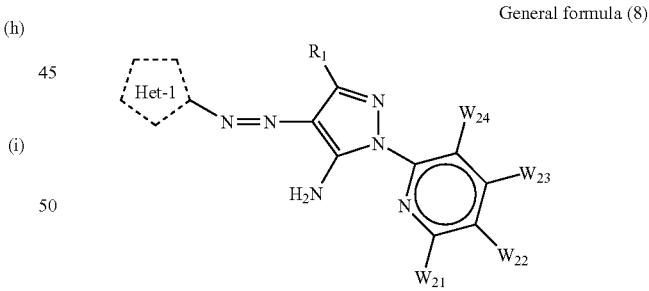

wherein
$R_1$ represents a hydrogen or a substituent,
Het-1 represents a group selected from the aromatic heterocyclic groups represented by the general formula (2), provided that * in the general formula (2) shows the point of attachment to the azo linkage in the general formula (8), and
$W_{21}$, $W_{22}$, $W_{23}$ and $W_{24}$ each independently represents a hydrogen or a substituent capable of binding to the 2-pyridine ring.

5. The monoazo pigment, the tautomer of the monoazo pigment, and the salt or hydrate thereof according to claim 1, wherein the monoazo pigment has a peak absorption intensity in the range of from 1700 to 1730 cm$^{-1}$ in the IR absorption spectrum which is 1/3 or less of a peak absorption intensity in the range of from 1620 to 1670 cm$^{-1}$.

6. The monoazo pigment, the tautomer of the monoazo pigment, and the salt or hydrate thereof according to claim 3, wherein the monoazo pigment has a peak absorption intensity in the range of from 1700 to 1730 cm$^{-1}$ in the IR absorption spectrum which is 1/3 or less of a peak absorption intensity in the range of from 1620 to 1670 cm$^{-1}$.

7. The monoazo pigment, the tautomer of the monoazo pigment, and the salt or hydrate thereof according to claim 4, wherein the monoazo pigment has a peak absorption intensity in the range of from 1700 to 1730 cm$^{-1}$ in the IR absorption spectrum which is 1/3 or less of a peak absorption intensity in the range of from 1620 to 1670 cm$^{-1}$.

8. The monoazo pigment, the tautomer of the monoazo pigment, and the salt or hydrate thereof according to claim 1, wherein the aromatic heterocyclic group represented by Het-1 is represented by the general formula (9):

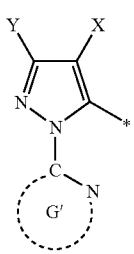

General formula (9)

wherein

Y represents a hydrogen or a substituent,

X represents an electron-withdrawing group having a Hammett's σp value of 0.2 or more, G' represents the non-metallic atoms necessary to complete a 5- to 6-membered heterocyclic group, provided that the nitrogen-containing heterocyclic group may be unsubstituted or may have a substituent, and may be a monocyclic ring or may have a condensed ring, and \* shows the point of attachment to the azo linkage.

9. The monoazo pigment, the tautomer of the monoazo pigment, and the salt or hydrate thereof according to claim 3, wherein the aromatic heterocyclic group represented by Het-1 is represented by the general formula (9):

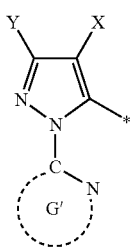

General formula (9)

wherein

Y represents a hydrogen or a substituent,

X represents an electron-withdrawing group having a Hammett's σp value of 0.2 or more, G' represents the non-metallic atoms necessary to complete a 5- to 6-membered heterocyclic group, provided that the nitrogen-containing heterocyclic group may be unsubstituted or may have a substituent, and may be a monocyclic ring or may have a condensed ring, and \* shows the point of attachment to the azo linkage.

10. The monoazo pigment, the tautomer of the monoazo pigment, and the salt or hydrate thereof according to claim 4, wherein the aromatic heterocyclic group represented by Het-1 is represented by the general formula (9):

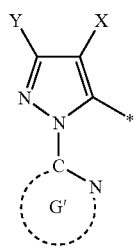

General formula (9)

wherein

Y represents a hydrogen or a substituent,

X represents an electron-withdrawing group having a Hammett's σp value of 0.2 or more, G' represents the non-metallic atoms necessary to complete a 5- to 6-membered heterocyclic group, provided that the nitrogen-containing heterocyclic group may be unsubstituted or may have a substituent, and may be a monocyclic ring or may have a condensed ring, and \* shows the point of attachment to the azo linkage.

11. A pigment dispersion comprising:

at least one of the monoazo pigment, the tautomer of the monoazo pigment, and the salt or hydrate thereof described in claim 1.

12. A pigment dispersion comprising:

at least one of the monoazo pigment, the tautomer of the monoazo pigment, and the salt or hydrate thereof described in claim 3.

13. A pigment dispersion comprising:

at least one of the monoazo pigment, the tautomer of the monoazo pigment, and the salt or hydrate thereof described in claim 4.

14. A coloring composition comprising:

at least one of the monoazo pigment, the tautomer of the monoazo pigment, and the salt or hydrate thereof described in claim 1.

15. A coloring composition comprising:

at least one of the monoazo pigment, the tautomer of the monoazo pigment, and the salt or hydrate thereof described in claim 3.

16. A coloring composition comprising:

at least one of the monoazo pigment, the tautomer of the monoazo pigment, and the salt or hydrate thereof described in claim 4.

17. An ink composition for inkjet recording, comprising:
at least one of the monoazo pigment, the tautomer of the monoazo pigment, and the salt or hydrate thereof described in claim 1.

18. An ink composition for inkjet recording, comprising:
at least one of the monoazo pigment, the tautomer of the monoazo pigment, and the salt or hydrate thereof described in claim 3.

19. An ink composition for inkjet recording, comprising:
at least one of the monoazo pigment, the tautomer of the monoazo pigment, and the salt or hydrate thereof described in claim 4.

\* \* \* \* \*